United States Patent [19]

Kuchkuda et al.

[11] Patent Number: 5,872,902
[45] Date of Patent: Feb. 16, 1999

[54] METHOD AND APPARATUS FOR RENDERING OF FRACTIONAL PIXEL LISTS FOR ANTI-ALIASING AND TRANSPARENCY

[75] Inventors: Roman Kuchkuda, San Diego; John Rigg, Poway; Manuel Rey Enriquez, Oceanside; James V. Henson, Poway; Curt Stehley, Solana Beach, all of Calif.

[73] Assignee: Nihon Unisys, Ltd., Tokyo, Japan

[21] Appl. No.: 492,393

[22] Filed: Jun. 19, 1995

Related U.S. Application Data

[63] Continuation of Ser. No. 69,180, May 28, 1993, abandoned.

[51] Int. Cl.$^6$ .................................................. G06T 11/40
[52] U.S. Cl. ........................... 395/130; 395/131; 395/122
[58] Field of Search ................................... 395/125, 127, 395/128, 130, 131, 122; 345/152, 139

[56] References Cited

U.S. PATENT DOCUMENTS

| | | | |
|---|---|---|---|
| 4,646,251 | 2/1987 | Hayes et al. | 395/123 |
| 4,679,040 | 7/1987 | Yan | 345/139 |
| 4,694,404 | 9/1987 | Meagher | 395/121 |
| 4,710,876 | 12/1987 | Cline et al. | 364/413.22 |
| 4,718,105 | 1/1988 | Lipkie et al. | 382/56 |
| 4,719,585 | 1/1988 | Cline et al. | 395/124 |
| 4,729,098 | 3/1988 | Cline et al. | 364/413.18 |
| 4,843,380 | 6/1989 | Oakley et al. | 345/137 |
| 4,873,515 | 10/1989 | Dickson et al. | 395/163 X |
| 4,885,688 | 12/1989 | Crawford | 364/413.22 |
| 4,905,164 | 2/1990 | Chandler et al. | 395/131 |
| 4,918,625 | 4/1990 | Yan | 395/131 |
| 4,924,415 | 5/1990 | Winser | 395/122 |

(List continued on next page.)

OTHER PUBLICATIONS

Paul Haeberli and Kurt Akeley, "The Accumulation Buffer: Hardware Support for High–Quality Rendering," *Computer Graphics*, vol. 24, No. 4, Aug. 1990, pp. 309–318.

John Trueblood, Masami Mizuno, "An Efficient Anti–Aliasing Software Algorithm," *Society for Information Display Digest*, vol. XVII, 1986, pp. 348–351.

(List continued on next page.)

*Primary Examiner*—Mark K. Zimmeran
*Assistant Examiner*—Anton W. Fetting
*Attorney, Agent, or Firm*—Nydegger & Associates

[57] ABSTRACT

A system for rendering visual images that combines sophisticated anti-aliasing and pixel blending techniques with control pipelining in hardware embodiment. A highly-parallel rendering pipeline performs sophisticated polygon edge interpolation, pixel blending and anti-aliasing rendering operations in hardware. Primitive polygons are transformed to subpixel coordinates and then sliced and diced to create "pixlink" elements mapped to each pixel. An oversized frame buffer memory allows the storage of many pixlinks for each pixel. Z-sorting is avoided through the use of a linked-list data object for each pixlink vector in a pixel stack. Because all image data values for X, Y, Z, R, G, B and pixel coverage A are maintained in the pixlink data object, sophisticated blending operations are possible for anti-aliasing and transparency. Data parallelism in the rendering pipeline overcomes the processor efficiency problem arising from the computation-intensive rendering algorithms used in the system of this invention. Single state machine control is made possible through linked data/control pipelining.

10 Claims, 35 Drawing Sheets

```
AB.C= B.C+[dx*DX.C]+[dy+DY.C]
   dx= 0.5-frac(P0.X)
   dy= 0.5-frac(P0.Y)
thus: AB.C= B.C+[(0.5-frac(P0.X))*DX.C]+[(0.5-frac(P0.Y))*DY.C]
where:
      AB.C is the adjusted base color value
      B.C is the raw base color value
      DX.C is the x component of the color gradient
      DY.C is the y component of the color gradient
```

U.S. PATENT DOCUMENTS

| | | | |
|---|---|---|---|
| 4,930,091 | 5/1990 | Schroeder et al. | 395/121 |
| 4,945,500 | 7/1990 | Deering | 395/122 |
| 4,974,176 | 11/1990 | Buchner et al. | 395/128 |
| 4,991,122 | 2/1991 | Sanders | 395/131 |
| 5,036,316 | 7/1991 | Kemplin | 395/130 X |
| 5,070,465 | 12/1991 | Kato et al. | 395/141 |
| 5,109,481 | 4/1992 | Lathrop et al. | 395/133 |
| 5,123,085 | 6/1992 | Wells et al. | 395/121 |
| 5,125,038 | 6/1992 | Meshkat et al. | 382/22 |
| 5,136,664 | 8/1992 | Bersack et al. | 395/141 X |
| 5,138,699 | 8/1992 | Minor et al. | 395/131 |
| 5,142,273 | 8/1992 | Wobermin | 345/150 |
| 5,142,617 | 8/1992 | Dalrymple et al. | 395/132 |
| 5,153,937 | 10/1992 | Wobermin et al. | 395/131 |
| 5,155,822 | 10/1992 | Doyle et al. | 395/400 |
| 5,157,736 | 10/1992 | Boyer et al. | 382/10 |
| 5,159,665 | 10/1992 | Priem et al. | 395/134 |
| 5,175,805 | 12/1992 | Carrie | 395/121 X |
| 5,175,809 | 12/1992 | Wobermin et al. | 395/141 |
| 5,179,638 | 1/1993 | Dawson et al. | 395/125 |
| 5,179,645 | 1/1993 | Tanimori | 395/141 |
| 5,185,856 | 2/1993 | Alcorn et al. | 395/130 |
| 5,220,646 | 6/1993 | Fossum | 395/131 X |
| 5,227,863 | 7/1993 | Bilbrey et al. | 348/578 |
| 5,241,656 | 8/1993 | Loucks et al. | 395/158 |
| 5,265,198 | 11/1993 | Gonzales-Lopez et al. | 395/128 X |
| 5,274,760 | 12/1993 | Schneider | 395/162 |
| 5,278,949 | 1/1994 | Thayer | 395/126 |
| 5,307,449 | 4/1994 | Kelley et al. | 395/119 |
| 5,307,450 | 4/1994 | Grossman | 395/130 X |
| 5,325,485 | 6/1994 | Hochmuth et al. | 395/163 |
| 5,327,509 | 7/1994 | Rich | 395/128 X |
| 5,339,092 | 8/1994 | Johnson et al. | 345/136 |
| 5,345,541 | 9/1994 | Kelley et al. | 395/127 X |
| 5,363,475 | 11/1994 | Baker et al. | 395/122 |
| 5,394,516 | 2/1995 | Winser | 395/119 |

OTHER PUBLICATIONS

John Trueblood, "Theory and Measurement of Anti–Aliased Line Performance," *Society for Information Display Digest*, vol. XVIII, 1987, pp. 123–126.

Loren Carpenter, "The A–buffer, an Antialiased Hidden Surface Method," *Computer Graphics*, vol. 18, No. 3, Jul. 1984, pp. 103–108.

Henry Fuchs et al., "Fast Spheres, Shadows, Textures, Transparencies and Image Enhancements in Pixel–Planes," *SIGGRAPH '85*, vol. 19, No. 3, 1985, pp. 111–120.

Foley et al, Computer Graphics: Principles and Practice, 1990, pp. 649–698, 754–757.

Horowitz et al, Fundamentals of Data Structures in Pascal, 1984, pp. 30–39, 334–339.

Blinn, A Trip Down the Graphics Pipeline: Subpixelic Particles, IEEE Computer Graphics and Applications, Sep. 1991, pp. 86–90.

Haeberli et al., The Accumulation Buffer, Computer Graphics, Aug. 1990, pp. 309–318.

Mammen, Transparency Antialiasing Algorithms Implemented with the Virtual Pixel Maps Technique, IEEE Computer Graphics and Application, Jul. 1989, pp. 43–55.

AREA = H * W - (h₁ * w₁)/2

Area1= H*W−(h_r *w_r /2)
Area2= (h₁₁+h₁₂)/2*W
Area= Area1−Area2

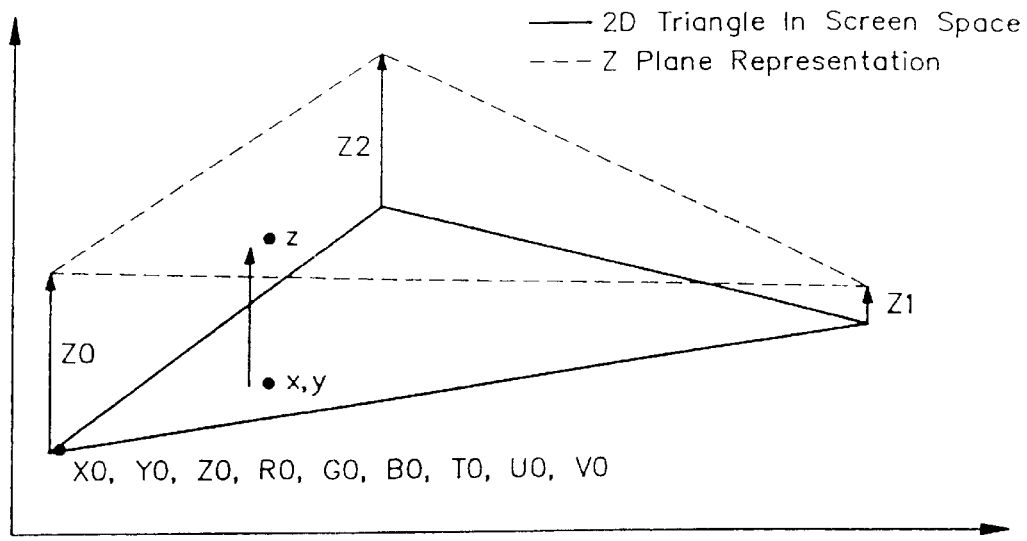
| | |
|---|---|
| General Form: | Ax+By+Cz+D=0 |
| Solve For Z: | z=Ax+By+D |
| Substitute Constants: | z=dZ/dX(x−X0)+dZ/dy(y−Y0)+Z0 |
| Solve For R: | r=dR/dx(x−X0)+dR/dy(y−Y0)+R0 |
| Solve For G: | g=dG/dx(x−X0)+dG/dy(y−Y0)+G0 |
| Solve For B: | b=dB/dx(x−X0)+dB/dy(y−Y0)+B0 |
| Solve For T: | t=dT/dx(x−X0)+dT/dy(y−Y0)+T0 |
| Solve For U: | u=dU/dx(x−X0)+dU/dy(y−Y0)+U0 |
| Solve For V: | v=dV/dx(x−X0)+dV/dy(y−Y0)+V0 |
FIG. 6
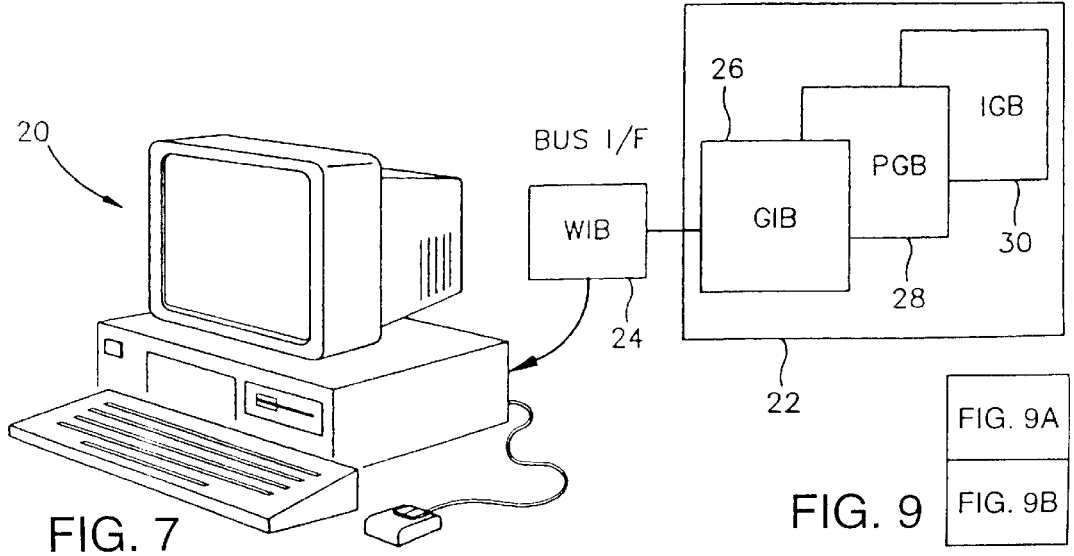
FIG. 7
FIG. 9
| FIG. 9A |
|---|
| FIG. 9B |

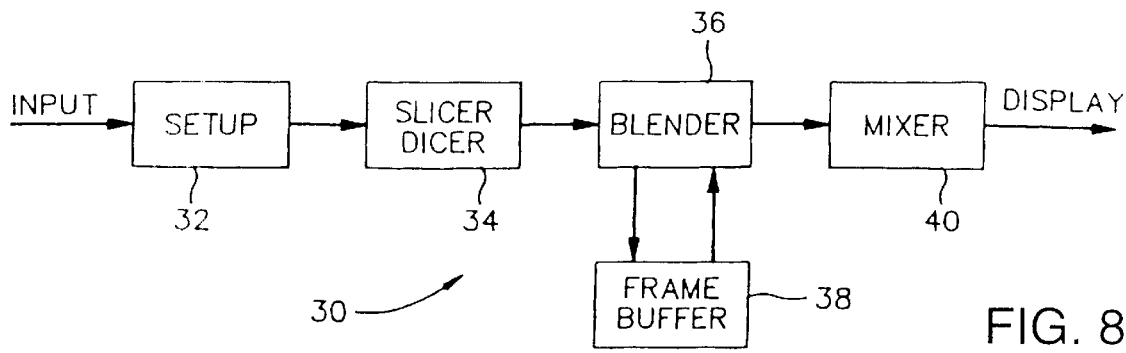
FIG. 8
FIG. 11A
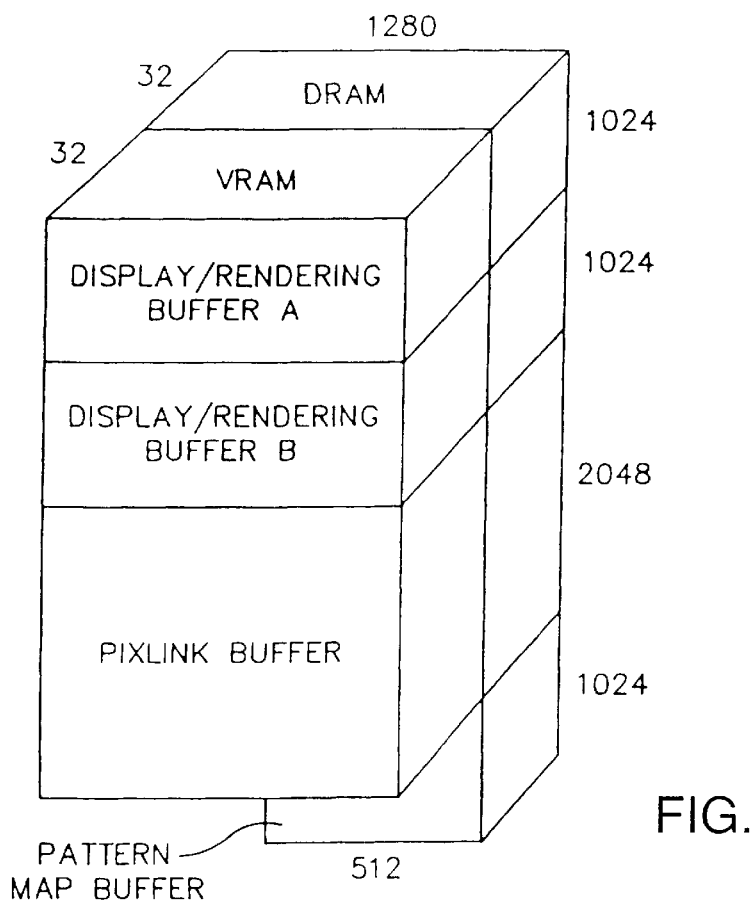
FIG. 11B

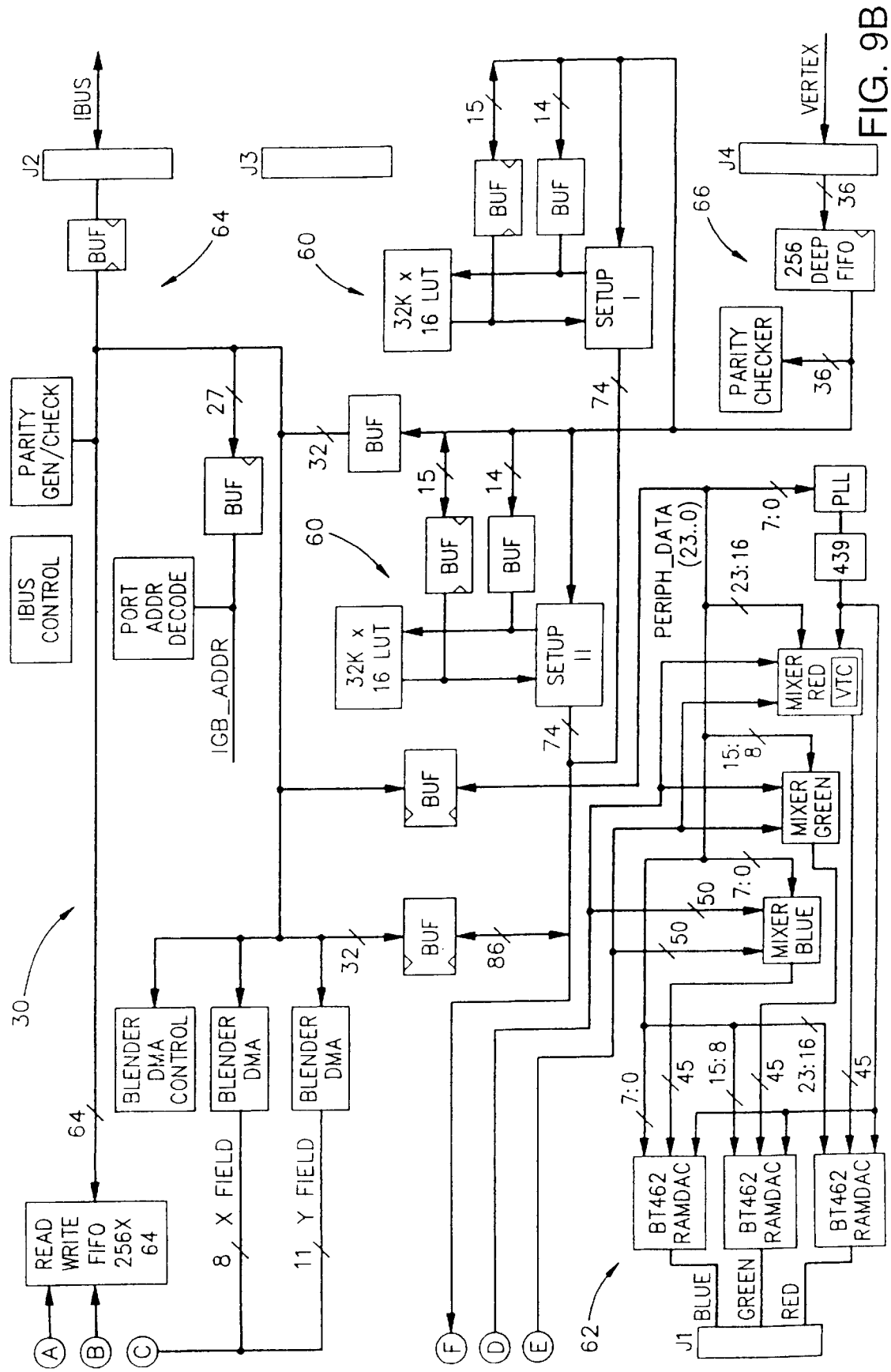

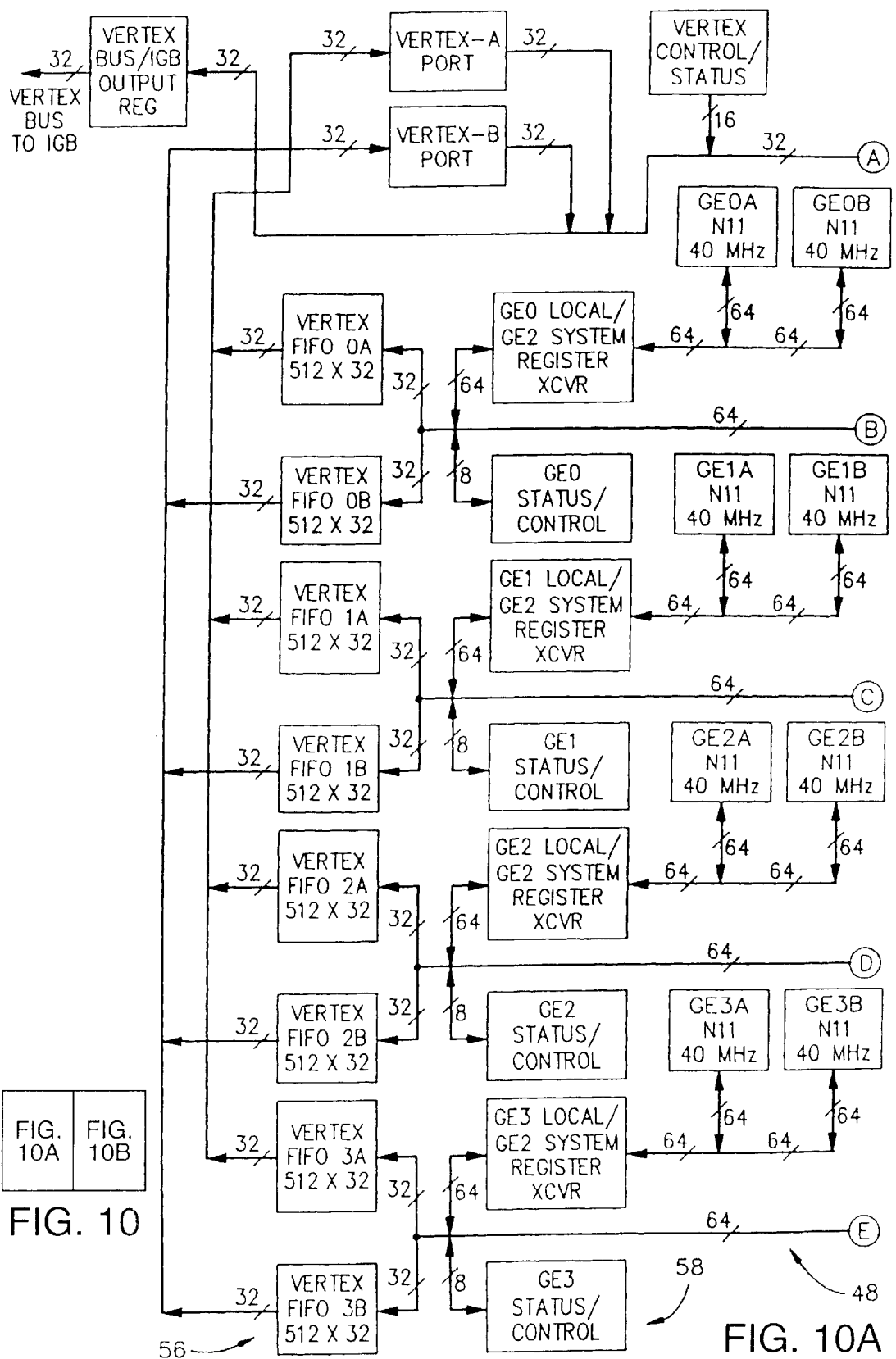

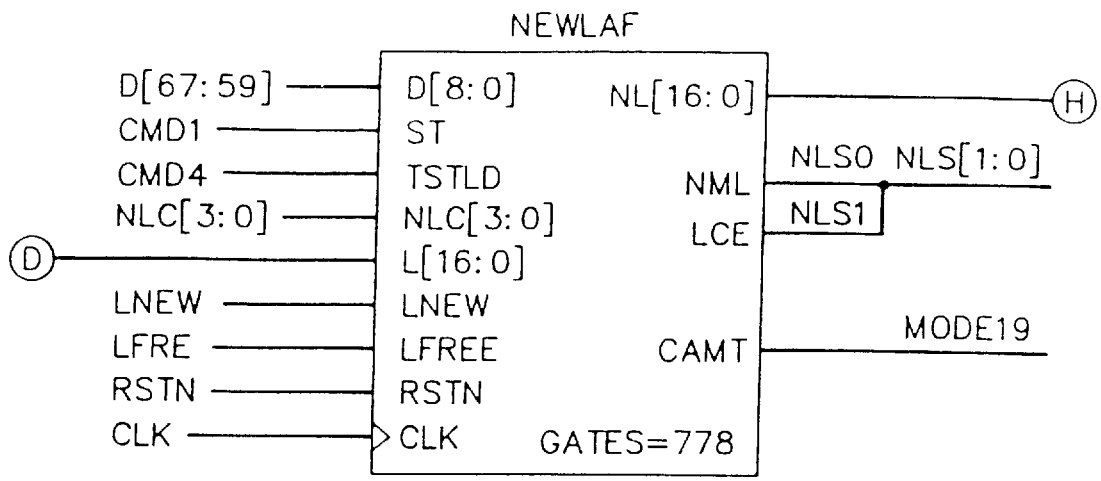
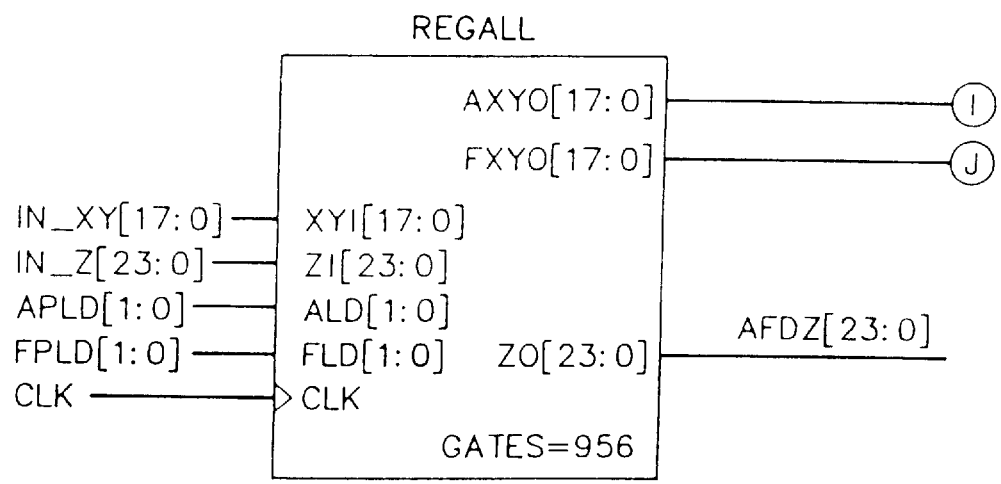
FIG. 12E
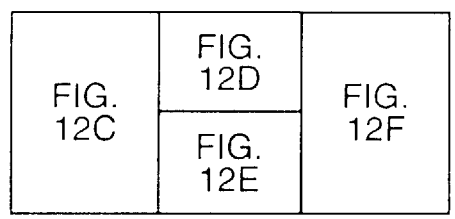
FIG. 12B

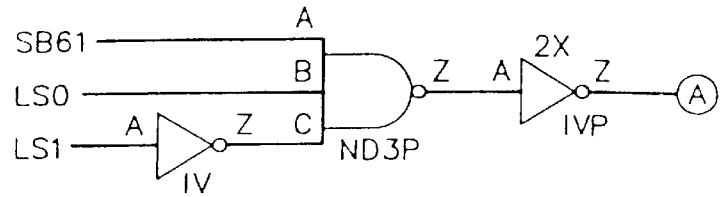
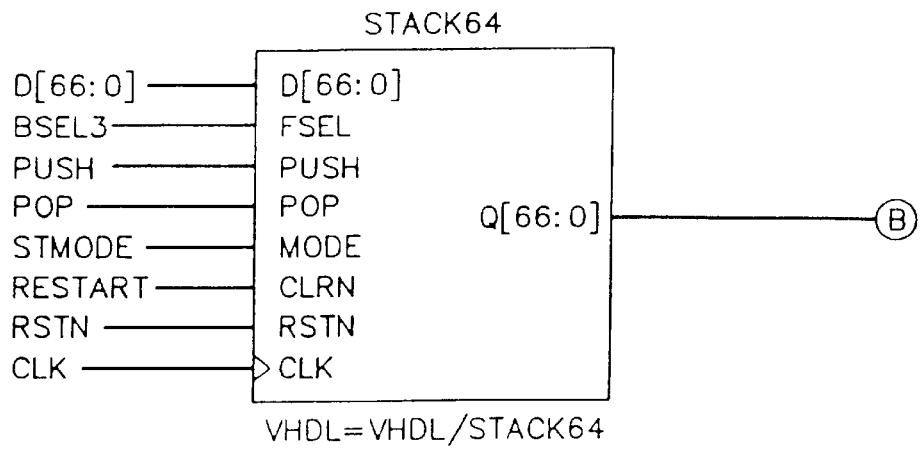
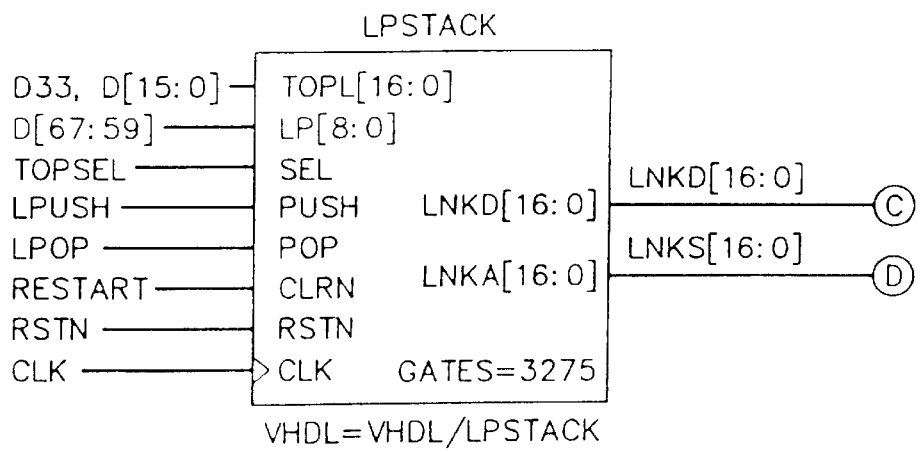
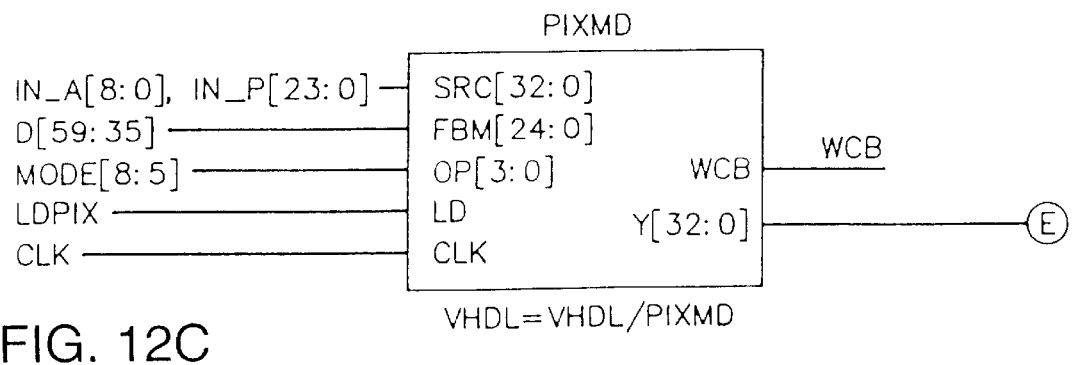
FIG. 12C

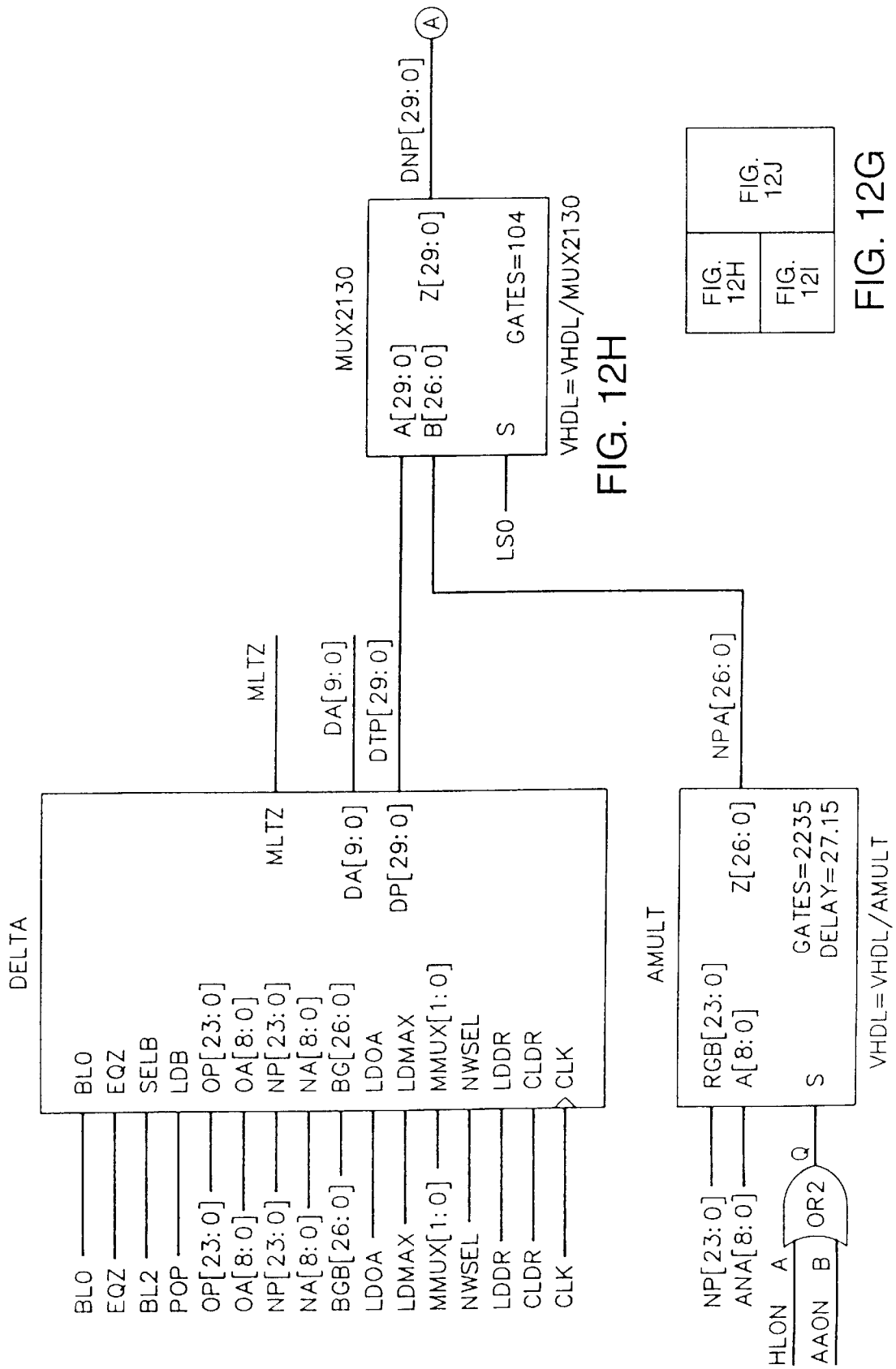

| CLASS/STATE | START 44 | TRI 43 | LINE 42 | POINT 41 | PIX 40 | RECT 39 | STIP 38 |
|---|---|---|---|---|---|---|---|
| 0 | | Y0 | Y0 | Y0 | X0_RB | RB | SB |
| 1 | | X1 | X1 | X1 | Y0_GB | GB | X0 |
| 2 | | Y1 | Y1 | Y1 | X1_BB | BB | Y0 |
| 3 | | X2 | X2 | X2 | Y1_TB | TB | S |
| 4 | | Y2 | Y2 | Y2 | | X0 | W |
| 5 | | MIP1 | X3 | X3 | | Y0 | H |
| 6 | | MIP2 | Y3 | Y3 | | ZB | ZB |
| 7 | | S0 | S0 | S0 | | S | RFB |
| 8 | | I0 | I0 | I0 | | W | GFB |
| 9 | | S1 | S1 | S1 | | H | BFB |
| 10 | | I1 | I1 | I1 | | | RBB |
| 11 | | S2 | S2 | S2 | | | GBB |
| 12 | | I2 | I2 | I2 | | | BBB |
| 13 | | | S3 | S3 | | | |
| 14 | | | I3 | I3 | | | |
| 15 | | ZX | ZX | | | | |
| 16 | | ZY | ZY | | | | |
| 17 | | RX | RX | | | | |
| 18 | | RY | RY | | | | |
| 19 | | GX | GX | | | | |
| 20 | | GY | GY | | | | |
| 21 | | BX | BX | | | | |
| 22 | | BY | BY | | | | |
| 23 | | TX | TX | | | | |
| 24 | | TY | TY | | | | |
| 25 | | UX | UX | | | | |
| 26 | | UY | UY | | | | |
| 27 | | VX | VX | | | | |
| 28 | | VY | VY | | | | |
| 29 | | ZB | ZB | ZB | | | |
| 30 | | RB | RB | RB | | | |
| 31 | | GB | GB | GB | | | |
| 32 | | BB | BB | BB | | | |
| 33 | | UB | UB | | | | |
| 34 | | VB | VB | | | | |
| 35 | | TB | TB | TB | | | |
| 36 | | ZMIN | ZMIN | | | | |
| 37 | | ZMAX | ZMAX | | | | |

FIG. 15

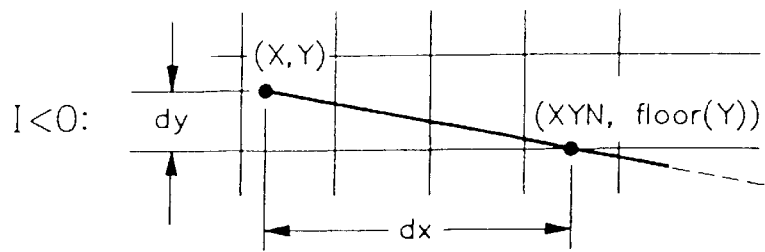
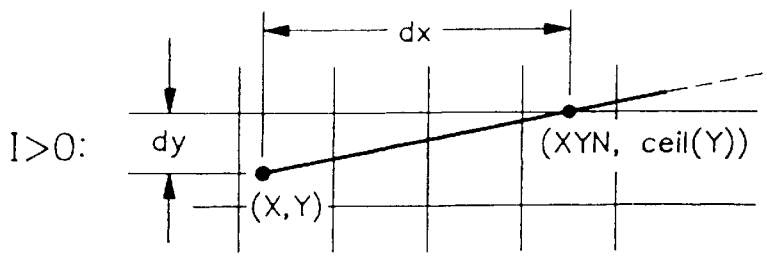
FIG. 17
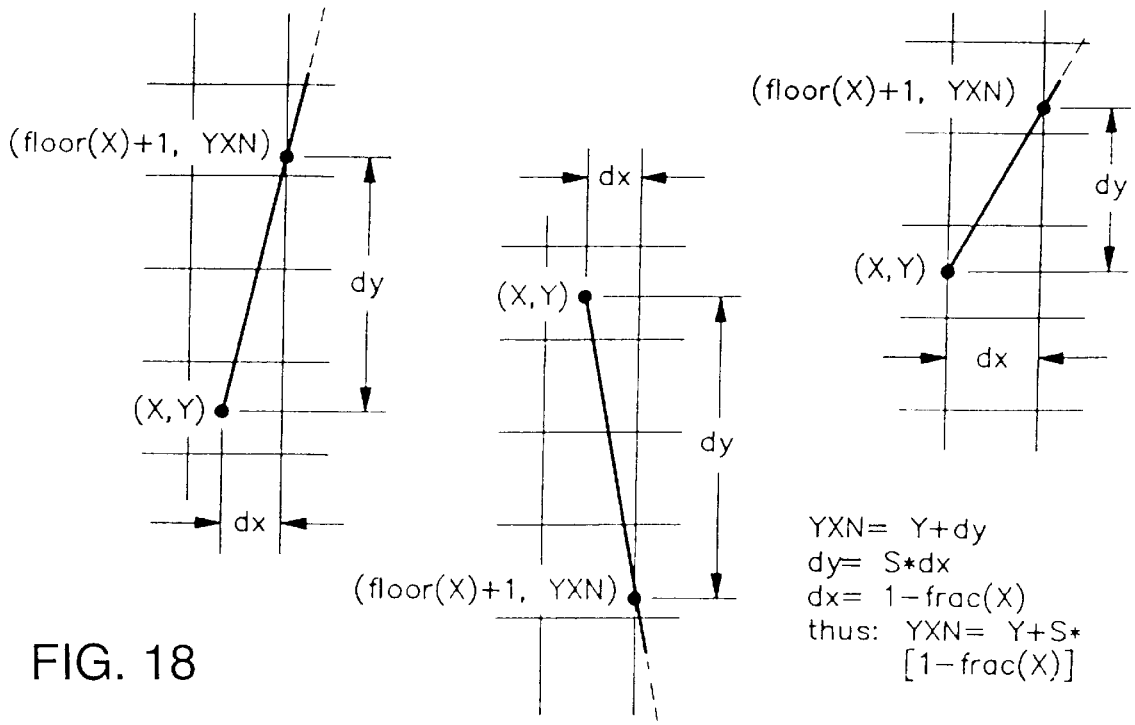
FIG. 18

AB.C= B.C+[dx*DX.C]+[dy+DY.C]
  dx= 0.5−frac(P0.X)
  dy= 0.5−frac(P0.Y)
thus: AB.C= B.C+[(0.5−frac(P0.X))*DX.C]+[(0.5−frac(P0.Y))*DY.C]
where:
  AB.C is the adjusted base color value
  B.C is the raw base color value
  DX.C is the x component of the color gradient
  DY.C is the y component of the color gradient

```
-- P03 Intercept
P03.X <= P0.X
-- P01 Intercept
P01.Y <= P0.Y;
-- P12 Intercept
P12.X <= P0.X + RLENGTH
P12.X <= P0.X + SLENGTH;
--P32 Intercept
P32.Y <= P0.Y + RHEIGHT;
P32.Y <= P0.Y + 1;
```

```
-- P03 Intercept
P03.X <= XREGISTER;
-- P01 Intercept
P01.Y = P0.Y;
-- P12 Intercept
P12.X <= XREGISTER + 1;
--P32 Intercept
P32.Y <= P0.Y + 1;
```

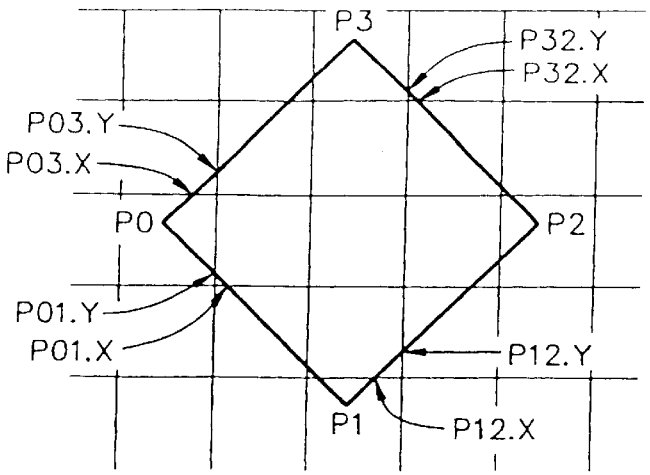

FIG. 22A

```
-- P03 Intercepts:
P03.X <= P0.X + (1 - Frac(P0.Y));
P03.Y <= P0.Y + (1 - Frac(P0.X));
-- P32 Intercepts:
P32.X <= P3.X + Frac(P3.Y);
P32.Y <= P3.Y - (1 - Frac(P3.X));
-- P12 Intercepts:
P12.X <= P1.X + (1 - Frac(P1.Y));
P12.Y <= P1.Y + (1 - Frac(P1.X));
-- P01 Intercepts:
P01.X <= P0.X + (Frac(P0.Y));
P01.Y <= P0.Y - (1 - (Frac(P0.X)));
```

FIG. 22B

```
-- P01 Intercept
P01X <= P0.X - (P0.I * (Frac(P0.Y)));
P01Y <= P0.Y + (P0.S * (1 - (Frac(P0.X))));
-- P03 Intercept
P03X <= P0.X + (P3.I * (1 - Frac(P0.Y)));
P03Y <= P0.Y + (P3.S * (1 - Frac(P0.X)));
-- P32 Intercept
P32X <= P3.X - (P2.I * Frac(P3.Y));
P32Y <= P3.Y + (P2.S * (1 - Frac(P3.X)));
-- P12 Intercept
P12X <= P1.X + (P1.I * (1 - Frac(P1.Y)));
P12Y <= P1.Y + (P1.S * (1 - Frac(P1.X)));
```

FIG. 22C

```
-- P01 Intercept:
if (P01.I > 0) then
    P01X <= P0.X + (P0.I * (1 - Frac(P0.Y)));
    P01Y <= P0.Y + (P0.S * (1 - Frac(P0.X)));
else
    P01X <= P0.X - (P0.I * (Frac(P0.Y)));
    P01Y <= P0.Y + (P0.S * (1 - Frac(P0.X)));
end if;

-- P02 Intercept:
if (P02.I > 0) then
    P02X <= P0.X + (P2.I * (1 - Frac(P0.Y)));
    P02Y <= P0.Y + (P2.S * (1 - Frac(P0.X)));
else
    P02X <= P0.X - (P2.I * (Frac(P0.Y)));
    P02Y <= P0.Y + (P2.S * (1 - Frac(P0.X)));
end if;
if (P1.X < P2.X) then
    -- P12 Intercept
    if (P12.I < 0)
        P12.X <= P1.X + (P1.I * (1 - Frac(P1.Y)));
        P12.Y <= P1.Y + (P1.S * (1 - Frac(P1.X)));
    else
        P12.X <= P1.X - (P1.I * (Frac(P1.Y)));
        P12.Y <= P1.Y + (P1.S * (1 - Frac(P1.X)));
    end if;
```

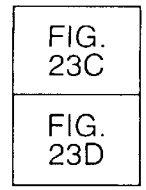

```
    else
      -- P21 Intercept
      if (P21.I < 0)
        P21.X <= P2.X + (P1.I * (1 - Frac(P2.Y)));
        P21.Y <= P2.Y + (P1.S * (1 - Frac(P2.X)));
      else
        P21.X <= P2.X - (P1.I * Frac(P2.Y));
        P21.Y <= P2.Y + (P1.S * (1 - Frac(P2.X)));
      end if;
    end if;
```

| Load Signal | Pixgen Input Data Bus | Numeric Format | Description | Unit Output |
|---|---|---|---|---|
| LDVX(0) | LDDATA1(27:0) | TC[13.15] | Vertex 0 X-coordinate register | PABVX0 |
| LDVY(0) | LDDATA2(27:0) | TC[13.15] | Vertex 0 Y-coordinate register | PABVY0 |
| LDVX(1) | LDDATA1(27:0) | TC[13.15] | Vertex 1 X-coordinate register | PABVX1 |
| LDVY(1) | LDDATA2(27:0) | TC[13.15] | Vertex 1 Y-coordinate register | PABVY1 |
| LDVX(2) | LDDATA1(27:0) | TC[13.15] | Vertex 2 X-coordinate register | PABVX2 |
| LDVY(2) | LDDATA2(27:0) | TC[13.15] | Vertex 2 Y-coordinate register | PABVY2 |
| LDVX(3) | LDDATA1(27:0) | TC[13.15] | Vertex 3 X-coordinate register | PABVX3 |
| LDVY(3) | LDDATA2(27:0) | TC[13.15] | Vertex 3 Y-coordinate register | PABVY3 |

FIG. 24A

```
BX <= int(PABVX0) + SPAN;   --(4 - SPAN) =
                              this chip's actual span
if (BX < 0) then
  PABSPANX <= not (not BX / 5);
  PABOFFSET <= (not BX) mod 5;
else
  PABSPANX <= BX / 5;
  PABOFFSET <= 5 + not (BX mod 5);
end if;
```

FIG. 24B

| Load Signal | Input Data Bus | Numeric Format | Register Description | Output |
|---|---|---|---|---|
| LDSCFG(0) | LDDATA4(5:0) | [6] | Segment 0 configuration | PABSCFG0 |
| LDSYXN(0) | LDDATA3(27:0) | TC[13.15] | Segment 0 Y-on-next-X | PABSYXN0 |
| LDSXYN(0) | LDDATA3(15:0) | TC[1.15] | Segment 0 X-on-next-Y | PABSXYN0 |
| LDSS(0) | LDDATA1(26:0) | TC[12.15] | Segment 0 slope | PABSS0 |
| LDSI(0) | LDDATA2(15:0) | TC[1:15] | Segment 0 inverse slope | PABSI0 |
| LDSCFG(1) | LDDATA4(5:0) | [6] | Segment 1 configuration | PABSCFG1 |
| LDSYXN(1) | LDDATA3(27:0) | TC[13.15] | Segment 1 Y-on-next-X | PABSYXN1 |
| LDSXYN(1) | LDDATA3(15:0) | TC[1.15] | Segment 1 X-on-next-Y | PABSXYN1 |
| LDSS(1) | LDDATA1(26:0) | TC[12.15] | Segment 1 slope | PABSS1 |
| LDSI(1) | LDDATA2(15:0) | TC[1.15] | Segment 1 inverse slope | PABSI1 |
| LDSCFG(2) | LDDATA4(5:0) | [6] | Segment 2 configuration | PABSCFG2 |
| LDSYXN(2) | LDDATA3(27:0) | TC[13.15] | Segment 2 Y-on-next-X | PABSYXN2 |
| LDSXYN(2) | LDDATA3(15:0) | TC[1.15] | Segment 2 X-on-next-Y | PABSXYN2 |
| LDSS(2) | LDDATA1(26:0) | TC[12.15] | Segment 2 slope | PABSS2 |
| LDSI(2) | LDDATA2(15:0) | TC[1.15] | Segment 2 inverse slope | PABSI2 |
| LDSCFG(3) | LDDATA4(5:0) | [6] | Segment 3 configuration | PABSCFG |
| LDSYXN(3) | LDDATA3(27:0) | TC[13.15] | Segment 3 Y-on-next-X | PABSYXN3 |
| LDSXYN(3) | LDDATA3(15:0) | TC[1.15] | Segment 3 X-on-next-Y | PABSXYN3 |
| LDSS(3) | LDDATA1(26:0) | TC[12.15] | Segment 3 slope | PABSS3 |
| LDSI(3) | LDDATA2(15:0) | TC[1.15] | Segment 3 inverse slope | PABSI3 |
| LDSCFG(4) | LDDATA7 | [1] | Antialiasing enable | PABSCFG4 |

FIG. 24C

| Bit | Function |
|---|---|
| 5 | Valid bit. If 0, the segment does not exist in the polygon or it is vertical. |
| 4 | Sign bit. This bit is 1 for segments that form the top portion of the polygon. |
| 3-2 | Left vertex register. Indicates whether the segment's left vertex is P0, P1, P2, or P3. |
| 1-0 | Right vertex register. Indicates whether the segment's right vertex is P0, P1, P2, or P3. |

FIG. 24D

| Output Name | Numeric Format | Description |
|---|---|---|
| PBCX(12:0) | [13] | Current Slice Integer X-coordinate |
| PBCXD5(9:0) | [10] | Current Slice Output X-coordinate adjusted for blender |
| PBXCNT0(12:0) | TC[13] | Current Relative X value along Segment 0 |
| PBXCNT1(12:0) | TC[13] | Current Relative X value along Segment 1 |
| PBXCNT2(12:0) | TC[13] | Current Relative X value along Segment 2 |
| PBXCNT3(12:0) | TC[13] | Current Relative X value along Segment 3 |
| PBXNXT0(12:0) | TC[13] | Next Relative X value along Segment 0 |
| PBXNXT1(12:0) | TC[13] | Next Relative X value along Segment 1 |
| PBXNXT2(12:0) | TC[13] | Next Relative X value along Segment 2 |
| PBXNXT3(12:0) | TC[13] | Next Relative X value along Segment 3 |
| PBCSCFG4 | [1] | The registered value of PABSCFG4 (anti-alias on/off) |
| PBCCBX(12:0) | TC[13] | Integer X-coordinate of Vertex 0 (PABVX0) |
| PBCCBY(12:0) | TC[13] | Integer Y-coordinate of Vertex 0 (PABVY0) |

FIG. 25

| Output Name | Numeric Format | Description |
|---|---|---|
| PBCSCFG(3:0) | [4] | Segment configuration output |
| PBCSX0(14:0) | [0.15] | Span left X offset |
| PBCSX1(14:0) | [0.15] | Span right X offset (a value of 0.0 means 1.0) |
| PBCSYX0(14:0) | [0.15] | Span lower Y-intercept |
| PBCSYX1(14:0) | [0.15] | Span upper Y-intercept (a value of 0.0 means 1.0) |
| PBCSC0(12:0) | [13] | Y count to first valid pixel for the segment |
| PBCSC1(12:0) | [13] | Y count to last valid pixel for the segment |
| PBCSXYN(15:0) | [1.15] | X-intercept with first horizontal pixel boundary |
| PBCSI(16:0) | TC[2.15] | Segment inverse slope |

FIG. 26B

| Bit | Function |
|---|---|
| 3 | Segment valid for current span |
| 2 | Area sign bit (upper/lower boundary indicator) |
| 1-0 | Segment Unit Status<br>00 - working<br>01 - invalid (vertical)<br>10 - working and Y quantities valid<br>11 - X and Y quantities valid |

FIG. 26C

| Output Name | Numeric Format | Description |
|---|---|---|
| FTHORN | [1] | Firethorn/Camelia mode select bit |
| PBXCNT0(12:0) | TC[13] | Positional relationship between current span and VX0 |
| PBXCNT1(12:0) | TC[13] | Positional relationship between current span and VX1 |
| PBXCNT2(12:0) | TC[13] | Positional relationship between current span and VX2 |
| PBXCNT3(12:0) | TC[13] | Positional relationship between current span and VX3 |
| PBXNXT0(12:0) | TC[13] | Next PBXCNT0 value |
| PBXNXT1(12:0) | TC[13] | Next PBXCNT1 value |
| PBXNXT2(12:0) | TC[13] | Next PBXCNT2 value |
| PBXNXT3(12:0) | TC[13] | Next PBXCNT3 value |
| PABVX0(27:0) | TC[13.15] | Vertex 0 X-coordinate |
| PABVX1(27:0) | TC[13.15] | Vertex 1 X-coordinate |
| PABVX2(27:0) | TC[13.15] | Vertex 2 X-coordinate |
| PABVX3(27:0) | TC[13.15] | Vertex 3 X-coordinate |
| PABVY0(27:0) | TC[13.15] | Vertex 0 Y-coordinate |
| PABVY1(27:0) | TC[13.15] | Vertex 1 Y-coordinate |
| PABVY2(27:0) | TC[13.15] | Vertex 2 Y-coordinate |
| PABVY3(27:0) | TC[13.15] | Vertex 3 Y-coordinate |
| PABSCFG(5:0) | [6] | Segment configuration register |
| PABSYXN(27:0) | TC[13.15] | Y-on-next-X-integer intercept |
| PABSXYN(27:0) | TC[13.15] | X-on-next-Y-integer intercept |
| PABSS(27:0) | TC[13.15] | Segment slope |
| PABSI(27:0) | TC[13.15] | Segment inverse slope |
| PBCY(12:0) | [13] | Y integer translation from PBCTL |
| PBCX(12:0) | [13] | X integer translation from PBCTL |
| PBADJ | [1] | Y translate enable bit from PBCTL |

FIG. 26A

| Segment | Left Vertex | Right Vertex |
|---|---|---|
| S0 | P0 | P1 |
| S1 | P1, P2 | P2, P1 |
| S2 | P0, P3 | P2 |
| S3 | P0 | P3 |

FIG. 26E

| Output Name | Numeric Format | Description |
|---|---|---|
| PBCSCFG4 | [1] | Anti-alias on/off |
| PBCSCFG3(2:1) | [2] | Segment 3 configuration |
| PBCSCFG2(2:1) | [2] | Segment 2 configuration |
| PBCSCFG1(2:1) | [2] | Segment 1 configuration |
| PBCSCFG0(2:1) | [2] | Segment 0 configuration |
| PBCSX03(14:0) | [0.15] | Segment 3 left X offset |
| PBCSX02(14:0) | [0.15] | Segment 2 left X offset |
| PBCSX01(14:0) | [0.15] | Segment 1 left X offset |
| PBCSX00(14:0) | [0.15] | Segment 0 left X offset |
| PBCSX13(14:0) | [0.15] | Segment 3 right X offset |
| PBCSX12(14:0) | [0.15] | Segment 2 right X offset |
| PBCSX11(14:0) | [0.15] | Segment 1 right X offset |
| PBCSX10(14:0) | [0.15] | Segment 0 right X offset |
| PBCSYX03(14:0) | [0.15] | Segment 3 lower Y-intercept with the X offset axis |
| PBCSYX02(14:0) | [0.15] | Segment 2 lower Y-intercept with the X offset axis |
| PBCSYX01(14:0) | [0.15] | Segment 1 lower Y-intercept with the X offset axis |
| PBCSYX00(14:0) | [0.15] | Segment 0 lower Y-intercept with the X offset axis |
| PBCSYX13(14:0) | [0.15] | Segment 3 upper Y-intercept with the X offset axis |
| PBCSYX12(14:0) | [0.15] | Segment 2 upper Y-intercept with the X offset axis |
| PBCSYX11(14:0) | [0.15] | Segment 1 upper Y-intercept with the X offset axis |
| PBCSYX10(14:0) | [0.15] | Segment 0 upper Y-intercept with the X offset axis |
| PBCSC03(12:0) | [13] | Y count to first valid pixel for segment 3 |
| PBCSC02(12:0) | [13] | Y count to first valid pixel for segment 2 |
| PBCSC01(12:0) | [13] | Y count to first valid pixel for segment 1 |
| PBCSC00(12:0) | [13] | Y count to first valid pixel for segment 0 |
| PBCSC13(12:0) | [13] | Y count to last valid pixel for segment 3 |
| PBCSC12(12:0) | [13] | Y count to last valid pixel for segment 2 |
| PBCSC11(12:0) | [13] | Y count to last valid pixel for segment 1 |
| PBCSC10(12:0) | [13] | Y count to last valid pixel for segment 0 |
| PBCSXYN3(15:0) | [1.15] | Segment 3 X-intercept with horizontal pixel boundary |
| PBCSXYN2(15:0) | [1.15] | Segment 2 X-intercept with horizontal pixel boundary |
| PBCSXYN1(15:0) | [1.15] | Segment 1 X-intercept with horizontal pixel boundary |
| PBCSXYN0(15:0) | [1.15] | Segment 0 X-intercept with horizontal pixel boundary |
| PBCSI3(16:0) | TC[2.15] | Segment 3 inverse slope |
| PBCSI2(16:0) | TC[2.15] | Segment 2 inverse slope |
| PBCSI1(16:0) | TC[2.15] | Segment 1 inverse slope |
| PBCSI0(16:0) | TC[2.15] | Segment 0 inverse slope |

FIG. 26D

```
if (PBXCNTL = 0) then
    PBCSX0 <= frac(PABVXL);
else
    PBCSX0 <= 0;
end if;
if (PBXCNTR = 0) then
    PBCSX1 <= frac(PABVXR);
else
    PBCSX1 <= 0;       -- 0.0 means 1.0 for this signal
end if;
```
FIG. 27A
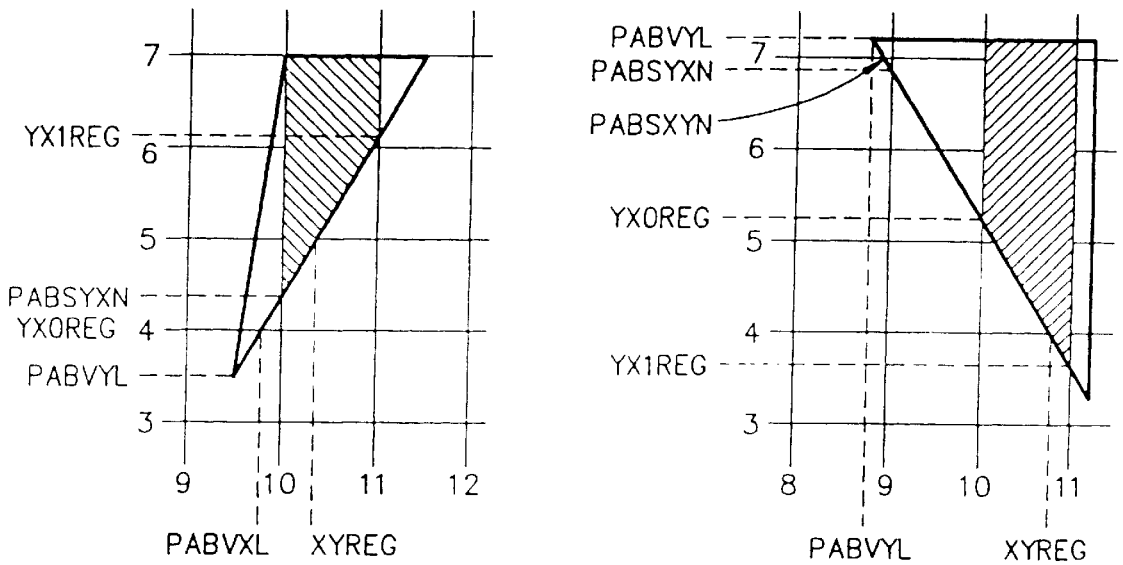
FIG. 27B
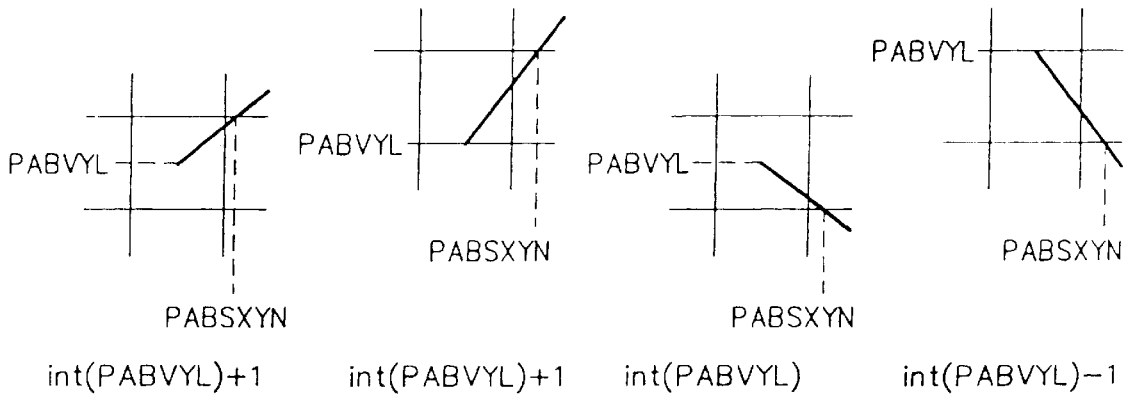
FIG. 27C

```
for (;;)
{
  a = 0.0;
  if S[0], S[1], S[2], and S[3] are all invalid or below this pixel
    advance to the next span;
  else
    for (i=0; i<4; i++)
    {
      if S[i] is invalid or above this pixel
        ;
      else
        if S[i] is below current pixel
          if S[i] is a lower polygon boundary
            a+=S[i].x1-S[i].x0;
          else
            a-=S[i].x1-S[i].x0;
        else
          switch (S[i].edge0_1)
          {
            case LEFT_RIGHT:
            case RIGHT_LEFT:
              if S[i] is a lower polygon boundary
                a+=0.5*(S[i].x1-S[i].x0)*((1.0-S[i].i0)+(1.0-S[i].i1));
              else
                a-=0.5*(S[i].x1-S[i].x0)*((1.0-S[i].i0)+(1.0-S[i].i1));
              break;
            case LEFT_TOP:
              if S[i] is a lower polygon boundary
                a+=0.5*(1.0-S[i].i0)*(S[i].i1-S[i].x0);
              else
                a-=0.5*(1.0-S[i].i0)*(S[i].i1-S[i].x0);
              break;
            case BOTTOM_LEFT:
              if S[i] is a lower polygon boundary
                a+=(S[i].x1-S[i].x0)-(0.5*(S[i].i0-S[i].x0)*S[i].i1);
              else
                a-=(S[i].x1-S[i].x0)-(0.5*(S[i].i0-S[i].x0)*S[i].i1);
              break;
            case BOTTOM_RIGHT:
              if S[i] is a lower polygon boundary
                a+=(S[i].x1-S[i].x0)-(0.5*(S[i].x1-S[i].i0)*S[i].i1);
              else
```

FIG. 29A

```
        a-=(S[i].x1-S[i].x0)-(0.5*S[i].x1-S[i].i0)*S[i].i1);
      break;
    case BOTTOM_TOP:
      if S[i] slants to the left
        if S[i] is a lower polygon boundary
          a+=0.5*((S[i].x1-S[i].i0)+(S[i].x1-S[i].i1));
        else
          a-=0.5*((S[i].x1-S[i].i0)+(S[i].x1-S[i].i1));
      else
        if S[i] is a lower polygon boundary
          a+=0.5*((S[i].i0-S[i].x0)+(S[i].i1-S[i].x0));
        else
          a-=0.5*((S[i].i0-S[i].x0)+(S[i].i1-S[i].x0));
      break;
    case RIGHT_TOP:
      if S[i] is a lower polygon boundary
        a+=0.5*(1.0-S[i].i0)*(S[i].x1-S[i].i1);
      else
        a-=0.5*(1.0-S[i].i0)*(S[i].x1-S[i].i1);
      break;
    default:
      fprintf(stderr,"Illegal case at line %d!\n",__LINE__);
      exit(-1);
    }
  }
}
```

FIG. 29B

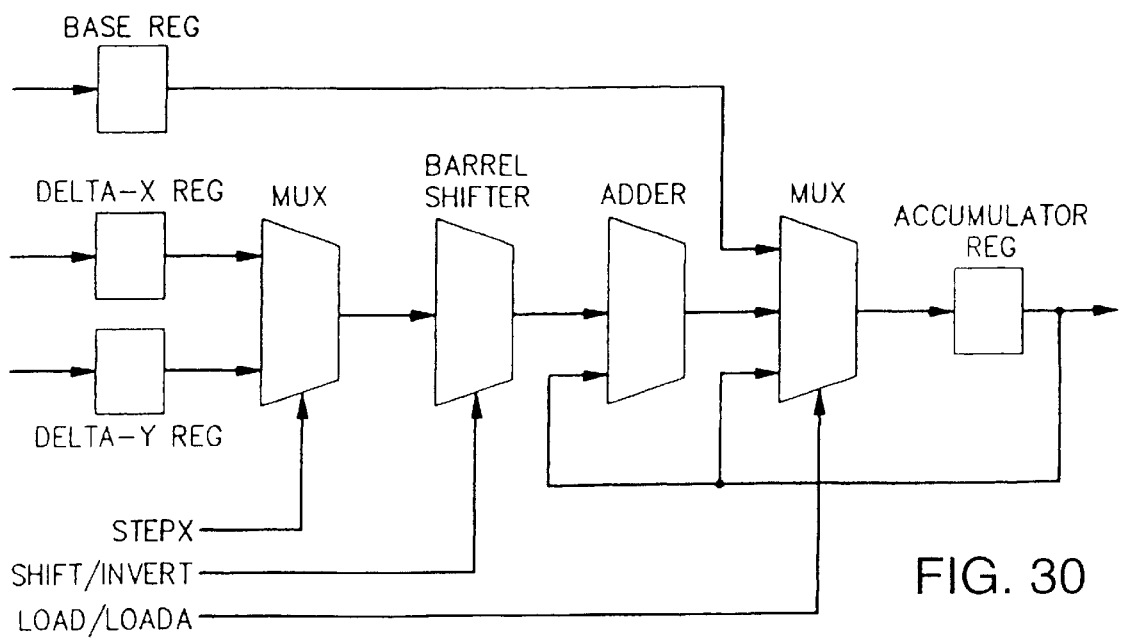

FIG. 30

METHOD AND APPARATUS FOR RENDERING OF FRACTIONAL PIXEL LISTS FOR ANTI-ALIASING AND TRANSPARENCY

This is a continuation of application Ser. No. 08/069,180, filed on May 28, 1993, now abandoned.

BACKGROUND OF THE INVENTION

1. Field of the Invention

This invention relates generally to graphical data rendering apparatus and, more specifically to a fast hardware processor for pixel blending and anti-aliasing via area calculation and pixel blending.

2. Discussion of the Related Art

Traditional three-dimensional graphics workstations include simplistic scan conversion hardware that samples points, lines and polygons with a single infinitely-small sample pixel. As a result, the renderings of these graphical primitives show aliasing artifacts. Although increasing monitor pixel density has reduced aliasing effects somewhat, the increase use of motion in modern high-speed workstations has offset this improved aliasing. So the problem of aliasing remains troublesome in all workstation image rendering processors.

Practitioners in the art using contemporary workstations have attempted to solve the aliasing problem using a variety of techniques. Several offer machines that compute proper pixel coverage for points and lines. One example is the accumulation buffer technique proposed by Paul Haeberli, et al ("The Accumulation Buffer: Hardware Support For A High-Quality Rendering", *ACM Computer Graphics*, Vol. 24, No. 4, pp. 309–318, August 1990). Haeberli, et al propose a polygon anti-aliasing solution that is compatible with existing scan conversion systems while offering high quality and smooth performance/quality tradeoff in lower performance workstation systems. In this technique, the entire image is redrawn into pixel memory many times. Each drawing of the image uses slightly different screen positioning values. The images are averaged in an accumulation buffer to produce a final image, which exhibits anti-aliased properties. The technique is good for points, lines and polygons. It allows simple transparency and can be used for other special effects but is inefficient because it requires multiple drawings.

Loren Carpenter ("The A-Buffer And Anti-Aliased Hidden Surface Method", *ACM Computer Graphics*, Vol. 18, No. 3, pp. 103–108, July 1984) introduced the A-buffer anti-aliased, area-averaged accumulation buffer technique. The A-buffer is a relatively uncomplicated anti-aliasing mechanism designed to process the vast majority of pixels with minimum effort and maximum precision, spending compute time only on exceptional cases. Accordingly, the fragment intersection approximations used in the technique can run into problems if several surfaces intersect in the same pixel. Also, polygons smaller than bit mask spacing are not properly sampled.

Other practitioners have pursued the approximation table concept introduced by J. Trueblood, et al ("An Efficient Anti-Aliasing Software Algorithm", *Society For Information Display International Symposium, San Diego, Session 19, Digest of Technical Papers*, Vol. 17, pp. 348–351, May 6–8, 1986). Trueblood, et al propose a software anti-aliasing algorithm that exploits an optical illusion. By controlling the relative intensity of two adjacent pixels, the human eye integrates the light, giving the impression of a single spot whose center is offset toward the brighter of two spots, and whose intensity is equal to the sum of the intensities of the two spots. These sort of anti-aliasing techniques have been used primarily for line and point drawing. The position and orientation relative to the pixel is used to index to a table of elimination values. The value represents the brightness of the line through the pixel. Multiple lines contributing to a pixel are accumulated until a maximum brightness level is obtained. Unfortunately, this brightness approximation technique fails for polygons and does not support transparency.

The problem of correctly sampling, and thus anti-aliasing polygons has been solved many times in many ways. However, the most obvious trend in high-performance workstation graphics processors is toward the capability of rendering many small polygons per second. Recent machines can handle over one million RGB lighted, Gourad-shaded, Z-buffered, connected triangles per second. A second trend is toward improved sampling quality.

These are counter productive trends. Traditional workstation scan conversion system take many shortcuts in arithmetic processing to support the volume of polygon throughput. These shortcuts preclude any sophisticated techniques for eliminating aliasing artifacts arising from non-subpixel positioning (after transformation, vertex coordinates are rounded to the nearest pixel location in an integer screen space), Bresenham sampling (pixels are included in the scan conversion of a polygon based on arithmetic appropriate for a line fill instead of for an area sampling) and sloppy iteration (insufficient accuracy is maintained during edge iteration and the slopes and initial parameter values are not corrected for subpixel locations of vertexes, spans or scans). Although an accurate polygon sampling architecture was introduced as early as 1985 by Henry Fuchs, et al ("Fast Spheres, Shadows, Textures, Transparencies and Image Enhancements in Pixel-Planes", *ACM Computer Graphics*, Vol. 19, No. 3, pp. 111–120, July 1985), most high-speed graphics processors only recently acquired the processing power correctly address all three of these problems.

Many other practitioners have suggested solutions to the aliasing problem. For instance, in U.S. Pat. No. 5,142,273, Wobermin discloses a symbol generator that blends color through the use of a vertical color blending list representing pixel overlays. Also, in U.S. Pat. No. 5,153,937, Wobermin, et al disclose a similar system for generating anti-aliased video signals. Moreover, in U.S. Pat. No. 5,175,809, Wobermin, et al disclose a pipelined processor employing the pixel sorting and color overlay methods of their earlier disclosures. The pipelining scheme gains the necessary processing power for techniques that would otherwise be too inefficient for rendering applications.

In U.S. Pat. No. 4,930,091, Brian D. Schroeder, et al disclose a triangle classification scheme for three-dimensional graphics display systems that permits automatic disposition of primitive triangle inputs to the rendering engine of a graphics processor. Schroeder, et al use a lookup table to prescreen incoming triangles after computing triangle parameters from the incoming vertexes. The preprocessing frees later processing power.

In U.S. Pat. No. 5,138,699, Barry L. Minor, et al disclose a hardware color interpolator that uses a ray-tracing method for interpolating color value for pixels lying in an area between previously color-imaged pixels. Minor does not consider how to improve processing power and margins.

In U.S. Pat. No. 4,885,688, Carl R. Crawford discloses a system for displaying three-dimensional surface structures using pixel data interpolation. Also, in U.S. Pat. No. 5,070,465, Tetsuro Kato, et al disclose a video image transforming method and apparatus that uses rectangular primitives and interpolates on the resulting triangular sections. Similarly, in U.S. Pat. No. 5,109,481, Olin G. Lathrop, et al disclose a quadratic interpolation technique for shaded image generation that uses quadratic shading based on vertex interpolation in triangular primitives. Finally, in U.S. Pat. No. 5,123,085, Stuart C. Wells, et al disclose a method and apparatus for rendering anti-aliased polygons that relies on a single pass scan conversion process where the pixels at the edges and vertices of the polygon are first determined from the polygon vertex data. Wells, et al accumulate the image at a pixel from the subpixel values associated with each subsequent primitive by compositing each incoming contribution. Through their method, the polygons can be rendered with minimal aliasing without performing the time-consuming process of polygon sorting Z-depth order prior to compositing. Wells, et al do not teach geometric pixel coverage area calculations and their apparatus is limited to a single-layer frame buffer for storing rendered graphics data. The single layer frame buffer prevents effective integration of pixel contributions from multiple polygons and requires time-consuming sorting procedures to support transparency rendering. All of these practitioners strive to push back the processing efficiency boundaries that limit the art.

Other practitioners have proposed improved techniques for rendering the image at each pixel. For instance, in U.S. Pat. No. 4,679,040, Johnson K. Yan discloses a system having a signal modifier circuit for applying a predetermined intensity modification factor to any area not already frozen. Thus, Yan's technique permits the display of areas behind a translucent area having reduced intensity.

In U.S. Pat. No. 4,945,500, Michael F. Deering discloses a triangle processor for three-dimensional graphics display system that compares each pixel during a scan to the polygon to determine whether the pixel is within the polygon. Deering then stores the pixel data according to its relative Z-position and suggests a pipelined procedure for enhanced efficiency in hardware. He reverses the normal polygon overlay process by using "polygon processors" instead of "scan line" pixel processors.

In U.S. Pat. No. 5,142,617, John C. Dalrymple, et al discloses a method and apparatus for tiling a display area defined by lines joining vertexes with a surface normal vector associated with each vertex. Their display area is subdivided into sub-display areas by calculating additional vertexes and surface normal vectors through interpolation. A given sub-display area is rendered by calculating intensity values at its vertexes and tiling its area by linear interpolation of the calculated vertex intensity values.

In U.S. Pat. No. 5,179,638, John F. Dawson, et al discloses a method and apparatus for generating a texture-mapped perspective view that relies on planar polygon vertex interpolation. Thus, anti-aliasing can be accomplished by blurring the portrayal of each polygon edge just enough to reduce the appearance of the "stairstep" aliasing effect but not enough to make the line appear actually fuzzy.

Other schemes attempt to reduce aliasing by weighting the edge-effect on a pixel by the distance of the edge from the geometric center of the pixel so that the color of a polygon edge close to pixel center dominates the pixel. If the edge merely grazes the pixel, then the edge color only minimally affects the pixel color. Also, it is known to compute the contributions of the line or edge on an imaginary set of subpixels having a finer resolution than the actual screen pixel and then rendering the image by accumulating the contributions of the subpixels associated with each actual pixel. The problem of transparency is also pursued by many in the rendering art. Past solutions proposed for the transparency problem include the screen door technique, which is the simplest method in use. A mask is used to select some of the pixels in an object as present and others as missing. It is similar to the screening technique used to print pictures in newspapers. The result appears quite crude on a computer screen. Also, the sorting Z-list technique has been proposed by practitioners in the art for transparency rendering. The primitive objects are first divided into two lists: opaque and transparent. The opaque objects are rendered, usually using a Z-buffer to determine their visibility. The transparent objects are then sorted by distance from the view point and rendered. This technique results in reasonably good images but the separation and sorting operation are very inefficient and slow.

The multipass technique is also useful for transparency rendering although it is primarily used with accumulation buffer rendering techniques described above. An object that is 50% transparent is rendered as opaque in half of the drawings and transparent in the other half, with the final averaged drawing showing a 50% transparent object. The multipass method is slow because of the requirement for multiple drawings and the types of transparency are limited. Only discrete fractional transparency values can be rendered, although increasing the number of passes permits a refined transparency specification at the expense of even slower rendering. The interpolation of transparency values across a polygon is not permitted with this method.

Despite the existence of many sophisticated rendering techniques, most workstation rendering processes are limited to simple methods employing many shortcuts because of limited processing power. Thus, the issue of anti-aliasing requires attention to the precise hardware processing implementation as well as the more general image transformation algorithms and procedures.

Accordingly, the deficiencies and shortcomings of graphic rendering processing techniques are clearly-felt in the art. Specifically, there are clearly-felt needs for methods permitting high-speed hardware implementation of selected combinations of the more sophisticated and computationally intensive anti-aliasing techniques known in the art. Several of these unresolved problems and deficiencies are solved by this invention in the manner described below.

SUMMARY OF THE INVENTION

The method of this invention, implemented in hardware, returns to first principles by computing the overlap of each edge with every pixel using standard geometrical formulations. To make the area calculation manageable, each polygon is sliced into horizontal and vertical bands to reduce all complex area calculations into rectangles, triangles and trapezoids. The method of this inventions involves the sequential steps illustrated in FIGS. 1–5 attached.

In FIG. 1, the triangle or polygon is established and the associated pixels identified. Points are expanded from mathematical abstractions of zero size to small polygons covering slightly more than a pixel centered at the subpixel location of the point. Lines are expanded from zero width abstractions to long thin rectangular polygons using the subpixel locations of the end points. Polygon vertices are ordered in counterclockwise (CCW) order starting with the vertex having the minimum image parameter value. The pixel boundaries are shown in FIG. 1 as dotted lines. The slope of each polygon edge is calculated for each desired image parameter and the linear interpolation coefficients are then calculated for all desired image parameters (FIG. 6).

FIG. 2 shows the triangle from FIG. 1 "sliced" along the vertical pixel boundaries into scan lines. The image parameter values for the first pixel on each scan line are then calculated. In FIG. 3, the scan line sections are "diced" into single pixels and the area of each partially covered pixel is calculated. Depending on the geometry of the edges passing through each pixel., various additions and subtractions are sufficient to calculate the partial pixel area coverage. Each of the covered areas is either a triangle, a rectangle, or a trapezoid, so that the computations are relatively simple.

FIG. 4 shows a typical partially-covered pixel. The area is that of a rectangle minus a triangle. FIG. 5 shows a complex coverage computation requiring three separate area calculations. Each of the seven desired image parameters is computed at each pixel by adding the contribution from each image component, which is equal to the ratio of the pixel area covered by such component divided by the entire pixel area.

The final display image is obtained by blending the contributions from a plurality of different component polygons at each pixel. The contributions generated by the "dicing" step are referred to as "pixlinks". Each pixlink from the dicer is linked to a data object containing a separate value for seven image parameters. A single pixlink may cover all or part of a pixel. Several pixlinks may contribute to a single pixel. Each pixlink from the dicer is processed independently and the result of this processing is blended into a composite image parameter.

For instance, the "distance" of the image from the viewer (Z) is compared and the nearer contributions are blended over the farther contributions in the order of their distance from the viewer. Also, when the nearer pixlink area value indicates complete coverage, the color of that top pixlink is assigned to the pixel. If the upper pixlink does not completely cover the pixel, then the color is blended with the pixlink colors from a lower pixlink. This mixture of colors is proportional to the area coverage of the upper and lower pixlinks. If there are more than two pixlinks contributing to a single pixel, these contributions are blended from top to bottom until complete coverage of the pixel is obtained. Other image parameters such as patterns, intensity, and the like are similarly blended.

More than one polygon or edge may be present at any pixel. This actually occurs quite often, such as when lines are drawn over other lines or polygons, or when an object is visible behind a polygon edge. Also, for transparent images, a single pixel may often represent both a nearer transparent object and farther opaque one. The effects of these different pixel contributions must be combined.

In the prior art, the antialiasing of edges over farther objects and transparency both required sorting of objects according to distance from the viewer to the object. In this method of inventions, the combination of multiple contributions is accomplished at each pixel by using a list data object to store the image parameter contributions for the various associated polygons. Thus, for the image parameter of color, when a polygon contributes to the pixel color, the polygon's distance from the view is used to find its place in the list. The advantage of this invention is that all such polygons can be presented to the system in any order and no sorting operation is necessary. Additionally, this invention provides proper edge antialiasing against objects farther from the viewer.

The list data object is maintained in order of distance from the viewer. The list is structured to allow insertion of new elements at any point in the list. A list is maintained for each pixel in the display. Totally covered, and therefore nonvisible, objects are pruned from the list as it is built. Thus, no sorting process is necessary. This invention provides a significant savings in processing time when large images are made up of large numbers of small polygons.

Finally, the system of this invention is entirely embodied in hardware. This is possible through the introduction of command pipelining and the use of a single state machine for process control. It is an object and an advantage of this invention that the combination of sub-pixel slicing and dicing and pixlink blending techniques can be embodied in hardware to gain the processing power of hardware execution.

The foregoing, together with other objects features and advantages of this invention will become are apparently when referring to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, wherein:

FIG. 6 provides the plane equation formulation for the image parameters as used in the system of this invention;

FIG. 7 illustrates the workstation graphics processor suitable for application of the method of this invention;

FIG. 8 shows a functional block diagram of the rendering pipeline of this invention;

FIG. 11, comprising FIGS. 11A–11B, provides block diagrams showing the Frame Buffer Memory of this invention;

FIG. 15 provides a table of the Two-Hot State Encoding parameters used in the state machine of this invention;

FIG. 17 illustrates the X-on-next-Y formulas used in the rendering ASIC of this invention;

FIG. 18 illustrates the Y-on-next-X formulas used in the Rendering ASIC of this invention;

FIG. 21, comprising

FIG. 22, comprising FIGS. 22A–22C, illustrates the point and line intercept procedures of this invention;

FIG. 23, comprising FIGS. 23A–23B, illustrates the triangle intercept procedure of this invention; FIG. 24, comprising FIGS. 24A–24D, describes features of the Polygon Processing Unit (PIXGENA) of the Pixel Generation Unit of this invention;

FIG. 25 describes features of the Span Counter Unit (PBCNT) of the Span Processor Unit (PIXGENB) of the Pixel Generator Unit of this invention;

FIG. 26, comprising FIGS. 26A–26E, describes features of the Segment Unit (PBSEG) of the Span Processor Unit (PIXGENBEN) of the Pixel Generator Unit of this invention;

FIG. 27, comprising FIGS. 27A–27C, illustrate the calculation procedures employed by the Segment Unit (PBSEG) of the Span Processing Unit (PIXGENBEN) of the Pixel Generator Unit of this invention;

FIG. 28, comprising

FIG. 29 provides the pseudocode employed by the Area Calculator element of the Pixel Processor Unit (PIXGENC) of the Pixel Generator Unit of this invention;

FIG. 30 provides a functional block diagram of the Color Interpolation element of the Pixel Processing Unit (PIXGENC) of the Pixel Generator Unit of this invention.

DETAILED DESCRIPTION OF THE PREFERRED EMBODIMENTS

Rendering System Performance Summary

Figure 1:
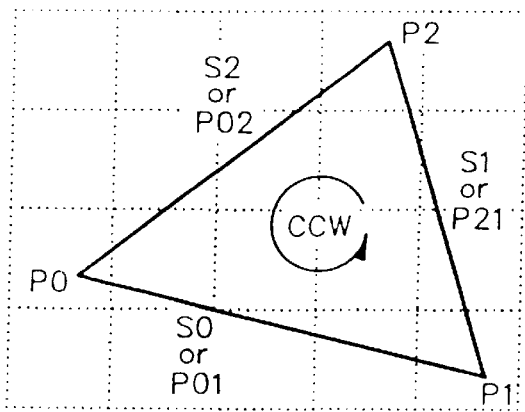
FIG. 1 illustrates the primitive triangle nomenclature of this invention.

The rendering system of this invention provides the following performance. Points, lines, and polygons are antialiased. The system is primarily operated with antialiasing enabled. Standard resolution is 1280×1024. Optional resolution is 2048×2048. Virtual image resolution is at least 8 times the physical resolution (i.e. 10240×8192 for a 1280×1024 system). Color is full 24 bit RGB. The display signal is suitable for a standard color monitor.

Points, line endpoints, and polygon vertices are positioned to an accuracy of at least $\frac{1}{8}$ of a pixel. The background may be any color and need not be black. Line intensity does vary with display angle. Line ends are square and perpendicular to the line angle. Transparency is supported and transparent objects can be rendered in random Z order. The rendering system of this invention is implemented in hardware that fits entirely on one 9U form-factor board.

The rendering procedure of this invention is conceptually divided into three tasks:

1) The pixels covered by a primitive polygon are identified.

2) The red(R), green (G), blue (B), z-depth (Z), transparency (T), and pattern coordinate (U and V) values are determined for each of the pixels identified in the first task.

3) The pixels (with color and Z values) from the second task are combined with the pixels from previously rendered primitives.

Starting with the first coverage task, note that each primitive includes of one or more vertices. Each vertex has X, Y, Z, R, G, B, T, U and V values associated with it. The pixels can be thought of as a rectangular two-dimensional grid. The X and Y values are real numbers with both integer and fraction parts representing the locations of the primitive vertices on the pixel grid. Points are represented as square polygons covering slightly more than one pixel in area. Lines are represented by long thin rectangles extending from one endpoint to the other, with a width slightly greater than one pixel. Polygons are represented simply as the area enclosed by the vertices.

A pixel may be partially or fully covered by a primitive. Fully covered pixels are dealt with simply, partially covered pixels require more work. The area of coverage must be computed for these pixels. The first coverage task is completed when all of the pixels in the primitive have been identified and the areas of partial coverage computed.

In the second task, color and Z values for each of the pixels in the first step are computed by linearly interpolating the color and Z values of the vertices of the primitive.

In the third task, the pixels from the second step are blended with those from other primitives by use of a linked list arranged like a Z buffer. In the case of partial coverage of a pixel, multiple partial coverage contributions are stored in Z order. The contribution to a partially covered pixel by a primitive is proportional to the area of the pixel covered by the primitive. This is effectively anti-aliasing by use of a box filter.

The computer-implemented realization of the above procedure occurs in a different sequence. Task 1, identifying the pixels, and task 2, finding the values at the pixels, are combined. Task 3, blending the pixels, remains a distinct step.

The combined tasks 1 and 2 proceed as 3 subtasks:

Subtask 1A) Setup—Points are expanded from mathematical abstractions of zero size to small polygons covering slightly more than a pixel centered at the subpixel location of the point. Lines are expanded from zero width abstractions to long thin rectangular polygons using the subpixel locations of the endpoints. Polygon vertices are checked for direction (clockwise vs. counterclockwise), flipped if necessary (the hardware can only draw counterclockwise (CCW) polygons), and the minimum vertex in X is located. FIG. 1 shows a triangle with vertices, P0, P1, P2, sorted into CCW order. The pixel boundaries are drawn in dashed lines to illustrate the processing of the polygon. The setup ASIC calculates the slopes of the polygon edges. The coefficients for linear interpolation of R, G, B, Z, T, U and V are then computed. Some polygons may not require interpolation of all of these values. For example, U and V are not needed if a pattern is not being applied to the primitive. The pattern mipmap level is calculated for the primitive to which patterns are being applied.

Figure 2:
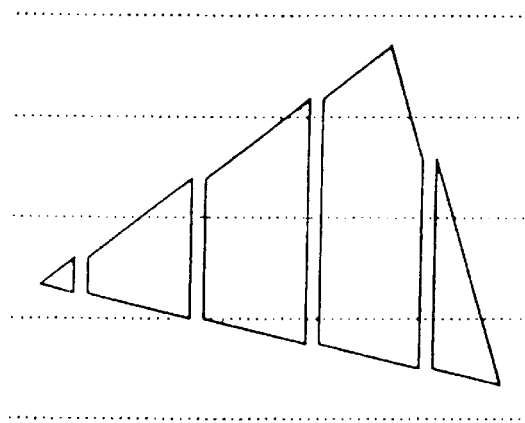
FIG. 2 illustrates the primitive triangle slicing operation of this invention.

Subtask (1B) Slicing—The polygons (all primitive are now polygons) are "sliced" on scan line boundaries. FIG. 2 shows the same triangle as FIG. 1, sliced along the vertical pixel boundaries into scan lines. The R, G, B, Z, T, U, V values for the first pixel on the scan line are calculated.

Figure 3:
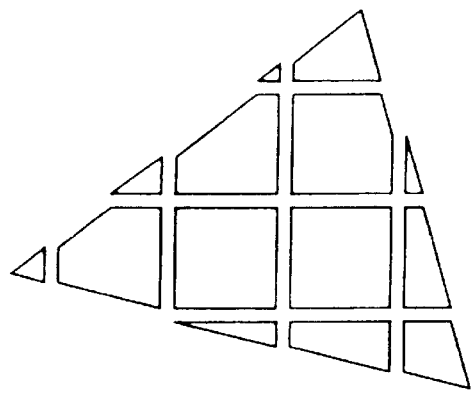
FIG. 3 illustrates the primitive triangle dicing operation of this invention.

Subtask (1C) Dicing—The scan line pieces are "diced" into single pixels and the area (A) of partially covered pixels is calculated. FIG. 3 shows the triangle cut along horizontal pixel boundaries. The area of partially covered pixels is computed. Depending upon the primitive polygon edges passing through a pixel, various additions and subtractions of area are required to calculate the pixel area coverage. Each subarea's is either a triangle, a rectangle, or a trapezoid, so the computations required are simple.

Figure 4:
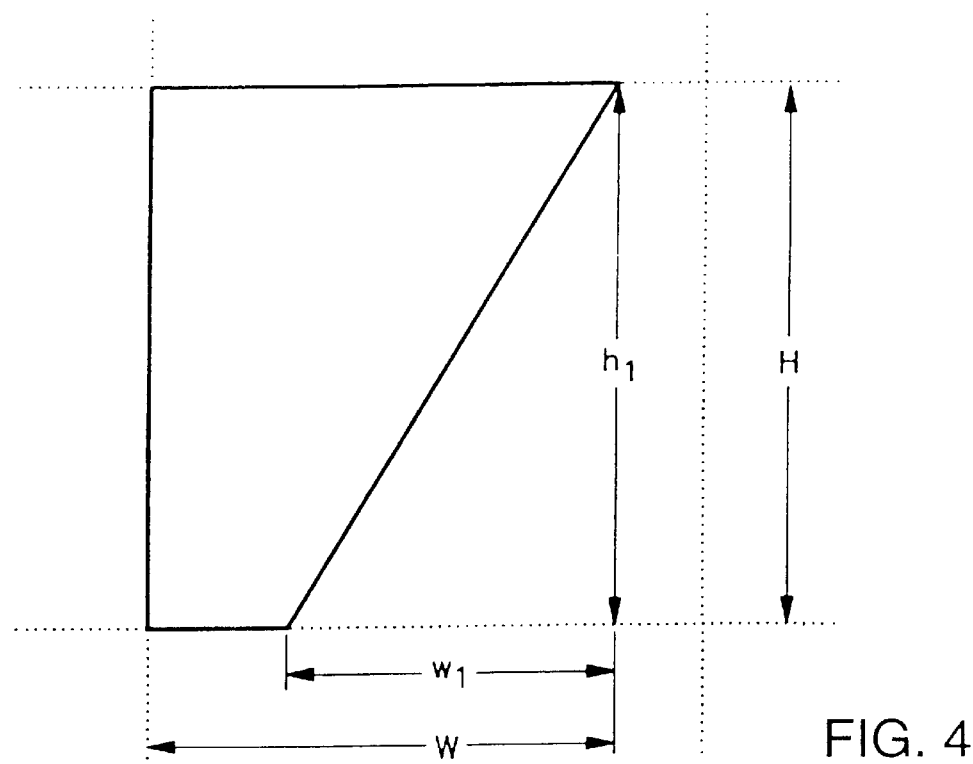
FIG. 4 illustrates the area calculation of a partially covered pixel as used in the system of this invention.
Figure 5:
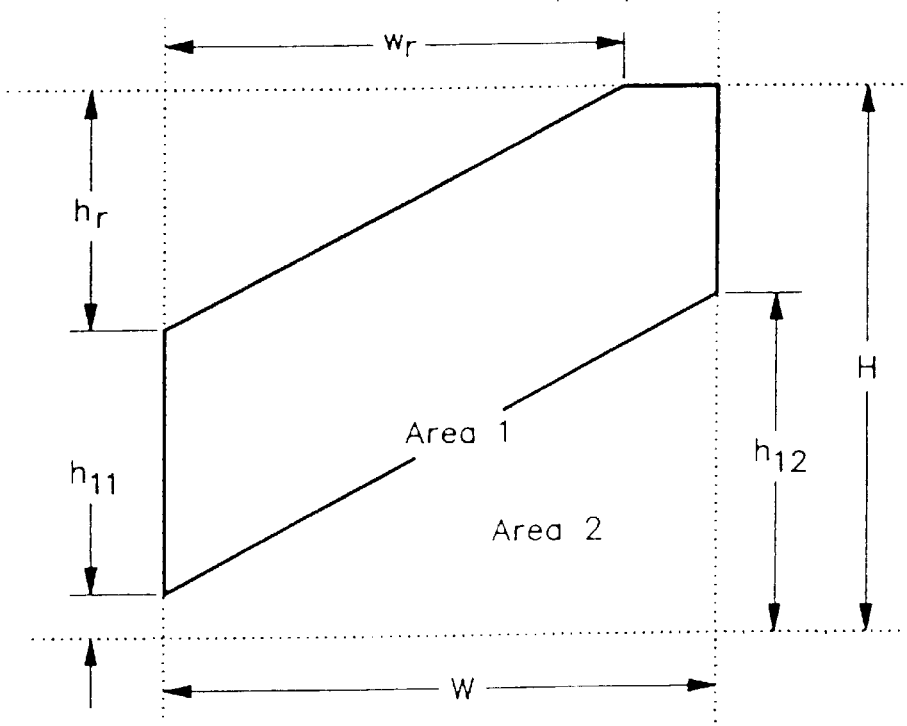
FIG. 5 illustrates a complex area calculation of a partially covered pixel as used in the system of this invention.

FIG. 4 shows an exemplary partially-covered pixel. The area is that of a rectangle (H*W) minus a triangle (hl*wl)/2. FIG. 5 shows a more complex example. Area-1 is the area under the top edge, a rectangle (H*W) minus a triangle ((hr*wr)/2). Area-2 is the area under the bottom edge, a trapezoid ((hl1+hl2) /2*W). The area of pixel coverage is Area-1 minus Area-2.

FIG. 6 describes the formulation of the plane equation which is used to interpolate the Z, R, G, B, T, U, V values between vertices. For partially transparent primitives, area (A) is multiplied by transparency (T) to produce a reduced area coverage factor (A).

Task (3) Blending—The term "pixel" is more precisely defined herein to distinguish the partially-covered elements used in the blender of this invention. A pixel is defined as the smallest discretely addressable area of the screen The final colors stored in the frame buffer and used to update the screen are also referred to as pixels. Conversely, a PIXLINK is defined as a value generated by the dicer. Each pixlink from the dicer is linked to a vector of X, Y, Z, R, G, B and A values. A pixlink may cover part or all of a pixel. Several pixlinks may contribute to a single pixel. The frame buffer may store more than one pixlink, with Z, R, G, B, and A values, at each pixel.

Each pixlink from the dicer is processed independently. The result of this processing is blended into the frame buffer. The Z value of each new pixlink is compared with the value of the top pixlink in the frame buffer. If the new Z is closer to the viewer than the old Z value then the new pixlink is "blended" over the old. Otherwise, the new pixlink is "blended" under the old pixlink. For equal Z cases, the new pixlink is "blended" under the old pixlink. When the top pixlink area value indicates complete coverage, the color of the top pixlink is used. This one condition is equivalent to a standard Z buffer procedure in the art.

When the top pixlink has an area value which indicates partial coverage of the pixel then blending is required. The resulting pixel color is a mixture of the top pixlink color blended with the underlying pixlink color. The mixture of colors is proportional to the area coverage of the top and underneath pixlinks. There may be more than two pixlinks contributing to a single pixel. In such case, the several pixlink contributions are blended from top to bottom until complete coverage of the pixel is achieved.

Patterns are applied by the blender. When patterns are enabled, the U and V pattern coordinate values from the pixlink and the mipmap level are computed by a setup procedure. These are then used to obtain eight pattern values. The pattern values are trilinearly interpolated to produce a single pattern value. This value is applied to modify the R, G, B, and A values of the pixlink. Patterns are applied before the pixlink is processed with the frame buffer.

Summary of the Hardware Embodiment

The hardware embodiment of the rendering system of this invention closely parallels the above procedural realization. It includes four different Application-Specific Integrated Circuit (ASIC) designs. Together with the frame buffer, the four ASIC's constitute the rendering pipeline of this invention.

To describe the pipeline of this invention, the PHIGS image display system hardware is now described from the top down.

The PHIGS windows display system in FIG. 7 is a graphics workstation composed of two major subsystems. The first subsystem is the CPU (a Sun SPARC) or workstation processor (WP) 20. The second is the Megatek graphics accelerator 22. Each subsystem resides in its own chassis. The subsystems are connected by cables. The rendering system of this invention is contained within graphics accelerator 22.

WP 20 is a standard CPU; it includes keyboard, color monitor, disk, etc. A workstation Interface Board (WIB) 24 occupies one slot in the WP chassis.

Graphics subsystem 22 includes a chassis with backplane (not shown) and three boards. The graphics interface board (GIB) 26 connects to WIB 24 via cables and to the other boards via the backplane. The PHIGS geometry board (PGB) 28 stores the graphics display list, traverses the display list, and transforms geometric primitives. The image generation board (IGB) 30 renders geometric primitives to build images and displays completed images on the color monitor (not shown) via an RGB cable.

The heart of the image display system in FIG. 7 is in PGB 28 and IGB 30, which together provide all the graphics functionally. PGB 28 contains the server-side Central Structure Store (CSS) and several (up to nine) Intel 80860XP microprocessors. These perform PHIGS CSS traversal, X and PHIGS geometry calculations, and additional function such as imaging. IGB 30 contains the frame buffer, off-screen storage, color lookup tables, cursor hardware, and several custom graphics chips to perform the pixel rendering primitives and video output generation procedures of this invention.

FIG. 8 shows the rendering system of this invention as it is contained within IGB board 30. IGB 30 is half of a graphics accelerator. It consists of a dedicated rendering pipeline, frame buffer and off screen memories, and video circuitry. It uses several Application Specific Integrated Circuits (ASIC) to provide very high performance. It does a limited number of things and it does them very fast. Complex tasks are broken down into simple operations for IGB 30. The IGB 30 rendering pipeline includes the five major components shown in FIG. 8.

The Setup ASIC 32 buffers vertex data, computes slopes, expands lines to specified line width, expands points to specified point size, sorts the points in triangles, and sends data to the Slicer/Dicers. IGB 30 contains two Setup ASICs. In addition to the setup operations described above, the Setup ASIC also contains a set of vertex registers. These registers act as buffers to allow loading of the vertices one at a time.

The Slicer/Dicer ASIC 34 (also denominated herein as the rendering ASIC 34) walks edges for points, lines and polygons, interpolates X, Y, Z, R, G, B, T, U, and V data into scan lines. Computes area coverage of pixels in scan lines, and passes the pixel data to the Blenders. IGB 30 contains five Slicer/Dicer ASICs.

The Blender ASIC 36 receives pixel values, including area coverage, from Slicer/Dicer, performs Z buffering and blends colors for pixels that are partially covered by multiple primitives, and does pattern mapping. IGB 30 contains ten Blender ASICS. Blender ASIC 36 provides 20-way interleaved (very fast) access to the Frame Buffer memory 38.

Frame Buffer Memory 38 stores the usual RGBZ values as well as (A) (pixel area coverage). It stores multiple sets of RGBZA values per pixel for use in anti-aliasing and transparency procedures. Frame buffer 38 is divided into twenty banks of memory.

The Mixer ASIC 40 contains the video timing and control logic. It incorporates the 7-color hardware cursor. IGB 30 contains three mixer ASICs.

The rendering system of this invention is contained in Slicer/Dicer ASIC 34, Blender ASIC 36 and Frame Buffer Memory 38.

Figure 9A:
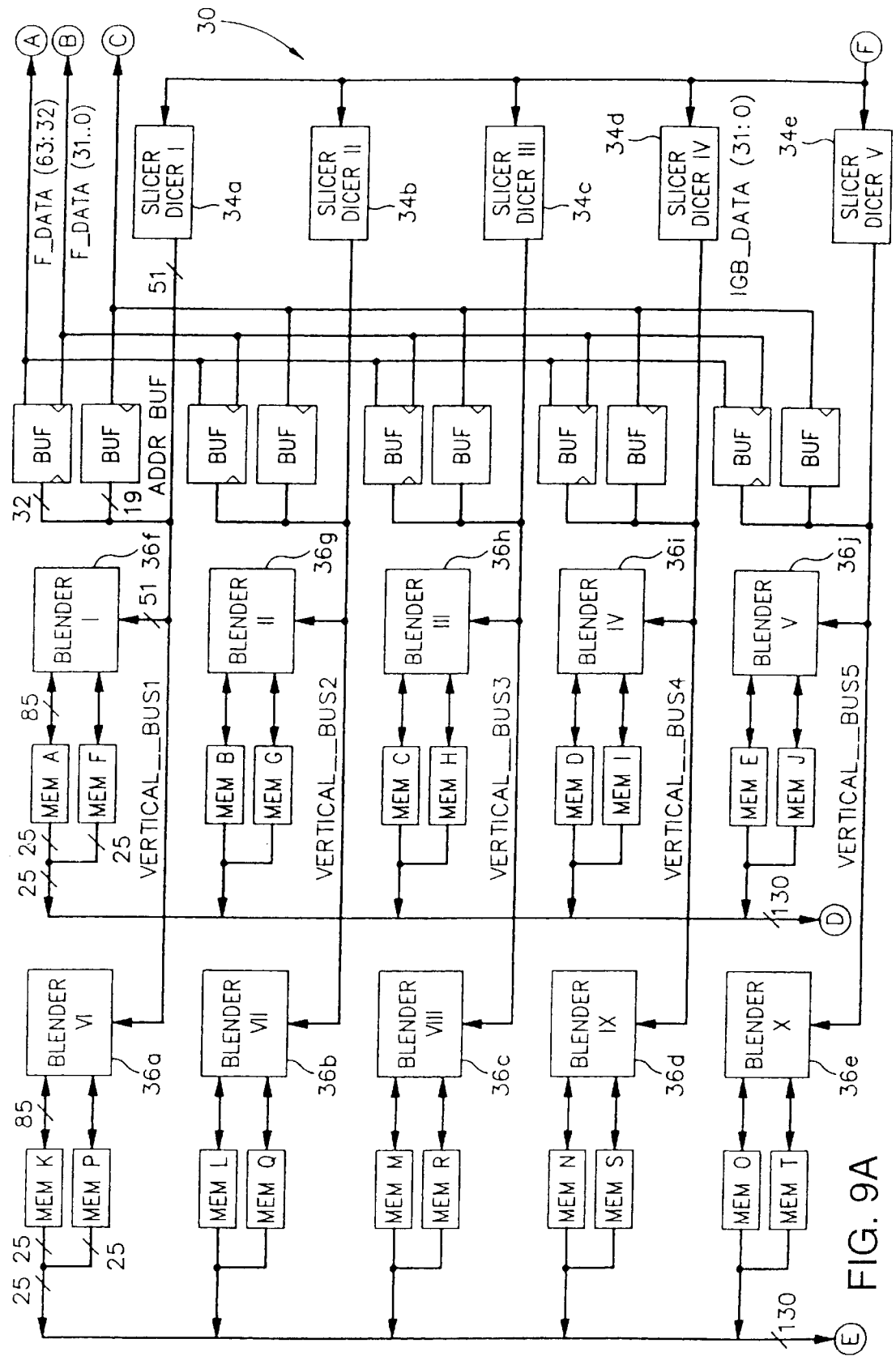
FIG. 9 provides a detailed functional block diagram of the Image Generation Board (IGB) of this invention.
Figure 10B:
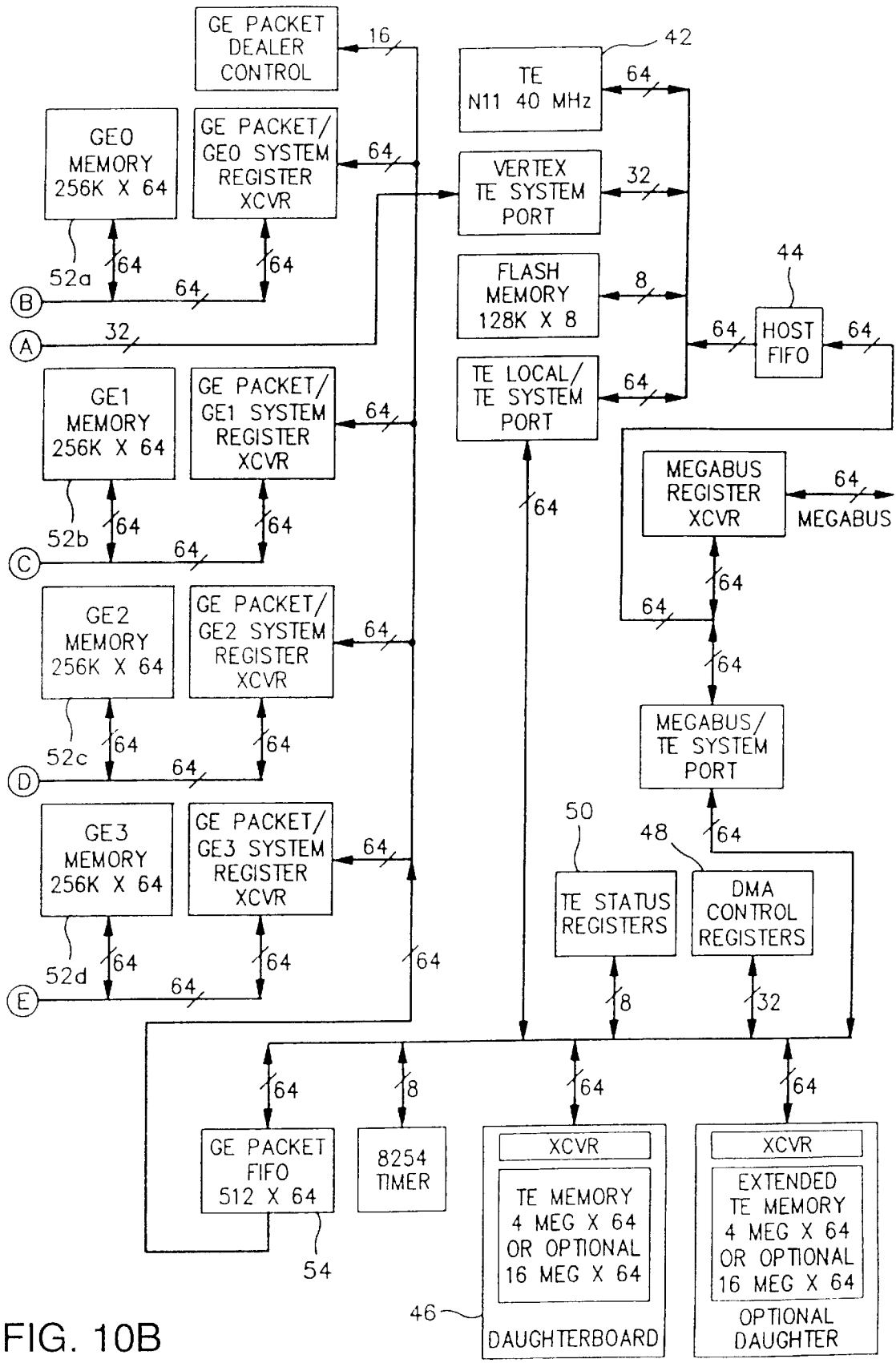
FIG. 10 provides a detailed functional block diagram of the PHIGS Geometry Board (PGB) of this invention.

FIG. 9 is a functional block diagram of IGB 30 of this invention. FIG. 10 is a functional block diagram of PGB 28 of this invention.

The PHIGS Geometry Board (PGB)

The PGB 28 is the first board in the graphics pipeline, and provides the logical interface between the WP and the rest of the graphics system. FIG. 10 shows the PGB hardware, which includes: interface to custom high performance bus, CCS management, transformation, IGB interface, timing registers, LED status indicators, Version EAROM, Boot PROM, and Workstation Processor console support.

The PGB-WP interface is via a single interface board 24 on the WP SBus. A FIFO assists WP 20 to system data flow.

Management of the server-side central structure store (CSS) includes editing and traversal. These functions are performed on PGB 28 by the Traversal Engine (TE) 42. The hardware components (FIG. 10) that are involved in CSS Management include: Workstation Processor-Traversal Engine (WP-TE) FIFO 44, Traversal Engine 42, Traversal Engine-Central Structure Store Memory 46, and Traversal Engine Direct Memory Access support 48.

PGB 28 contains a hardware WP-TE FIFO 44 between the WP 20 and TE 42. This allows passage of 32-bit commands and data from WP 20 to TW 42 without requiring WP 20 to wait until TW 42 is available to accept data from WP 20.

Traversal Engine (TE) 42 on PGB 28 is a 50 Mhz Intel 80860XP. TE 42 traverses the PHIGS server-side CSS and sends PHIGS-Windows graphics primitives, attributes, and transform values and X-Windows graphics primitives and attributes to the Geometry Engines (GES) 48. TE 42 has access to WP-TE FIFO 44, TW-CSS Memory 46, boot PROM (not shown), version EAROM (not shown), the timing register 50, GE memory 52, and Frame Buffer Memory 38. TE-CSS Memory 46 on PGB 28 contains code and data for TE 42 and the PHIGS server-side CSS, i.e., the PHIGS display list.

TE-CSS Memory 46 configuration is 32 MB or 64 MB of 4 MB parity-protected DRAM using surface-mount memory chips. The amount of TE-CSS Memory 46 available to the user is less the estimated 2 MB required to store the TE code and data and the 160 KB allocated for the Console Mailbox memory. TE-CSS Memory 46 can be accessed both from the proprietary high-performance Ibus and the TE-CSS local bus. The proprietary high-performance Ibus interface allows WP 20 to access all of TE-CSS Memory 46 to load code and data for TE 42. TE 42 uses the 80860XP Memory Management Unit (MMU) to map the portion of TE-CSS memory 46 containing the CSS data into a virtual address space. TE 42, together with a page domain process (not shown) executing on WP 20, supports a virtual CSS. Physical pages of TE-CSS memory 46 containing CSS data are swapped to and from WP 20 memory, managed by the page domain.

A DMA capability is provided to speed the transfer of data between the CSS and WP-TE FIFO 44. When TE 42 must read the instruction word and one or more arguments of an element to determine its type and size, it reads elements from the CSS and, if necessary, writes them to WP-TE FIFO 44. Once the number of words for the element that remain to be written to the WP-TE FIFO 44 is determined, TE 42 can use this DMA capability to transfer them. This mode saves TE 42 from having to both read each value from the CSS and write it to WP-TE FIFO 44. TE 42 may instead read the remaining words for the element and have them automatically written to WP-TE FIFO 44.

Several image transformation functions are performed by Intel 80860XP processors on PGB 28 in Geometry Engines 48. The hardware components involved in this transformation activity include: Traversal Engine-Geometry Engine (TE-GE) FIFO 54, Geometry Engines (GE) 48, including eight processors GE0A–GE3B, Geometry Engine Memory 52, Geometry Engine-IGB FIFO 56 for each GE processor, and Geometry Engine routing control hardware 58. These are now briefly described (FIG. 10).

Traversal Engine-Geometry Engine (TE-GE) FIFO 54 allows 64-bit commands and data to be passed from TE42 to GE 48 without requiring TE 42 to wait until GEs 48 are ready to read.

Eight Geometry Engine (GE) processors 48 perform X, PHIGS, and image transformations. Each processor 48 is an Intel 80860XP processor executing at 40 Mhz. All GE processors 48 share memory 52 containing the common code for all GEs and a private copy of the X and PHIGS data needed by each GE. This memory 52 is also accessible to WP 20 for loading GE code and data.

The GEs 48 transform X and PHIGS graphics primitives, concatenate PHIGS transforms, perform PHIGS lighting calculations, pass X and PHIGS attribute information to IGB 30, and perform complex imaging functions. Each GE 48 has access to the WP-TE FIFO 44, GE memory 52, GE-IGB FIFOs 56, TE-CSS Memory 46, boot PROM (not shown), version EAROM (not shown), timing register 50, and Frame Buffer Memory.

PGB 28 contains four FIFOs 56 between GEs 48 and the Setup Graphics Chip 60 (FIG. 9) on IGB 30. Each FIFO 56 is shared by two GEs. This allows 32-bit commands and data to be passed from a GE to Setup Graphics Chip 60 without requiring the GE to wait until Setup Graphics Chip 60 is ready to accept data.

There is routing hardware 58 between (1) WP-TE FIFO 44 and GEs 48 and (2) the four GE-IBG FIFOs 56 and Setup graphics Chip 60. This routing hardware 58 acts as a central switch that distributes input to each GE and gathers output from each GE.

GE routing hardware 58 uses a round-robin technique for collecting and distributing data. The GE input routing hardware reads data from WP-TE FIO 44 and writes one command and its arguments to a GE 48. The GE output routing hardware reads one command and its arguments from a GE-IGB FIFO 56 and writes it to the Setup Graphics Chip 60 on the IGB 30. Both change to the next GE 48 or GE-IGB FIFO 56 in sequence, respectively, after processing each command. This round-robin method preserves the order in which commands were sent to GEs 48.

The Imaging and Graphics Board

IGB 30 contains the rendering system of this invention (FIG. 9). It renders X and PHIGS primitives. PGB 28 transfers XY data to IGB 30 as screen-space coordinates with subpixel information and 24-bit Z values. IGB 30 performs the functions of geometric rendering, color rendering, and X value comparisons. When geometric rendering, IGB 30 interpolates pixel coordinates and Z values between polyline or polygon vertex coordinates. This includes performing the area calculations to determine the portion of a pixel covered for anti-aliasing. When color rendering, IGB 30 interpolates RGB colors and texture coordinates between vertices. This is applied to the pixel values from geometric rendering for each primitive and includes performing the blending of color values for a pixel from different primitives for anti-aliasing. This data is then written to Frame Buffer Memory 38.

IGB 30 includes the following hardware as shown in FIG. 9: custom graphics rendering chips 34 and 36, frame buffer memory 38, pixel cooperations, control planes, video output subsystem 62, LED status indicators (not shown), custom high-performance Ibus interface 64, and PGB interface 66.

IGB 30 contains three types of custom graphics rendering chips, which include Setup Graphics Chips 32, Rendering Graphics Chips 34, and Blending Graphics Chips 36.

Each graphics chip is an Application-Specific Integrated Circuit (ASIC) custom-designed by Megatek. All graphics chips contain a register with stepping information that can be read by TE 42 to determine what version of each graphics chip is on the board.

These chips (ASICs) are now described. Two Setup chips 32 perform calculations to determine the slope between polyline or polygon vertices, and the X and Y increment to use when filling pixels along a line segment or polygon edge.

Four Slicer/Dicer or Rendering chips 34 perform interpolation of pixel addresses, colors, and texture coordinates between vertices. Color interpolation for Gouraud shading is linear between color values at polyline or polygon vertices. Rendering chip 34 also computes the area of a pixel covered by each primitive for use in blending for anti-aliasing and generates an alpha (A) value of fractional pixel coverage for each primitive used to determine the final pixel color.

The anti-aliasing procedure of this invention can be selectively enabled for points, lines, and polygons. The virtual resolution of the rendered image is at least 10240× 8192 subpixels. Display is preferably adapted to a standard 1280×1024 color monitor, wherein points, line endpoints, and polygon vertices are positioned to an accuracy of at least ⅛ of a pixel in both X and Y. Display resolutions up to 2K×2K are supported by the hardware.

Ten Blender chips 36 perform the calculations to blend multiple color values for each pixel from several primitives to a single value that results in anti-aliased lines and polygon edges. Blender chip 36 also interpolates values from a texture map across the surface of a polygon.

Blender chip 36 also supports the following operations: Z value less than, equal, or greater than compares, which can be enabled or disabled, ghost linestyle compare, pixel operations, and control plane use. Ghost linestyle compare is used to draw polygon elements as wire frame. Edges that are not hidden in a polygon rendering are drawn as solid lines. Edges that are normally hidden in a polygon rendering are rendered in a non-solid linestyle. This requires two traversals: one to set Z values for all polygons and another to render the edges.

The Frame Buffer Memory (FBM) 38 in IGB 30 is divided into VRAM and DRAM. 20 MB of 2 Mb VRAM is used for data that must be video-refreshed, which includes a 24-bit frame buffer and the control planes. 52 MB of DRAM is used for non-video data associated with the 24-bit frame buffer, such as the 24-bit Z buffer and offscreen frame buffer memory.

The RGB color planes are 24-bit and double-buffered. This configuration supports up to 16.7 million simultaneously-displayable colors. The color planes actually store 27 bits ( with an extra bit for each of red, green, and blue) to maintain 8-bit precision per color when performing blending calculations for anti-aliasing.

Memory 38 is arranged in a 5 by 4 (X:Y) memory interleave, so that successive FBM 38 accesses do not access the same VRAM for five successive X locations or 4 successive Y locations (FIG. 11A). This maximizes X and PHIGS rendering performance. The 20 MB of VRAM is divided into two buffers, A and B (FIG. 11B). Either buffer may be used to update a window, or perform video refresh of the screen. The frame buffer selected plane determines which buffer is used for video refresh.

The control planes supported on IGB 30 include a window clip plane, frame buffer select plane, and Z buffer erase status plane. Each of the planes contains 1 bit per pixel. In addition, IGB 30 contains a blink plane to control blink per-pixel.

Of the 52 MB of DRAM, 10 MB is allocated for the Z and alpha. The alpha buffer contains 9 bits of data per-pixel. The alpha (A) buffer value contains the percentage of a pixel covered by a geometric primitive, and is used by Blender chip 36 for antialiasing.

The remaining 42 MB of DRAM includes a pool of offscreen memory space that is shared for anti-aliasing, X pixmaps, image primitives, textures. The memory space used for anti-aliasing is allocated dynamically by the rendering chips during traversal and rendering of geometric primitives, then released. The amount of memory space used for anti-aliasing depends on the number of lines and polygon edges being rendered, how many cover a single pixel, and whether any are transparent.

Pixel Block Transfer ("PixBLT") includes functionality to handle overlapping source and destination addresses (required for scrolling text), unaligned pixel addresses, bit map to pixmap expansion (1:24—required for raster font output), and the ability to operate on a window or pixmap. The pixel operations include those required for simple image processing. More complex image processing will be done on PGB 28.

The Set Up ASIC

Figure 31:
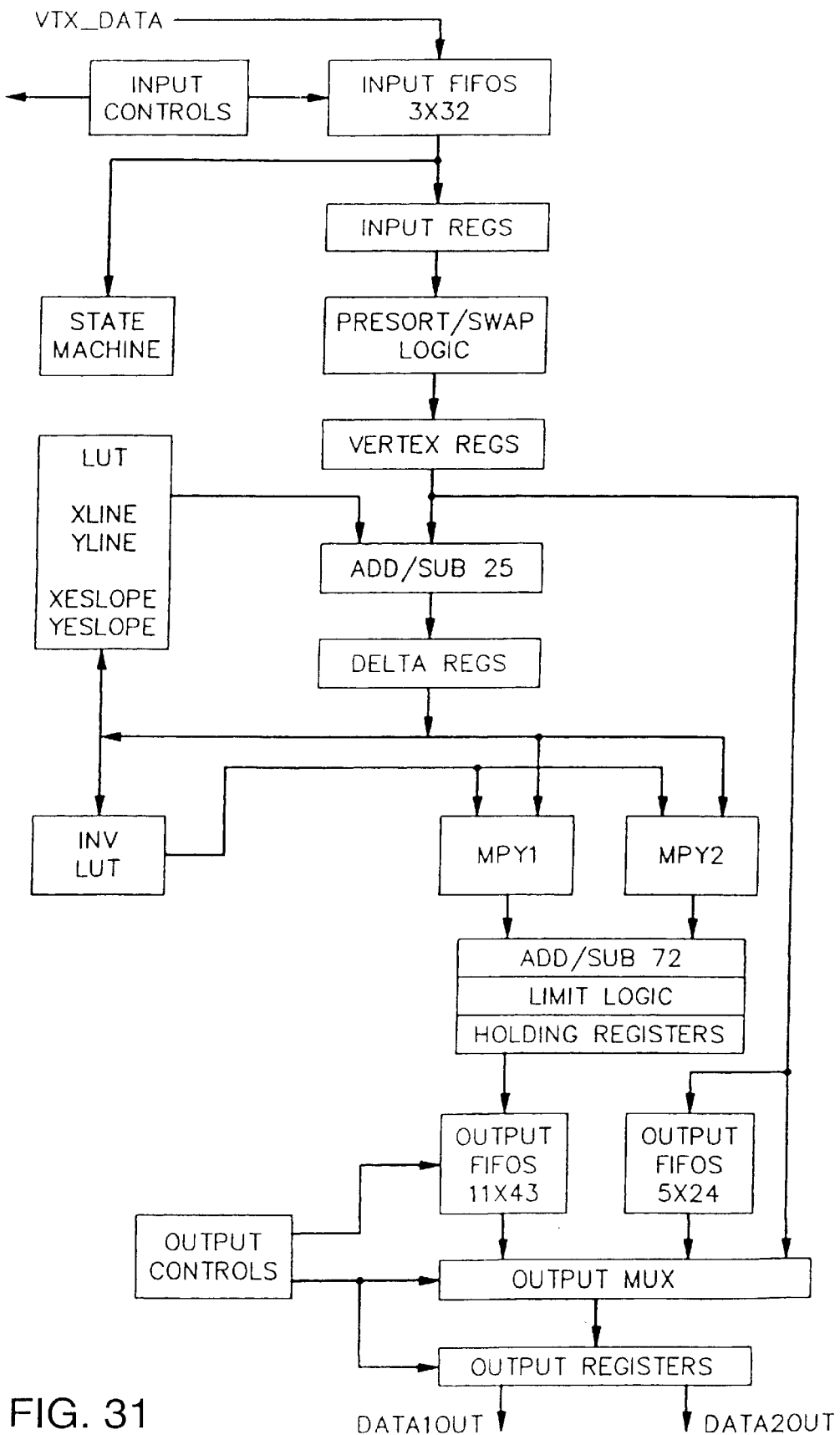
FIG. 31 shows a functional block diagram of the setup ASIC of this invention.

Setup ASIC 32 is designed to handle mainly three types of graphic primitives passed down from the PGB across the Vertex bus: Draw Point (P0), Draw Line (P0, P1), and Draw Triangle (P0, P1, P2). FIG. 31 provides a functional block diagram of setup ASIC 32.

Pn represents a point (vertex) that can be fully described by nine different parameters, (X, Y, R, G, B, T, U, and V). Not all parameters are always issued with the vertex. Depending upon the MODE bits that are enabled, the T, U, and V parameters may be turned on or off, thus indicating whether Setup ASIC 32 must do the computation for those parameters.

Setup ASIC 32 buffers vertex data, sorts vertices, computes necessary slopes, expands lines to the specified line width, expands points to the specified point size, and computes the RGBZTUV parameters in their plane formats according to the plane calculations in FIG. 6 and forwards the data to Slicer/Dicer ASIC 34. Other commands and data intended for Slicer/Dicer 34 or Blender 36 are handled by Setup 32 and sent down to the other ASICs without any processing. Setup ASIC 32 is designed to operate at 40 Mhz. The preferred design performance is tuned to process polygonal meshes at 1 million polygons per second. However, to meet the 1 million polys/sec performance, two Setups are required per IGB. The polygon data information is loaded into both Setups and the Setup that is currently enabled retains priority for processing the polygon information. Toggling between two Setups occurs if one chip is processing data and the other has finished its previous command.

The Setup ASICs each require their own divide lookup table (LUT). Each of the two separate tables are made up of two, 32 k×8 12 ns static RAMS. Under normal operating conditions, the table is accessed only by the Setup ASIC to which it is attached. However, the LUT itself must be initialized before enabling the rendering pipe. There are four addresses required to write and read these LUTs. When writing data, both LUTs are written at the same time with the same data. The "write address/data" port, latches the least significant 15 bits (14–0) of data into the LUT address registers. During the same write cycle, the most significant 16 bits (31–16) becomes the data written into the SRAMs. The read operation is a two-cycle operation. First, the address or index to the table must be written into the LUT address registers with the "write address only" port. Again, the address field is data bits 14–0. This address is shared by both LUTs. The data is read back from each LUT individually with the LUT1 read and LUT2 read ports. Data is returned on bits 31–16.

The Rendering (Slicer/Dicer) ASIC

Figure 16A:
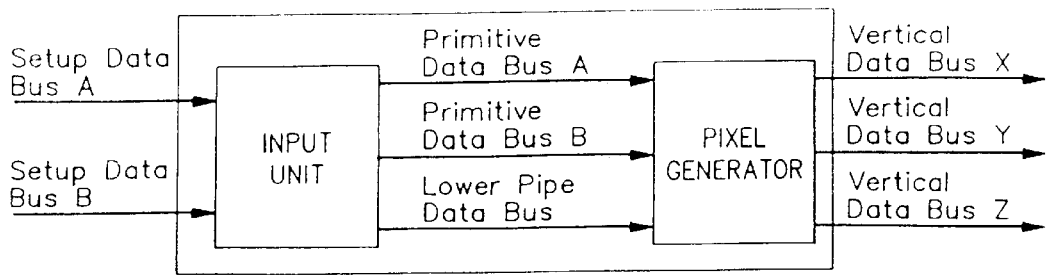
FIG. 16, comprising FIGS. 16A–16C, provides detailed functional block diagrams showing the Rendering (Slicer/Dicer) ASIC of this invention.
Figure 16C:
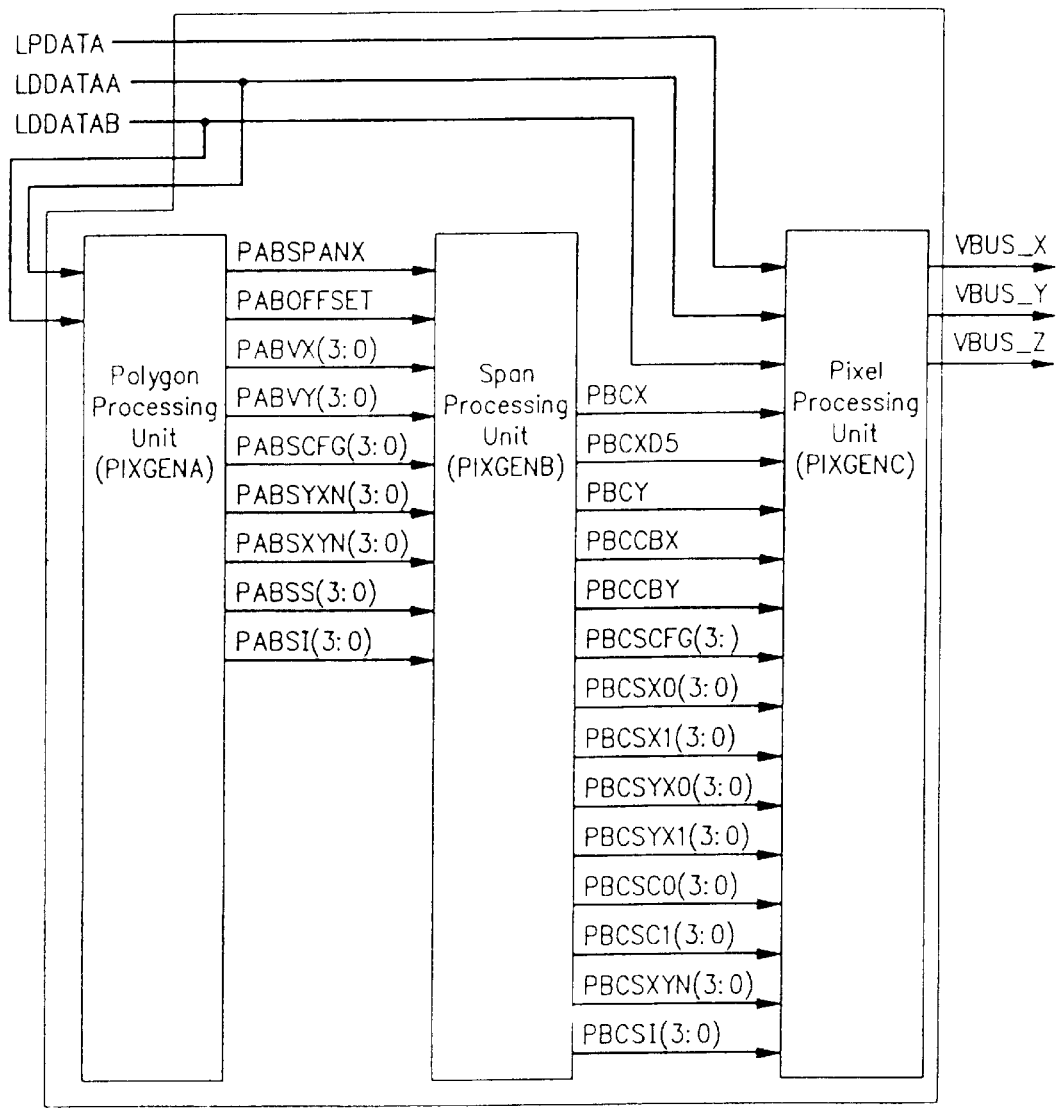
Figure 16B:
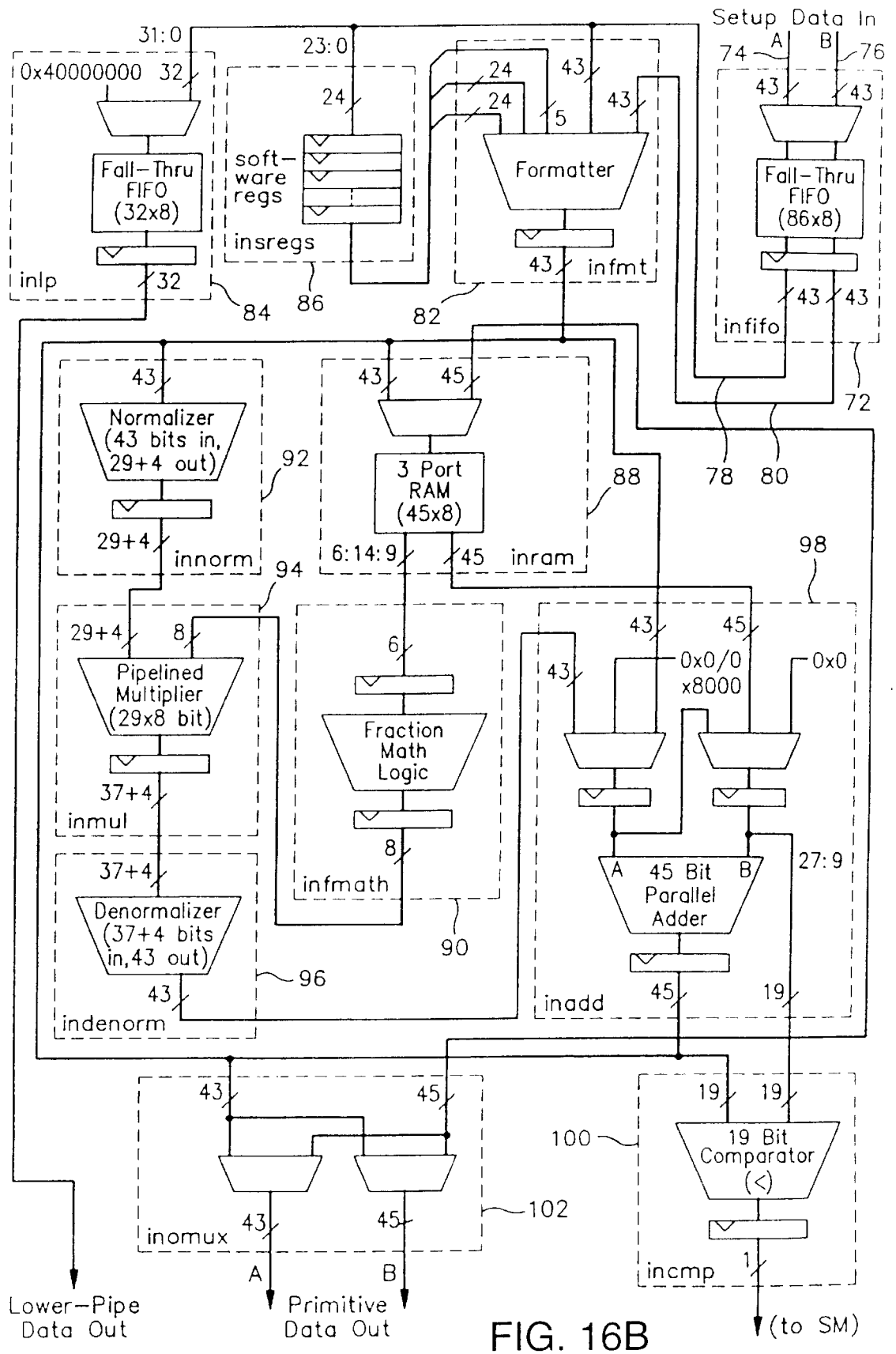

For the high performance processing of this invention, multiple copies of each ASIC in IGB 30 are required. In its simplest configuration the rendering pipeline consists of two Setup ASICs, which each supply data to five Slicer/Dicer ASICs. Each Slicer/Dicer supplies data to two Blender ASICs. FIGS. 16A–16C provide functional block diagrams describing Slicer/Dicer ASIC 34.

As shown in FIGS. 8 and 10, Slicer/Dicer ASIC 34 receives Draw command data from the Setup ASIC 32 and generates pixel information that is passed to Blender ASICs 26. Slicer/Dicer ASIC 34 supports the drawing of Points, Lines and Triangles. The Slicer is responsible for "slicing" each of these primitives into vertical spans (FIG. 2) that are then passed to the Dicer for pixel processing (FIG. 3). Each of five Dicers is responsible for processing every 5th vertical span. In an alternate configuration, each Dicer processes every tenth vertical span. The Slicer transfers information to the Dicer module that allows the Dicer to calculate coordinates for each pixel in the span. The Slicer also transfers color information.

For each pixel the dicer generates, X, Y, Z representing pixel coordinates, R, G, B representing pixel color, and alpha (A) representing pixel coverage area. Depending upon the value within the MODE register the Dicer may also generate U, V which are used for texturing, and T which is used for transparency.

The MODE register is a 3-bit register that is set via an IGB Pipe command. IGB Pipe commands are passed down the rendering pipeline and are responsible for altering the internal state of an ASIC. Each IGB Pipe command is addressed to a specific ASIC. Setting bit 2 of the MODE register enables the generation of T values. Similarly, setting bit 1 enables the generation of U, V values. In both cases rendering ASIC 34 expects additional information regarding U, V and/or T from Setup ASIC 22. Setting bit 0 enables the anti-aliasing mode. When anti-aliasing is disabled, rendering ASIC 34 always sets the pixel area value A to a maximum. However, if anti-aliasing is enabled, the Dicer calculates the fractional area A of each pixel covered by a primitive.

Slicer/Dicer ASIC 34 also supports a series of IGB Draw commands used for fast processing of Rectangular, Horizontal spans and Pixel filling. In these situations, color is received from the Graphics Engine but Slicer/Dicer ASIC 34 still generates coordinate information for processing by Blender 36.

The procedure for walking the primitive edges starts at the lower leftmost vertex of any primitive (FIG. 1). Setup ASIC 32 guarantees that this is point zero (Pnt0). From Pnt0, the process traverses the edges of the primitive, calculating the upper and lower Y coordinate for the edge as it passes through each consecutive span. The Y coordinates are calculated using the slope value for the edge, and the length of the edge that intersects a span. For each span, two pairs of coordinates are calculated, one for the upper edge and one for the lower edge. The Y coordinates are passed to Dicer, which is responsible for calculating pixel area and interpolating X, Y, Z, R, G, B, T, U, V values for pixel scan lines.

Dicer in ASIC 34 uses the lower edge Y-coordinate pair to determine the initial Y coordinate of the first pixel in the span to be processed. Dicer increments the Y coordinate processing each new pixel coordinate until the Y coordinate is intersected by the upper Y-coordinate pair. Depending upon the mode of operation, Dicer may have to generate R, G, B, T, U, V, Z and area A values for each pixel processed. The values for each of the pixels is based upon the values received from Slicer in ASIC 34 for the span and the difference in each axis for a unit change in the Y axis. The difference per unit change in the Y axis, minimal Z and maximum Z values for the primitive are received from the Slicer during its internal logic initialization phase. Each Slicer/Dicer ASIC 34 processes one million polygons/second, generating X, Y, R, G, B, Z and area (A) for each pixel.

The Blender ASIC

Figure 12A:
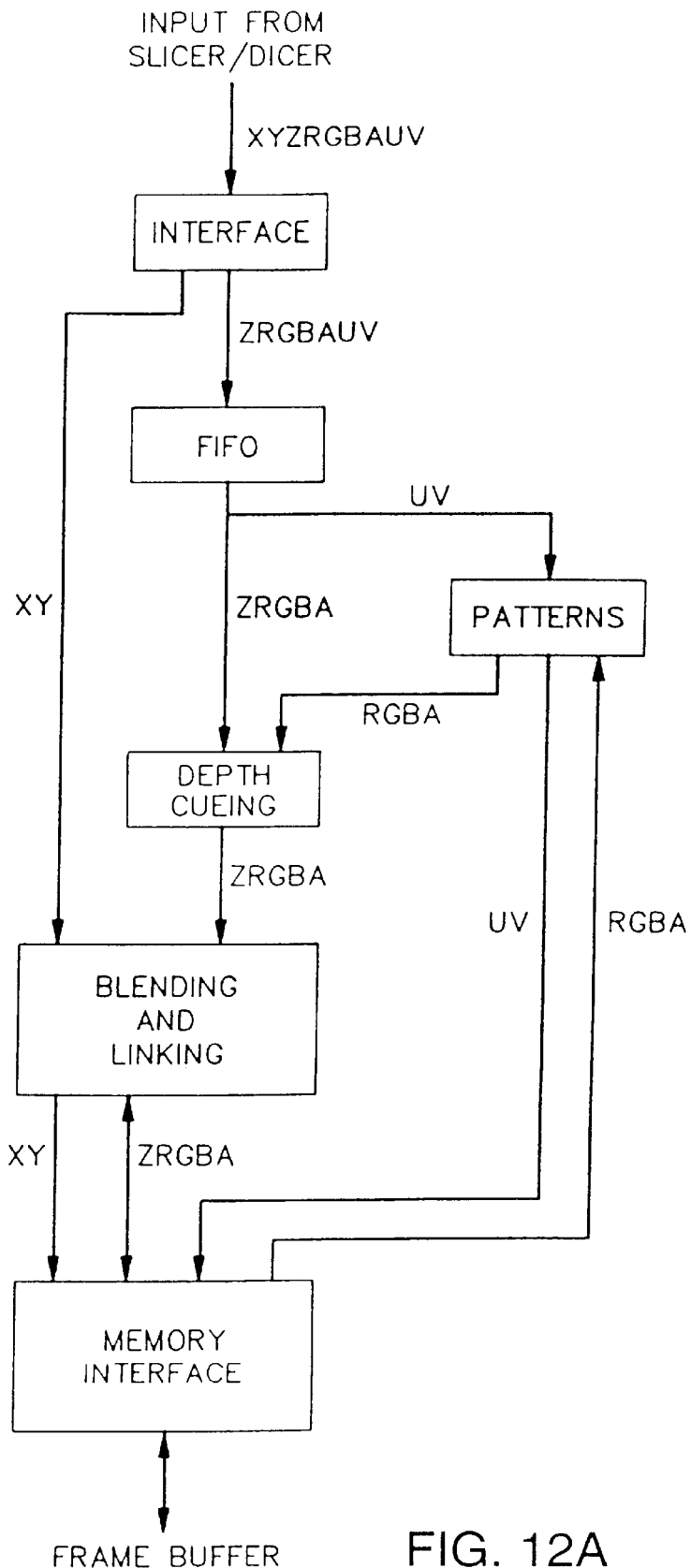
FIG. 12, comprising FIGS. 12A–12C, provides detailed functional block diagrams showing the Blender ASIC of this invention.
Figure 12D:
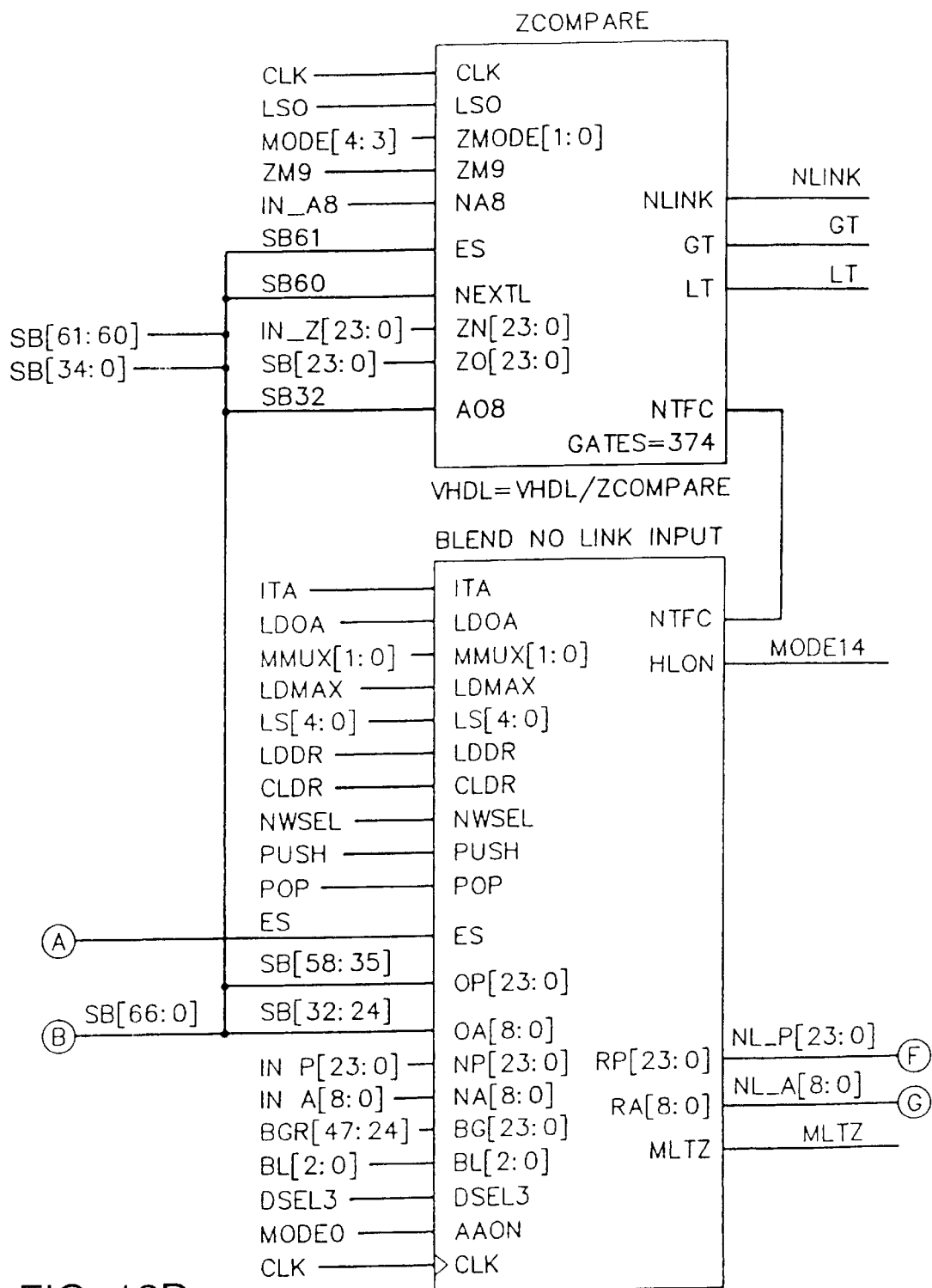
Figure 12F:
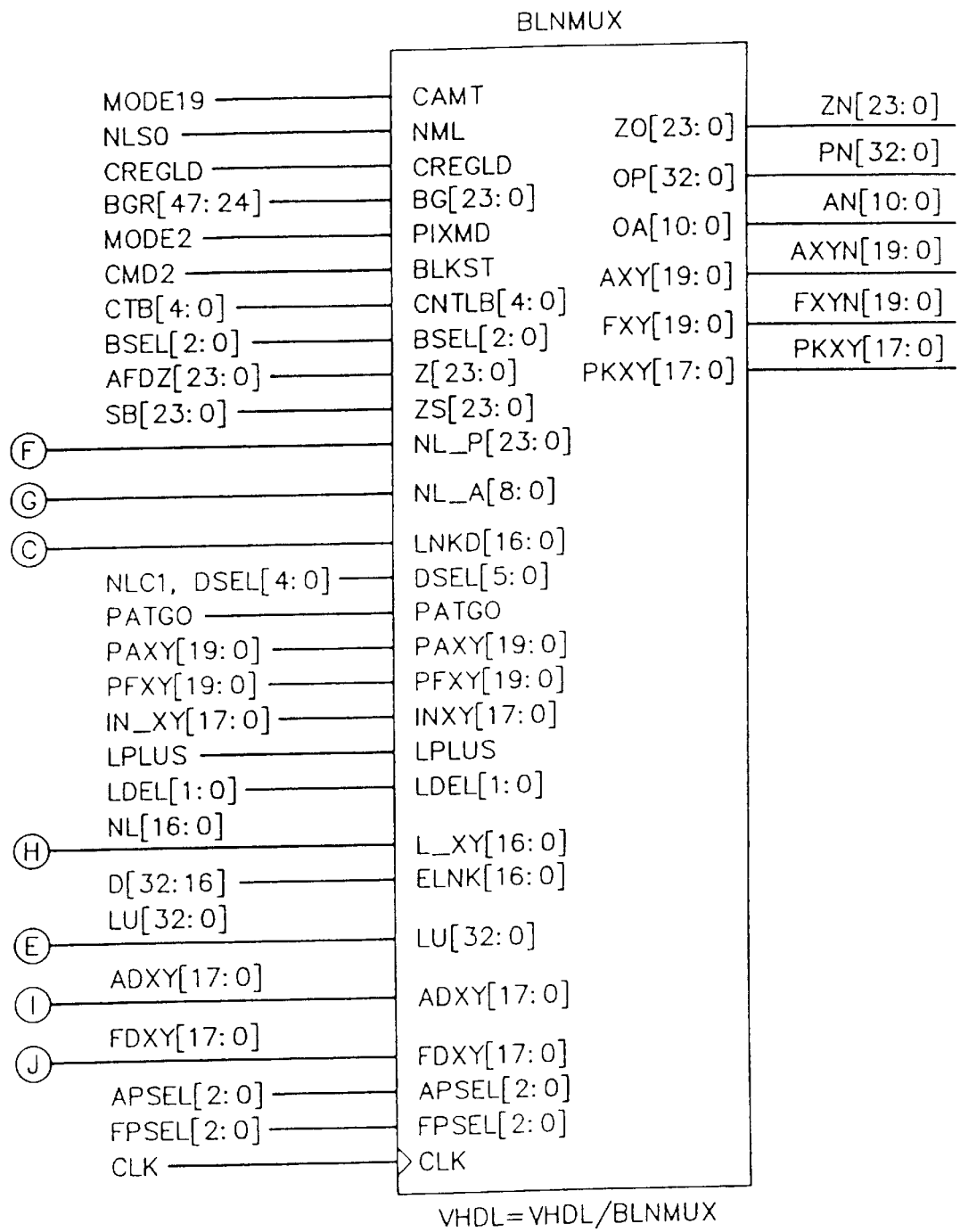
Figure 12I:
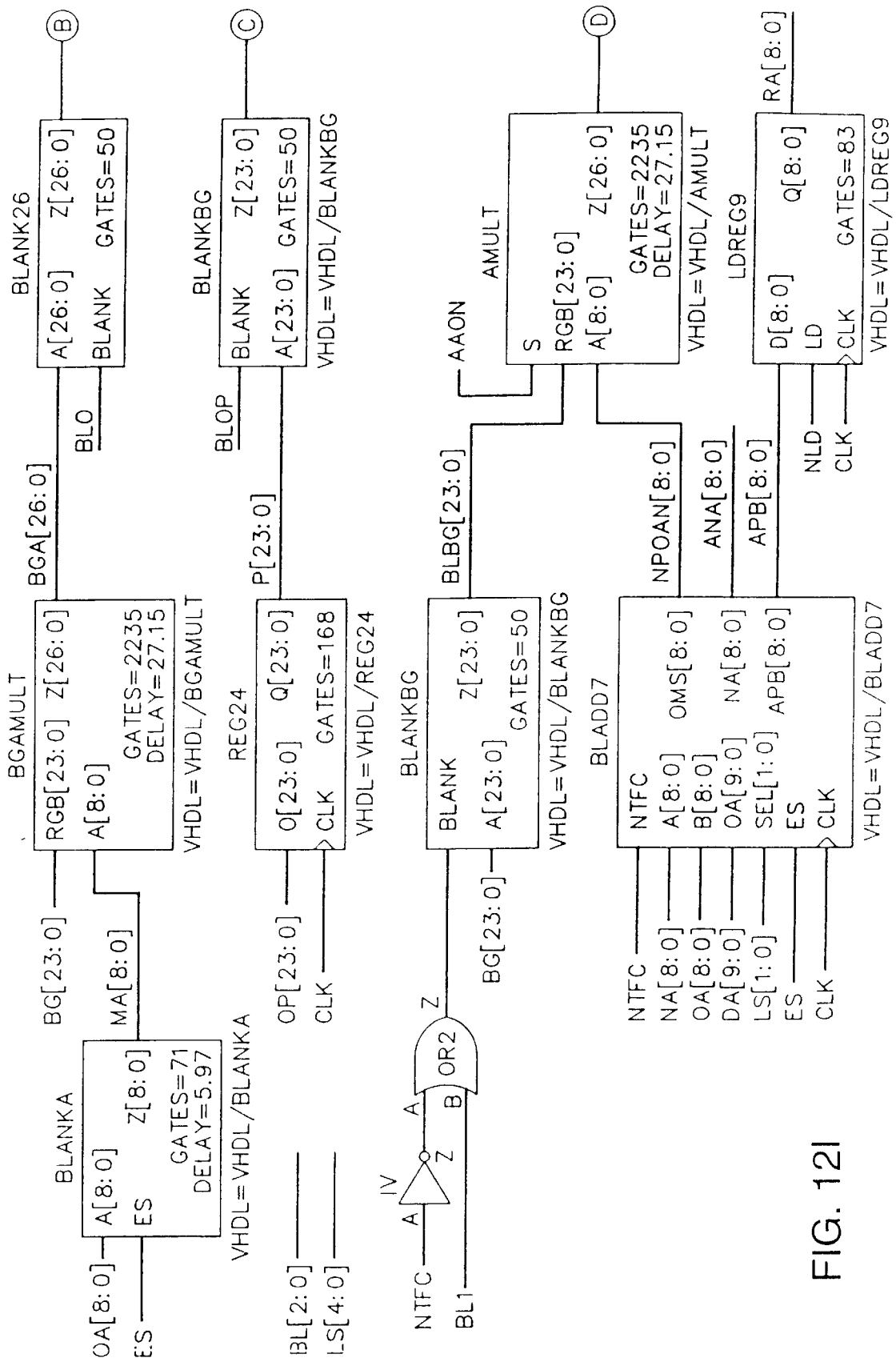
Figure 12J:
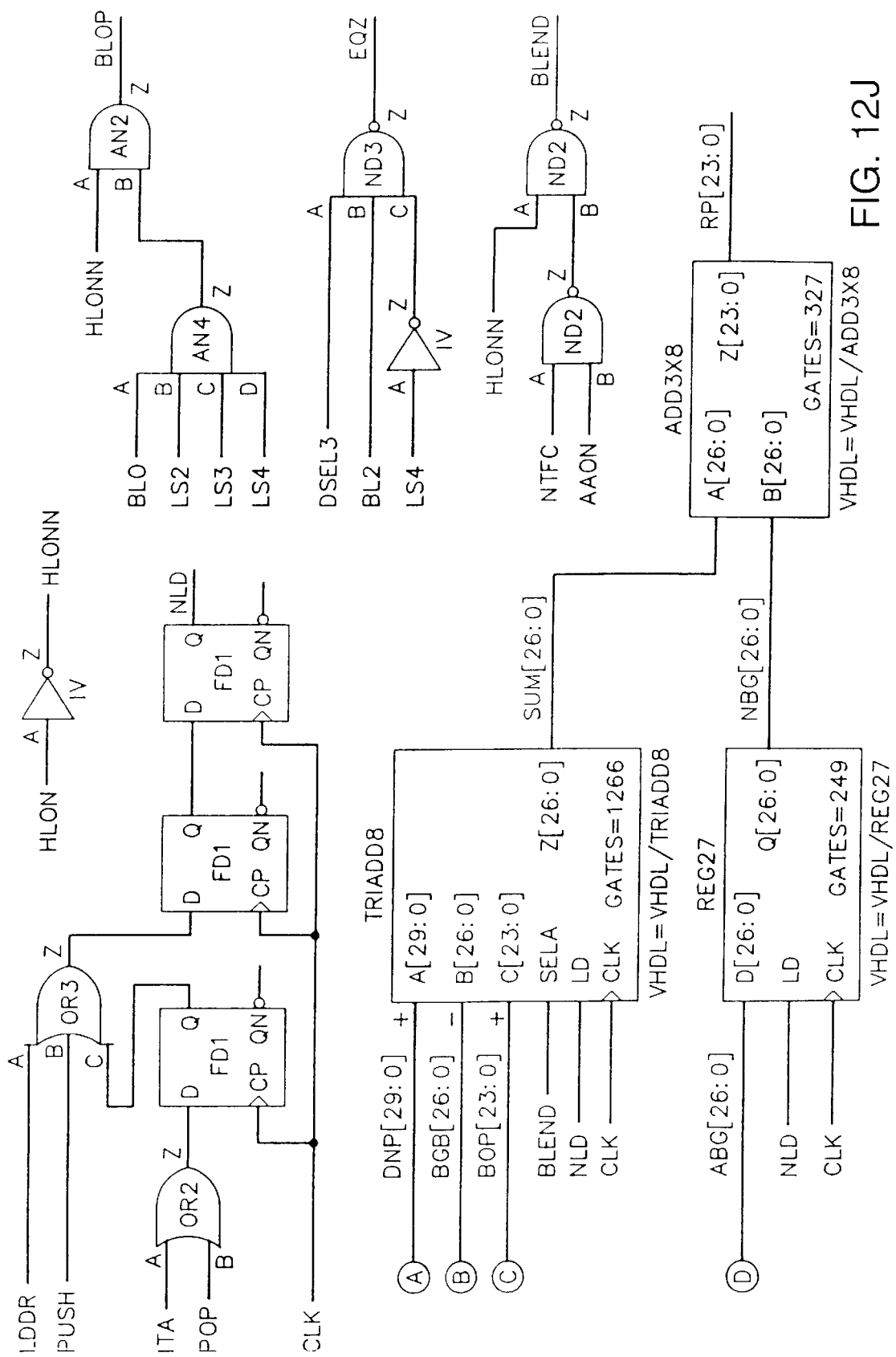

Referring to FIGS. 12A–12C, Blender ASIC 36 receives pixels and commands over the Vertical bus for processing and storing pixels into frame buffer 38. Two sources of data use the Vertical bus to access frame buffer 38 via Blender 36. Slicer/Dicer ASIC 34 is one source of pixels and commands. The IBus interface is the second source. The IBus writes and reads pixels from frame buffer 38 through Blender 36. Also Blender 36 commands and control registers are read by the IBus I/F. Each Blender 36 is designed to control 2 banks of frame buffer memory. Since the frame buffer 38 on IGB 30 has 20 memory banks, 10 Blenders are required. The Blenders make the final distribution of pixels into frame buffer 38. The functions performed in Blender ASIC 36 include antialiasing, pattern mapping, line styling, IGB synchronization, area fill, hidden surface removal, Z sorting, depth cuing, fog and haze and pixel refresh.

When antialiasing is enabled, the Blender receive a 6-bit alpha (A) value along with R, G, B, and Z data for every pixel from the Dicer. The alpha A value represents a percentage of area coverage that the polygon generates as it slices through a pixel. The Blender uses the area values to help blend a percentage of the pixel color against a percentage of a pixel color or background color already in the frame buffer.

When patterns are enabled, the Blenders receive 16-bit and U and 16-bit V values along with R, G, B, A and Z data for each pixel from the Dicer. The UV data along with a MIPMAP Triangle size log that was previously loaded into the Blender is used by the Blender to index up to 8 pattern pixels. These pattern pixels reside in pattern map tables located in the off-screen memory of the frame buffer. Then the U,V and log values are used to bilinearly interpolate the indexed pixels down to one pixel. Then that one pixel can be blended into the frame buffer based on the alpha value if anti-aliasing is enabled.

Line styling function take advantage of the pattern mapping capabilities on the Blender. The dot-dash patterns are stored in the Pattern map tables. This function requires only a U value input with each pixel, thereby making the indexing one-dimensional.

The Blender is the last piece of hardware in the rendering pipeline of this invention, so it synchronizes the graphics pipeline with the IBus I/F. Each of the rendering pipeline ASICs receives the SYNC command down the pipeline. Upon reception, the Setup and the Slicer/Dicer ASICs merely pass the command down the pipeline and continue processing. The Slicer/Dicer suspends processing only after receiving the Blender's BLENDER_BSY* signal. When the Slicer/Dicer backs up, it removes its READY signal to halt the Setup.

There are two different types of sync commands, "sync only" and "sync with interrupt". The "sync only" command causes the Blenders to complete all pixels and commands preceding the sync command and generate SYNC_DONE*. When IGB logic detects that all Blenders are synchronized, it checks the pick hit status. With no pick hit active from any Blender, the glue logic automatically restarts the Blenders by strobing the BLENDER REQUEST signal low for 50 ns. The Blenders then return to their pipeline processing.

The "sync with interrupt" command causes the Blenders to generate a false pick hit. When all Blender are synchronized, the IGB logic checks the status of all PICK_HIT* signal. If any PICK_HIT* is detected (and all of them will be with this command), the IGB generates an IBus interrupt to TE 42. The interrupt remains asserted until the I/O mapped port BLENDER REQUEST* is written. BLENDER REQUEST* maintains the Blenders in the "rendering-suspended" state. While in this state, the IBus can access the Blender registers or frame buffer. When the requesting IBus master completes the Blender transfers, it removes IBLOCKOUT* and BLENDER REQUEST so that rendering processing resumes.

To initiate the IBus transfer, multiple Blender registers are modified from their original rendering values. Which and how many registers are corrupted depends on what function the IBus performs. After the IBus transaction is complete and IBLOCKOUT* is removed, the Blenders resume processing the pipeline commands. The first few commands are Blender register loads required to reinitialize the previous rendering state of the Blenders. Even though the SYNC command ensures the pipeline is at a known state, it is not needed for requesting Blender cycles. Issuing the IBLOCKOUT* signal alone halts the Blenders to permit IB bus accesses.

For the high-speed area fill function, the Blender can quickly fill a rectangular area by generating Page block write cycles on the VRAM frame buffer 38. The rectangular regions must be divisible by 20 in the X device coordinate and by 4 in the Y device coordinate. Also, the top left corner of the rectangle must start on a 5×4 even boundary. If the rectangle does not meet this rule then it must be filled in as regular polygons. During Page block write cycles, the Window Clipping function is disabled.

The Blender receives 24 bits of Z data with every 3D pixel and reads the Z data of the destination pixel in the Z buffer to compare the two values. If the incoming pixel is less than the destination pixel in Z depth, the new pixel replaces the old pixel. The Z sorting function is automatically accomplished when antialiasing is enabled on the Blender. Since anti-aliasing creates Pixel links (PixLinks) based on Z depth, the act of Pixlink building replaces Z sorting.

To allow fast data transfer between the Blenders 36 and IBus 64, a DMA engine is used. The heart of the engine is a Lattice ISPLSI-1032 PAL. Additional external registers and counters are required. The '1032 device is loadable through a software port but is pre-programmed before being soldered onto the board. The software programmability allows for field upgrades.

Patterns are stored in off-screen memory. Fast access by the Blender requires each Blender to have its own copy of the pattern. Patterns are stored in two formats: regular and mipmap. Specifying the starting address, X size, Y size and format completely describes a pattern. The Setup chip holds a set of U, V pattern coordinates for each vertex. They are linearly interpolated for each pixel in the polygon. The values stored in the pattern array are RGBA quads. Each component from the pattern array is multiplied by the corresponding input pixel value.

R=R input*R pattern
G=G input*G pattern
B=B input*B pattern
A=A input*A pattern

The result is then normalized by a shift operation. There are three different ways that patterns can be applied. The RGB color, the A area or both may be used.

The Blender ASIC block diagram in FIG. 12 is now discussed. The input FIFO is just deep enough to absorb the last few words that are left out on the Vertical bus and possibly the last pipe stage of the Slicer Vertical bus interface when the Blender halts the Slicer.

The Page Detection Logic looks as far up ahead as required at the stream of pixels coming down the pipeline and decides how many of those back-to-back pixels will fall in the same page. By doing this it will allow the memory timing to run in page cycles for as long as possible. Frame Buffer 38 is designed so that all the benchmark triangles remain in the same pages of the memory banks. Once the Page detection logic decides the stream of pixels are page friendly, it will allow only that batch to fall down into the next pipeline stages below and begin new memory cycles.

The Bank 1 and Bank 2 Address Controllers are identical. They generate multiple sources of row and column addresses for their respective memory banks. The screen refresh counter is a 9-bit line counter that supports resolutions of 1024 and 512 lines for stereo. The link pointer is a 16-bit counter that generates Pixlink addresses during anti-aliasing mode. The address buffer select register is loaded via IGB commands and simply used as a sub-memory bank pointer. It is required because the Y field on the Vertical bus is only 8 bits, which is not enough to address the whole bank directly.

The RAM control function is a programmable state machine that generates all the required timing for the VRAM and DRAM. The different operations requiring different cycle types include page read cycle, page write cycle, page read-modify-write cycle, read transfer cycle, write transfer cycle, special VRAM register load cycles, CAS-before-RASE cycle, and page block write cycle.

The RGBAUV blender block is a multilevel data flow pipeline that includes multipliers, arithmetic units, shifts, registers, and multiplexers. The six basic functions supported are alpha blend, alpha unblend, X pixel operations, overflow and underflow protection, bilinear interpolation of texture texels, fog and haze and depth cueing.

The link buffer can be configured from a 32 word×66 bit RAM. A private address generator and controller supports the buffer, which is used for pixlink stack and as an intermediate buffer during PixBLT.

The compare logic block includes comparators, ranging from a 24 bit magnitude comparator to 8 bit comparators for testing results out of the RGBAUV Blender. Twelve-bit comparators are used to text XY coordinates for Pick logic mode.

The alpha lookup table is used during anti-aliasing, when it sometimes becomes necessary to alpha unblend. This unblend is a 8 divided by 6 function. This lookup table is used to generate the inverse of alpha. The index is 9 bits and the output word is 9 bits.

The Mixer ASIC

Mixer ASIC 40 supports a variety of functions because one common part supports multiple configurations. IGB 30 has two primary configurations; the single IGB and the dual IGB configurations. The Mixer provides the following functions: video timing generation, hardware cursors (cursor RAM, crosshair and rectangular window), frame buffer blink logic, double buffer select logic, and MUX logic to alternate IGB frame buffers in dual IGB mode.

The Mixer support three different cursor functions. These are the one color 64×64 cursor RAM, full-screen crosshair cursor and window cursor. The cursor RAM and crosshair cursor are compatible with the operation of the Brooktree BT431. The window cursor functions are controlled in the same manner as the crosshairs. When the Mixer is used in a mode that accepts pixels from another set of Mixers, the master IGB's second stage Mixers generate all cursor data.

To prevent cursor tearing, the Mixer has shadow registers on all the cursor position registers and requires all position registers to be loaded before possible update. After all registers affecting the position have been loaded and the Mixer is in a period of vertical blank, the cursor position is updated on the screen. The order of loading should be X low, X high, Y low then Y high. This allows software to update the positions anytime, and the hardware holds the new value in the shadow register until vertical blank. If already in vertical blank and all registers are loaded, the position is updated immediately.

Each Mixer provides a one bit deep 64 by 64 cursor RAM. When three Mixers are used in a 24-bit system, 7 cursor colors are possible. The 512-byte RAM is loaded eight bits at a time as addressed by the auto-incrementing address pointers. Address 0 of the cursor RAM represents the upper left of the cursor image and incrementing the address steps across in the X direction. Eight RAM locations are accessed with each read or write cycle. Data bit 7 corresponds to the cursor bit with the least significant X position. That is, it is displayed on the screen to the left of where data bit 0 would be displayed.

The 64 by 64 cursor is centered at an offset of 31,31 around the values loaded in the X, Y cursor position registers. The clock that controls all the cursor logic is the LD_CLK (the clock driven to the RAMDAC). Since all three cursors can be positioned on the screen on a non LD_CLK boundary, there must be buffering and muxing logic inside the Mixer to allow positioning of the cursor RAM, crosshair and window cursors anywhere on the screen.

The crosshair cursor generates a one, three or five pixels wide horizontal and vertical crosshair cursor. The crosshair cursor size is limited to the boundaries of the crosshair window which is specified by the CH_WIDTH and CH_HEIGHT registers. Since the cursor position register determines the center of the crosshairs, the software must specify the center to be within the crosshair window. The X, Y CHPOS registers position the crosshair clipping window. The crosshair itself is placed at the center of the cursor RAM, positioned by the X, Y CUR_POS registers. The crosshairs can be enabled/disabled through the CURSOR_CNTL register. The crosshair window cursors are the same color.

The window cursor operates in very much the same way as the crosshair cursor except that a rectangular box is generated. The width of the segments is one, three or five pixels wide and the size of the window is determined by the RW_WIDTH and RW_HEIGHT registers. The window cursor segments are centered about the values that determine width and height. The window cursor positioning is centered by the same values that center the crosshair cursor and can be enabled/disabled through CURSOR_-CNTL register. The window cursor is the same color as the crosshair cursor.

It is possible to have any combination of the three cursors displayed. When more than cursor is displayed, the user may decide how the intersection or overlapping of the cursors is treated. When the cursor RAM and either the crosshair or window cursor is enabled, a priority bit in the CURSOR_CNTL register determines whether the cursor RAM or the crosshair/window cursor is be displayed.

Logic on the Mixer allows the blinking of pixels or any of the hardware cursors. The blink function works on a per pixel basis based upon one blink bit driven from the frame buffer. The rate and duty cycle of the blink is determined by the BLINK_RATE_ON and BLINK_RATE_OFF registers. The B_COUNT_ON and B_COUNT_OFF counters are incremented by the vertical sync prescaled by 8. This configuration allows the blink rate on and off time to be adjusted from 0.1 to 5 seconds in 0.1 second increments when using the 1280×1024 74 Hz video timing. The blink rate counters across all three Mixers are synchronized at time of RESET and increment based on the VSYNC signal driven from the master video timing generator. Unlike the BT459, it is NOT possible to specify an eight bit per pixel blink mask. A single bit enabling/disabling blink is all that's provided. There is only one mode of blink color operation. The pixel with blink enabled will blink from the intrinsic frame buffer value to a color as specified in the BLINK_CLR register. Since three Mixers are required to define the full width of a single pixel with each Mixer providing eight bits of color, a full 24 bit blink color definition is possible.

In addition to frame buffer data blink, it is possible to cause the cursor to blink. Setting the CUR_BLINK bit in the CURSOR_CNTL register causes all cursors displayed to blink at the rate specified in the blink registers. For added user flexibility, there is programmability over the way the cursor blinks. The cursor can either blink in sync with the frame buffer data or 180 degrees out of phase. This in controlled in the CURSOR_-CNTL register. There is no blink color associated with the cursor, which is either the color as loaded in the RAMDAC's overlay lookup or transparent.

The Mixer generates all the required video timing. For flexibility in video timing, it is controlled by the values loaded in to several different registers modeled after the TI 34020. The resolutions include: 1280×1024 at 60 and 74 Hz and 640 by 512 at 120 Hz for stereomode. All registers have read/write access but only the VCOUNT counters have read access. Allowing read access of the VCOUNT reduces latency for the functions that normally depend on vertical sync. The video timing is derived from the free running 5X pixel clock. The MASTER_EN configuration bit in the MODE_CNTL register determines which Mixer is the master video timing generator. The slave Mixers input the sync signals from the master to synchronize with the video timing.

The Frame Buffer

Frame Buffer 38 is a set of memory planes. Much of the data in the frame buffer never needs to be displayed. For this reason, frame buffer 38 includes two types of memory components: 256K×8 70 ns special function VRAM and 512k×8 70 ns DRAM. Frame buffer 38 is divided into four basic sections as shown in FIG. 11B: display buffer A, display buffer B and nonviewable information for display buffer A and B. The memory is a planar 5 (in X direction) by 4 (in Y direction) array (FIG. 11A). All twenty banks are isolated from each other allowing twenty-fold parallel operation.

The total memory shown in FIG. 11B does not include all of the 41.9 Mbyte of DRAM memory because the pattern map buffer is duplicated 10 times. Each of the 10 pattern maps is split in two, divided between two memory blocks connected to each Blender 36. The VRAM block shown in FIG. 11B correctly indicates the full 20.9 MByte of VRAM memory.

The display frame buffer resides on the upper 32 bits of the 64-bit frame buffer word. Each word includes 8 bits each of R, G, and B, 1 double buffer select bit (DBS), 1 blink bit, 1 window clip bit (WCB), 1 erase status bit (ES), 1 link pointer valid (LPV), 1 ID bit, and 3 reserved bits.

The working frame buffer includes the information not necessarily displayed. This information is used in generating the anti-aliased, Z buffered, blended pixels. Each word includes 7-bit Alpha (A) value, 24-bit Z value, and 16-bit Link Pointer. The multiple levels of the working frame buffer information are used in anti-aliasing. When more than one primitive is visible in a pixel, the individual contributions are stored in Z depth order in the multiple levels of the working buffer.

The PixLink buffer is 256×64 bits. The two adjacent locations in the same page are always associated with each other to store the next pointer for the next PixLink. The PixLink buffer includes 24 RGB bits, 24 Z bits, 1 NLK (Next link on) bit, 1 OLT (Other link true) bit, 8 MSW Link Pointer bit, 8 LSW Link Pointer bit, and 7 Alpha (A) bits.

Clipping to window boundaries is accomplished with one clip bit per pixel. When this function is enabled, the Blender tests the destination pixel in the frame buffer to see if its Window Clip Bit (WCB) is set ON. This then qualifies the incoming pixel to be written. If the WCB is OFF the incoming pixel is immediately discarded.

In the highlight overlap function, the Blender adds the RGB values of all incoming pixels with the old RGB values of the pixel in the frame buffer. An overflow test is conducted after each add; if true, the RGB values are clamped to maximums of 255,255,255.

Erasing a region of frame buffer 38 requires initializing all of the values for the pixels in the region. Those values in VRAM can be initialized very quickly. Initializing the values in DRAM is slower. Therefore, a single bit plane that can be quickly erased is reserved. Setting the erase status bit indicates that all values in DRAM for that pixel should be considered garbage and the appropriate initial values used instead.

Frame buffer 38 can be directly read and written by TE 42 via IBus 64. The speed of this access is 128 MByte/sec. or 32M pixels/sec. when in burst mode. GE's 48 write to frame buffer 38 via the pipeline. When frame buffer 38 or Blender registers must be accessed, the pipeline need not be synchronized but the frame buffer could be left in a state that is not consistent with the intent of the rendering commands if a sync is not performed. First, Blender arbitration must be obtained by test/set of the IBLOCKOUT port. Next, the BLENDER REQUEST port is written to a "1" to assert the LOCKOUT signal to all 10 Blenders. The Blenders respond to the LOCKOUT with BLNDR_RDY indicating that they are ready for IBus transfers. Upon receiving the SYNC command, the Blenders will assert their BLENDER_BSY* to the Dicers. This prevents the Dicers from issuing any more commands. The assertion of LOCKOUT also causes the Blenders to freeze the pipeline by asserting BLENDER _BSY*.

Because frame buffer 38 is divided up into five vertical buses with two Blenders on each bus, the three bit X START REGISTER must be loaded to select a bus. The value loaded represents a module five of the X address. All ten Blenders can be broadcast to by setting the VERTBUS REGISTER to a value of '0' and setting the broadcast bit in the DMA control register.

OPERATION OF THE RENDERING PIPELINE

Rendering (Slicer/Dicer) ASIC Operation

The Slicer/Dicer chip calculates pixel values from information provided by the Setup chip. It uses information about the vertices and line segments of points, lines and triangles to calculate the corresponding values for each pixel touched by one of these primitives. The resulting pixels are made available to a pair of Blender chips over the Vertical Bus.

The Slicer/Dicer handles three basic primitives, points, lines and triangles. Triangles are described with three sets of vertex information and three sets of segment information from the Setup ASIC. Points and lines are described with four sets of vertex information from the Setup ASICs. Lines additionally require four sets of segment information.

The Slicer/Dicer primarily renders anti-aliased polygons, bit it also has several non-anti-aliased rendering functions (IGB commands). These functions are fill-next-pixel, fill-rectangle, and fill-horizontal-span-with-stipple, which support X-windows rendering and text operations. Additionally, polygons can be rendered with anti-aliasing if desired. Polygons can also be rendered with pattern information.

The Slicer/Dicer ASIC includes two major functional circuits, the Input Unit 68 and the Pixel Generation Unit 70. Input Unit 68 is the Slicer/Dicer front end. It digests the information provided by the Setup ASICs, performs additional setup calculations that are not performed by the Setup ASICs and produces information in a format that is suitable for consumption by the rest of the ASIC. The rest of the chip is the Pixel Generator, so denominated because it converts abstract geometric objects into pixels.

The Slice/Dicer ASIC receives data from a pair of Setup ASICs and provides data to a pair of Blender ASIC. There are two 43-bit busses between the Setup ASICs and the Slicer/Dicer ASIC. These data busses are accompanied by a SETUP _VAL signal to indicate the presence of valid data on both data busses. The Slicer/Dicer provides a SLICER _BUSY signal to the Setup ASICs to regulate the flow of data.

There are three data busses from the Slicer/Dicer ASIC to the Blender ASICs that are collectively denominated the Vertical bus. The Slicer/Dicer ASIC provides a DICER_VAL signal to indicate the presence of valid data on the output data busses. There are two Blender busy signal inputs, BLNDR1_BUSY and BLNDR2_BUSY. These signals regulate the flow of data into the Blender ASICs.

The Slicer/Dicer ASIC calculates the ordinate values of several axes. These axes are:

X,Y—The X and Y coordinates of the pixels covered by a primitive.

Z—The distance of the pixels from the front clipping plane.

U,V—The pattern coordinates of pixels covered by patterns.

R,G,B—The color values of the pixels.

A—Alpha, the area of a pixel covered by a portion of a primitive (PIXLINK).

T—Transparency, the percentage of underlying color that bleeds through when displayed.

A succinct nomenclature is used herein to refer to the parameters associated with a polygon primitive. This nomenclature is in a VHDL style record format. FIG. 1 shows the nomenclature for the vertices and segments of an arbitrary triangle. Vertices are references by a "P" followed by a number. The left-most vertex is always P0. Proceeding counterclockwise around the polygon the number increases as shown. Segments are referenced by "P" followed by the numbers of the end-points they span. The left-most endpoint is specified first. Since segment nomenclature can vary from primitive to primitive (i.e. segment 2 for a triangle can be either P21 or P12), they are also referred to by "S" followed by a number. S0 is always the first counterclockwise segment with respect to P0.

Segment quantities such as slope are always specified with respect the left end-point of the segment. Vertex and segment quantities are treated as VHDL or C record types. Values associated with these structures are referenced as a field of the record. Thus the slope of segment P01 is P01.S and inverse-slope is P01.I. Other data types using this format are "B" for the Base Color values, "DX" for the Delta-X color slope, and "DY" for the Delta-Y color slope. As an example, "DY.T" represents the Delta-Y value of the T axis.

There are three primitive commands, "draw point", "draw triangle" and "draw line". The data for each primitive command is strobed into the Slicer/Dicer in a predetermined sequence that depends upon the type of the primitive.

The vertices of the primitive are sorted by the Setup chips so that the left-most vertex is always vertex 0. The remaining vertices are specified counter-clockwise from vertex 0. The slopes and inverse slopes are also sorted by the Setup chip. Slope 0 corresponds to segment 0 of the polygon. Segment 0 is that which has vertex 0 as its left end-point. The remaining slopes and inverse slopes are specified counter-clockwise from segment 0.

A point is rendered as a diamond-shaped polygon. It has four vertices and a single base color value. If transparency is enabled, it will also have a base transparency value. There are two versions of the point command, one with transparency enabled and one with transparency disabled. When transparency is disabled, the command requires 6 cycles. When it is enabled, the command requires 7 cycles.

Triangles are specified by three vertices, three slopes and three inverse slopes. In addition, base values and delta values describing the rate of change of a value in the X or Y directions is specified for the Z, R, G, and B axes. If transparency is enabled, a base value and deltas are also specified for the T axis. If patterning is enabled, base values and deltas are specified for the U and V axes as well. There are four versions of the triangle command. The command varies depending on what combination of transparency and patterning are enabled.

Lines are specified by four vertices, four slopes and four inverse slopes. In addition, base values and delta values describing the rate of change of a value in the X or Y directions are specified for the Z, R, G, and B axes. If transparency is enabled, a base value and deltas are also specified for the T axis. If patterning is enabled, base values and deltas are specified for the U and V axes. There are four versions of the line command. The command varies depending on what combination of transparency and patterning are enabled.

There are three IGB commands, "fill-rectangle", "fill-next-pixel", and "fill-horizontal-span-with-stipple". These are non-anti-aliased rendering commands that render a pixel or group of pixels with a single color value. The data for each IGB command is strobed into the Slicer/Dicer in a predetermined sequence that depends upon the command type.

The fill-rectangle command causes the Slicer/Dicer to generate a set of pixels to cover a rectangular region with a constant color. The command specifies the color value and the coordinates of the lower left and upper right corners. A base Z value and a base value are also specified.

The fill-next-pixel command increments the X-coordinate of the previously rendered pixel and renders the next pixel with the color specified. The first occurrence of this command should be proceeded by a fill-rectangle command with an area of one.

The stipple command causes pixels across a horizontal span to be rendered with a 1-bit deep pattern as specified. Each bit in the stipple data type represents the value of an individual pixel, starting with the left-most pixel. If a bit is set, the color for that pixel is determined by the stipple foreground register. If a bit is clear, the pixel is either left unchanged or rendered with the value stored in the stipple background register depending on the stipple mode stored in a stipple mode register.

The Slicer/Dicer chip has 9 internal registers that are software loadable. They control various functions and hold important parameters used by the chip.

The first four registers are for stipple parameters. The stipple length register is 5 bits wide. The stipple length determines the number of bits from the stipple data type passed in a stipple command. The value can range from 0 to 31 and indicates a stipple length from 1 to 32 respectively. The stipple type indicates whether a stipple value of 0 should be used to render a pixel with the stipple background color or not be rendered at all. When the stipple type is 0, pixels are not rendered when the stipple value is 0. When the stipple type is 1, pixels are rendered using the stipple background color. The stipple foreground and stipple background registers hold the 24 bit RGB color values to use when rendering stipples.

Each of the 3 bits in the mode register is a mode enable for a Slicer/Dicer function. The modes are anti-aliasing, patterns and transparency.

The Alpha roundup register is an 8-bit word that is a large fractional value used to force rounding-up after an alpha (A) multiplier calculation. The width and height registers hold the upper right coordinates of the rendering window. All values outside this rectangular region are clipped.

The blender enable register can selectively enable the Blender chips to receive lower pipeline commands from a Slicer/Dicer by setting the appropriate bit. There is a separate enable bit in this register for each span so that Blender chip pairs can be enabled individually.

Slicer/Dicer ASIC 34 is split into two major units, Input Unit 68 and the Pixel Generator Unit 70.

Input Unit 68 calculates the first intercept values of each segment with the nearest integer X and Y values that the segments intersect. In addition it adjusts the base color values (R, G, B, U, and V), the base transparency value (T) and the base Z value from those values provided with the vertices of the polygon. It adjusts these base values so they represent the correct values for the centroid of the pixel that covers the vertex.

Pixel Generator Unit 70 slices a polygon primitive into a series of vertical spans and calculating the values for each axis of each pixel in each sliced span. The resulting pixels are output to a pair of Blender ASICs 36.

Input Unit Operation: Slicer/Dicer Input Unit 68 provides several important setup calculations that are needed by the Pixel Generator Unit (PIXGEN) 70. For polygon primitives, Input Unit 68 calculates intercept values for use in area calculations and adjusted base color values for uses in interpolation. For the IGB commands (fill-next-pixel, fill-rectangle, and fill-horizontal-span-with-stipple), Input Unit 68 provides equivalent values to cause Pixel Generator Unit 70 to output the correct values.

One objective of the rendering engine of this invention is to complete processing of a catalog polygon in 40 clocks. Input Unit 68 meets these requirements by centralizing control in a single state machine. This state machine is, of course, very large. The state matching is generally limited to doing only one thing at a time (e.g., cause a register to be loaded, a value to be calculated, and the like). This required setting up all the stages in the data path that affect the desired operation at the same time. This does not present a problem if the data path is not pipelined; however, at 40 Mhz the data path must be heavily pipelined. Because of this, a given calculation might take many cycles to complete conflicting with the single operation requirement.

Figure 13:
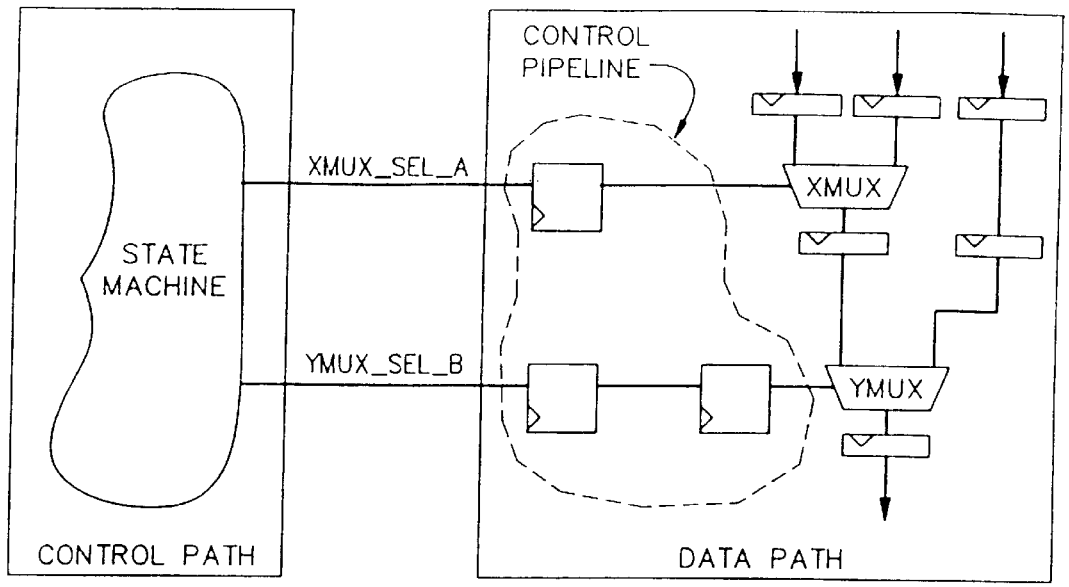
FIG. 13 illustrates the simple pipeline control concept of this invention.

The inventors solved this problem without relaxing the constraint of doing one thing at a time by introducing the concept of pipelined control. FIG. 13 illustrates this concept in its simplest form. Basically, the data path control signals are pipelined along with the data such that the state machine generates all the control signals relating to a particular data value or calculation at the same time. By matching data and control pipelines, the data path is made to appear as if it were not pipelined at all. Because of this, the constraint of only doing one thing at a time in the state machine can be applied without affecting performance.

The notational convention used herein applies an alphabetic postscript to the data path control signals to denote the number of states of pipelining applied. The postfix A implies 1 stage of pipelining; B implies 2 stages; C implies 3 stages; and so forth. No postfix implies no pipeline. This naming convention is illustrated in FIGS. 13–14.

Figure 14:
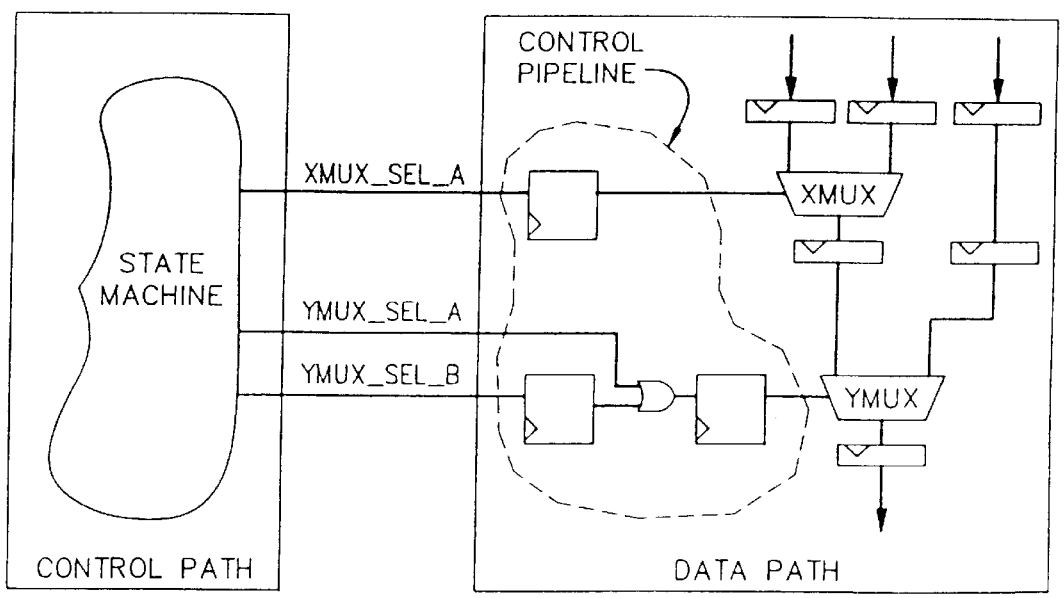
FIG. 14 illustrates the complete pipeline control concept of this invention.

A more complete example of control pipelining is shown in FIG. 14, wherein the number of data pipeline stages is not constant. In FIG. 13, any path between the data input and output passes through three registers. In FIG. 14, one of the paths only passes through two registers. Depending on the calculation, different parts of the data path may be used at different times. Thus, a given piece of the data path (e.g., YMUX) may need to be control at different times depending upon the calculation. In FIG. 14, YMUX needs control either after one or two cycles, depending upon whether the data comes from the XMUX or from the right-most input register. Careful selection of the YMUX select default (inactive) value could be used to eliminate the problem in this simple example, but this is not generally true.

As shown in FIG. 14, the pipelining solution of this invention is to allow the state machine to generate multiple versions of the same control signal with different staging postfixes. This solves the problem of data path elements that are used at different times depending upon the calculation by allowing the state machine to control the element at different items. The control pipeline logic is responsible for combining the properly delayed versions of the signal to actually control the element. In the example of FIG. 14, this combination function is accomplished using an OR gate. Note that an OR gate is not a general solution. The proper gate to be used is a function of the default (inactive) values assigned to the signals by the state machine. If the default (inactive) value is zero, as assumed in FIG. 14, then an OR gate effectively combines the signals. However, if the default (inactive) value is one, then an AND gate must be used.

Another consequence of using data path elements at different times is the possibility of a collision. That is, the possibility that two calculations require the use of the same element at the same time. One solution to this problem is hardware interlock logic. However, a much simpler approach is to design the state machine carefully to avoid such conflicts. This is the approach used in the rendering system of this invention. Although control is centralized in the state machine, some control elements must be delayed along with the associated data. Handling these delayed control elements directly in the state machine overturns the constraint of doing one thing at a time. A better solution is to implement these delayable functions as autonomous units operating as slaves to the state machine, with the state machine providing control via control pipelining as with the data path. The control architecture of this invention centralizes almost all control functions in a single state machine, which does only one thing at a time and which has a consistent interface to the rest of Input Unit 68.

The modules that make up the state machine (INSTATE and INNEXT), as well as the peripheral control functions that round out the control path (INSTB, INVLD, and INMOD) are now described.

The Input Unit State Machine (INSTATE) is a Mealy machine, and as such includes two blocks: a state register and next-state/output logic. The state register is implemented within the INSTATE block; the next-state and output logic is implemented underneath INSTATE, in a separate block denominated INNEXT. This hierarchical division facilitates the synthesis of the state machine.

The Input Unit State Machine next-state/output logic (INNEXT) has 122 states and uses two-hot state (flip-flop) encoding. The first hot flip-flop indicates what class of states are active, with the other hot flip-flop indicates which state within the class is active. These flip-flops are shared among the classes. The resulting state vector is 45 bits wide. FIG. 15 shows the exact encoding. The naming convention used for states in VHDL is <class> <operation>. Given such a name, FIG. 15 shows which two flip-flops are hot. For example, when the state machine is in the POINT_X1 state, that flip-flop #41 is hot (for the POINT class) and flip-flop #1 is hot (for the X1 operation). Note that the START class has no operations associated, because there is only one start state. Hence, only one flip-flop (#44) is hot when the state-machine is in the start state. This is the only exception to the two-hot rule.

The state machine operation itself is simple. The state machine interacts only with the other modules in the Slicer/Dicer Input Unit; it has no direct interactions with the outside world. The state machine controls the other modules using control pipelining. It receives status and data values from several of the modules, and it is from these values that it determines state changes.

The Strobe Generator (INSTB) generates the Input Unit signals that control the loading of latches in the Pixel Generator. Generally there is exactly one strobe be latch. The State Machine cannot drive these strobes directly because of the pipelining in the Data Path. So the State Machine tells the Strobe Generator when to assert what strobe so that the strobe arrives at the latch at the same time as the data. Standard control pipelining is used for this purpose. The Strobe Generator is actually a plurality of control pipelines.

The Valid Generator (INVLD) is responsible for implementing the handshake with the Pixel Generation Unit. The Input Unit indicates when various subsets of the entire data set are available via four valid signals: X0VLD, XVLD, XYVLD, and CVLD.

The Valid Generator contains a counter for each valid bit. These counters are normally 0. When the State Machine decides that it wants a valid to be asserted after $N \geq$ cycles, it loads the counter with N. The counter decrements to zero and the valid is asserted.

After the valid is asserted, it remains asserted until its corresponding data set is strobed into the Pixel Generator. For X0VLD, XVLD, and XYVLD the Pixel Generator indicates this via the XYSTB signal. The Valid Generator generates two outputs that are sent back to the State Machine. The State Machine uses these signals to prevent itself from writing new data into the Pixel Generator's latches before the Pixel Generator reads the previous values into its working registers.

The Module Counter (INMOD) was added to optimize Fill-Next-Pixel performance. Typically, a Fill-Pixel (i.e., a Fill-rectangle with Width=Height=1.0) is followed by a number of Fill-Next-Pixel commands. Such each primitive is one span to the right of the previous, and since every fifth span is processed, only every fifth pixel is output.

The Module Counter exploits the symmetry of this situation. Instead of passing every Fill-Next-Pixel on to the Pixel Generator, which in 4 out of 5 cases no output is necessary, the Module Counter keeps track of which pixels can be discarded so that the Input Unit State Machine can simply throw these into the bit bucket without involving the Pixel Generator at all. By filtering out most of the Fill-Next-Pixels so that the Pixel Generator never sees them, performance is considerably enhanced.

The Input Unit Data Path: The modules that make up the Input Unit data path are now described in detail.

A simplified block diagram of the input data path is shown in FIG. 16B. The Input FIFO (INFIFO) unit 72 provides a rate buffer between Setup ASICs 32 and Input Unit 68. INFIFO 72 also implements the handshaking protocol required between Slicer/Dicer ASIC 34 and Setup ASICs 32.

Data is received from the Setup chips on two 43-bit buses called SETUPDA 74 and SETUPDB 76. The data is qualified by a valid signal called SETUPVLD. Input FIFO 72 asserts a busy signal back to the Setup chips when it begins to fill up. This signal is called SETUPBSY. The Input FIFO asserts SETUPBSY early enough such that valid data is never lost for lack of room in FIFO 72.

Valid data passes through an input register, through a 8-deep latch based fall-through FIFO and into an output register. Thus Input FIFO 72 is actually 10 deep.

The data outputs of the Input FIFO are called IF_REG_A 78 and IF_REG_B 80. They are 43-bit buses, corresponding to SETUPDA 74 and SETUPDB 76. An empty signal IF_REG_EM is provided to qualify the data. Finally, an input from the State Machine, IF_RD, strobes the current data out of the Input FIFO output registers.

The Formatter (INFMT) 82 constrains all values entering the data path to be in similar formats, provides a single entry point for all values entering the path and informs the State Machine if a segment's inverse slope is zero.

The Lower-Pipe FIFO (INLP) 84 receives many commands from the Setup chips that are not intended for the Slicer at all, but which must be passed down the pipe to the Blenders. These commands are placed into Lower-Pipe FIFO 84 by the Input Unit and are read out at the appropriate time by the Pixel Generator's Output State Machine.

Most of the data placed in FIFO 84 are the Lower Pipe data for which the unit is named; however, at the end of each graphical object, the Input Unit State Machine forces a "Load-Slicer" command into the FIFO. This command is not actually transmitted to the Blender; it merely serves as a dummy token that the Pixel Generator's Output State Machine uses to synchronize the pixel data with the Lower Pipe Data. The Lower Pipe FIFO's data input is the bottom 32 bits of the Input FIFO's A output register. Valid data passes through the fall-through FIFO, and into an output register. Thus the FIFO is 9 deep. An input from the Pixel Generator's Output State Machine strobes the current data out of the FIFO's output register.

The Software Registers Unit (INSREGS) 86 contains all of the Slicer Software Configuration Registers. The registers are loaded with data output from the Input FIFO (INFIFO). The 3-Port RAM (INRAM) 88 provides an 8-word by 45-bit register file with 1 write port and 2 read ports. Write data can come either from the Formatter output (FMT) or the Adder output (ADD). Note that the Formatter output is only 43 bits wide. To compensate, we replicate the sign bit twice to sign-extend the value out to 45 bits. Note that this unit 88 defines how the delayed versions of the State Machine control signals are combined, and in some cases not all bits of all buses are present coming from the State Machine.

In the Fraction Math Logic (INFMATH) 90 input data comes from the A read port of the 3-Port RAM (RAM_ADO) and is treated as a 0.6 twos-complement number. The input data is registered, and then one of several arithmetic functions is applied to it. The result is a 2.6 twos-complement number which is registered and output as FMATH[7:0].

The Normalizer (INNORM) 92 input is the output of Formatter 82. It is a 43-bit twos-complement number. The position of the decimal point varies, and is irrelevant as far as the Normalizer is concerned. The Normalizer reduces the number of mantissa bits from 43 to 29 by adding a 4-bit exponent. The outputs of the Normalizer are registered.

The Multiplier (INMUL) 94 receives three inputs: the Normalizer mantissa and exponent outputs (NORM[28:0] and NORM_EXP[3:0]) and the Fraction Math output (FMATH[7:0]). The values on NORM[28:0] and FMATH [7:0] are multiplied using two's-complement math. The 37-bit result, MUL[36:0], is registered. The multiply macro itself contains a pipeline register so the total delay from input to output is 2 clocks. To keep the mantissa and exponents in sync, the Multiplier unit double registers NORM_EXP. The output of the second register is called MUL_EXP[3:0]. Since the FMATH input is a [2.6] fixed point number, the exponent should be incremented by 6 because this is the number of places that the decimal point in NORM shifts as a result of the multiply. The denormalizer accounts for this 6-bit shift.

The Denormalizer (INDENORM) 98 inputs are the mantissa and exponent outputs of the Multiplier (MUL[36:0] and MUL_EXP[3:0]). The Denormalizer performs a shift operation to return the number to a 43-bit fixed-point format. It accounts for the Normalizer and Multiplier algorithms and performs the shift so that the decimal point is correctly returned to its original location. The output is registered.

The Adder (INADD) 98 is simply a registered adder fed by two registered muxes. The A and B-mux register outputs feed the adder itself, which is a 45-bit fast parallel adder. The adder has no carry in or out. It is not pipelined at all internally, but a register is placed on its output. The register output (ADD[44:0]) is a unit output.

The Comparator (INCMP) 100 is simply a 19-bit twos complement less-than comparator with a registered output. Bits 27–9 of the formatter output (FMT) are compared to bits 27–9 of the Adder's B-mux output (ADD_BMUX). The output of INCMP (CMP) is high when FMT <ADD_BMUX, low otherwise. This output is used by the state machine to compare S1.X to S2.X to determine proper vertex ordering.

The Output Mux (INOMUX) 102 includes two-to-one muxes. These muxes select which data values go to the Pixel Generator on which buses. Normally calculated values are placed on the B output bus (LDDATAB) and non-calculated values are placed on the A output bus (LDDATAA). However, during IGB command processing, the opposite arrangement is often needed. The Output Mux accommodates these situations.

Input Unit Operation is now described in detail.

Slicer/Dicer 34 must perform a series of calculations on the data provided by Setup ASICs 32 before it can begin the pixel generation process. Input Unit 68 performs these calculations.

For each line-segment making up a point, line, or triangle, Input Unit 68 receives the X and Y-coordinate values for the left end-point, the X and Y-coordinate values for the right end-point, the slope value, and the inverse slope-value. The Pixel Generator Unit requires three additional data values for each line-segment that Input Unit 68 must calculate. These values are the X-on-next-Y, the Y-on-next-X, and the Segment Configuration Value.

Referring to FIG. 17, the X-on-next-Y value is the first X-intercept with the first integer Y value the segment intersects moving from the segment's left end-point to the right. Stated differently, beginning at the left end-point of the segment, move along the segment until you reach a point on the segment which has an integer Y-coordinate value (i.e., which intersects the horizontal grid). The X-coordinate of this point is defined as the X-on-next-Y value for the line-segment. One special case should be noted. When the left end-point has an integer Y-coordinate value, this is ignored and the next point along the line-segment having an integer Y-coordinate value is found.

For an arbitrary line-segment, the X-on-next-Y value can be calculated as a function of the X and Y-coordinates of the left end-point and the inverse slope. This is illustrated in FIG. 17. Note that slightly different formulas apply depending on the sign of the inverse slope. Note also that in the case of a horizontal line (i.e., inverse slope equals 0) the X-on-next-Y value is undefined. Input Unit 68 doesn't detect this case, but instead generates an incorrect value. The Pixel Generator doesn't use the X-on-next-Y value in this case anyway, so generating a garbage value is acceptable.

Referring to FIG. 16B, the data path through the Input Unit to calculate the X-on-next-Y value is now described.

The X and Y-coordinate values are received from the Setup chips before the inverse-slope. Since the Input Unit needs all three values to perform the calculation, the X and Y values must be stored somewhere until the inverse slope value arrives. They are received as [13.6] twos-complement numbers from the Setup chips, go through the Input FIFO (INFIFO), are reformatted into [28.15] twos-complement numbers by the Formatter (INFMT), are sign-extended to [30.15] twos-complement numbers, and are written into the 3-Port RAM (INRAM).

Later, the inverse slope value arrives. It is received as a [15.15] twos-complement number, goes through the Input FIFO (INFIFO), is reformatted into a [28.15] twos-complement number by the Formatter (INFMT), is normalized down to a 29-bit mantissa and a 4-bit exponent by the Normalizer (INNORM), and enters the Multiplier (INMUL). Concurrently, the 6 most-significant fraction bits of the Y-coordinate for the left end-point are read out of the 3 Port RAM (INRAM) and into the Fraction ALU (INFMATH), which applies the following formula:

if (I<0) f (fracy)<=−fracy;

else $f$ (fracy)<=(1−fracy);

end if;

where fracy is the fractional Y-coordinate value and I is the inverse slope. The result is a [2.6] twos-complement number that enters the Multiplier (INMUL).

The adjusted fractional Y-coordinate value is multiplied by the normalized inverse slope. The result is denormalized back to a [28.15] twos-complement number by the Denormalizer (INDENORM) and enters the Adder (INADD). Concurrently, the X-coordinate for the left end-point is read out of the 3 Port RAM (INRAM) and also enters the Adder. The two values are summed and the resulting [30.15] twos-complement number, which is the X-on-next-Y value, passes through the output mux (INOMUX) and onto the B bus, which is normally used for calculated values, and goes to the Pixel Generator.

The Y-on-next-X value is the first Y-intercept with the first vertical span boundary that a segment intersects, moving from the segment's left end-point to the right. Beginning at the left endpoint of the line-segment, the first point on the segment which has an integer X-coordinate value (i.e., which intersects the vertical grid) is found. The Y-coordinate value of this point is defined as the Y-on-next-X value for the line-segment.

As will be noted, the Y-on-next-X calculation and the X-on-next-Y calculation are very similar. Essentially the same special case that was noted above must also be noted here. That is, where the left end-point has an integer X value, it is ignored and the next point having an integer X-coordinate value along the line segment is found.

For an arbitrary line-segment, the Y-on-next-X value can be calculated as a function of the X and Y-coordinates of the left end-point and the slope. This is illustrated in FIG. 18. Note that in the case of a vertical line, the Y-on-next-X value is undefined. The Input Unit doesn't detect this case, but instead generates an incorrect value. The Pixel Generator doesn't use the Y-on-next-X value here so generating a garbage value is acceptable.

The data is shuffled through the Input Unit data path in the same manner as for the X-on-next-Y calculation, except that Y values replace X values and vice-versa, slope replaces inverse-slope, and the Fraction ALU (INFMATH) applies the simpler formula:

$f$(fracy)<=(1−fracy);

where fracy is the fractional Y-coordinate value. Otherwise, everything is identical.

The Segment Configuration Values are calculated by the state machine. The only assistance the Data Path renders is in identifying inverse slope values of zero, via a comparator located in the Formatter (INFMT), and in comparing coordinate values, via the Comparator (INCMP).

The various values that make up the Segment Configurations are now described.

A segment is defined to be invalid if it does not exist in the object or is vertical. The designation of vertical segments as invalid is made because the area above a vertical line is always zero, and the area is all the Pixel Generator is interested in.

The rules for determining the validity of a segment are simple:

(1) If the segment index is 3 and the object is a triangle, the segment is invalid (since a triangle only has segments 0, 1, and 2).

(2) If the segment is vertical (i.e., its inverse slope is 0, as determined in the Formatter [INFMT]), the segment is invalid.

(3) Otherwise, the segment is valid.

The sign bit identifies whether the segment forms part of the top or bottom of the object. Specifically, it is set high if the segment forms part of the top of the object, otherwise it is set low. The vertex ordering rules defined by the Setup chips determine how this bit is set. For objects having 4 segments, segments 0 and 1 always form the bottom of the object and segments 2 and 3 always form the top of the object.

For a triangle, segment 0 always forms part of the bottom of the triangle and segment 2 always forms part of the top of the triangle, but segment 1 can go either way. The simplest way to determine its status is to compare the vertex 1 X-coordinate (P0.X) to the vertex 2 X-coordinate (P2.X) to find whether vertex 1 lies to the left or right of vertex 2. If it lies to the left than segment 1 forms part of the bottom of the object, otherwise it forms part of the top.

The left and right end-point indexes identify which vertices form the left and right end-points for a segment. Their encoding following the numbering convention discussed above.

The vertex ordering rules defined by the Setup chips determine how these field should be set. For every point, line, or triangle the Input Unit receives, a base color value is received for each axis that is to be interpolated. Color is to be understood in its broader sense. The problem is that these color values correspond to the correct values to be applied at the first received vertex of the polygon (i.e., at P0.X, P0.Y), while the Pixel Generator expects the base color values to be correct for the center of the pixel containing the first received vertex. Thus the Input Unit must adjust the base values.

Figure 19:
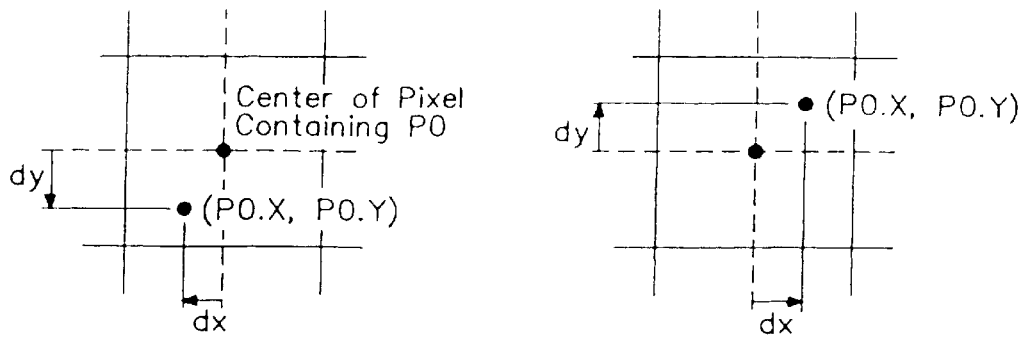
FIG. 19 illustrates the adjusted base color formulas used by the Rendering ASIC of this invention.

For any given color axis (such as a hypothetical axis C), the adjusted base value (AB.C) can be calculated as a function of the P0.X and P0.Y-coordinates, the B.C (C-Base) value, the DX.C (C-X-Gradient) value, and the DY.C (C-Y-Gradient) value. This is illustrated in FIG. 19.

Referring to FIG. 16B, the P0.X and P0.Y-coordinate values are received first from the Setup chips. They are received as [13.6] twos-complement numbers, pass through the Input FIFO 72, are reformatted into [28.15] twos-complement numbers by the Formatter 82, and are written into the 3-Port RAM (INRAM). Later the DX.C and DY.C values are received simultaneously and pass through the Input FIFO 72. At this point, since the data path can only accommodate one value at a time, DX.C and DY.C are serialized so that DX.C comes first and DY.C comes one cycle later. They are sign-extended by Formatter 82, normalized by Normalizer 92, and sent to Multiplier 94. Concurrently, the six most significant fraction bits of P9.X and P0.Y (in that order) are read out of the 3 Port RAM 88, and pass into the Fraction ALU 90, which applies the following formula:

$$f(\text{frac}) <= 0.5 - \text{frac};$$

where frac is the fractional X or Y component. The results are [2.6] twos-complement numbers, which enter the multiplier 94 and multiply DX.C and DY.C, respectively. The normalized [DX.C*(0.5 −frac(P0.X)] and [DY.C*(0.5−frac (P0.Y))] products are denormalized by Denormalizer 96. The DX.C term enters Adder 98, is loaded into its A input register, and is moved into the B input register. At this point, the DY.C term is loaded into the A input register, and the two numbers are summed. The result exits Adder 98 and is fed back up and stored in INRAM 88. Later the B.C. value is received and goes through Input FIFO 72. Formatter 82 zero-extends the value and pads it with sufficient additional fraction bits such that its decimal point location is coincident with that of the DX.C and DY.C values. It then is normalized by Normalizer 92 and passes into Multiplier 94. Fraction ALU 90 output is forced to 1.0, and this value enters the other input to multiplier 94. the B.C value leaves Multiplier 94, is denormalized by Denormalizer 96, and enters Adder 98.

Concurrently, the previously calculated [[DX.C*(0.5−frac (P0.X)]+[DY.C *(0.5−frac(P0.Y))]] value is read out of 3-Port RAM 88 and enters Adder 98 via the B input. The B.C value is added to this value, and the result, which is the AB.C value, passes through output mux 1092 and onto the B bus, which is normally used for calculated values, and goes out to Pixel Generator 70.

Many of the values that Pixel Generator 70 requires are provided directly by the Setup chips. This data makes a relatively short journey through the Input Unit data path. A value that Pixel Generator 70 requires is received from Setup ASIC 32, goes through Input FIFO 72, is reformatted as necessary by Formatter 82, passes through output mux 102 and onto the A bus, which is normally used for non-calculated values, and goes to the Pixel Generator 70.

Some of the values that Pixel Generator 70 requires are implied by the type of object being rendered. For example, the slope and inverse slope of the line segments making up a Rectangle or Next-Pixel are all 0 or infinity. Values such as these are not transmitted by the Setup chips, and hence must be synthesized by Input Unit 68. To accomplish this, Formatter 82 has the capability to output certain hard-coded values (e.g., 0.0 and 1.0). These values then pass through output mux 102 and onto the A bus, which is normally used for non-calculated values, and go to Pixel Generator 70.

Figure 20:
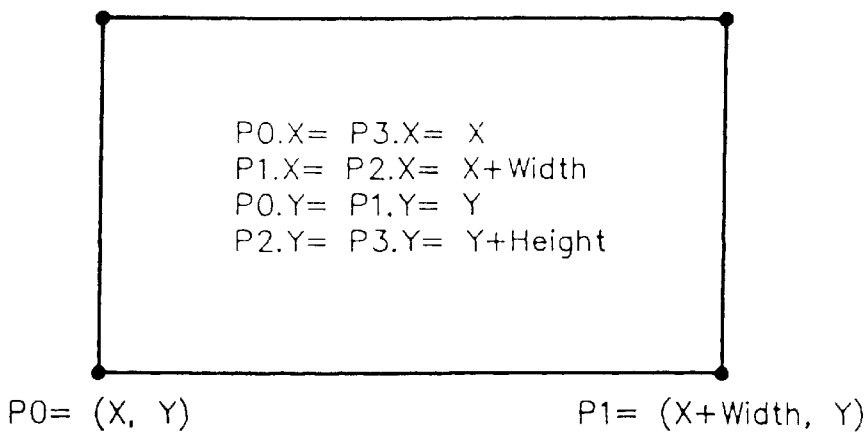
FIG. 20 illustrates the rectangle formulas used by the Rendering ASIC of this invention.

To Pixel Generator 70, a rectangle is no different from any other object; it requires the X and Y-coordinate values for all 4 vertices, much like a line. However, Setup ASIC 32 does not provide the information in this format. Instead, it provides the X and Y-coordinates for the bottom point and the width and height of the rectangle. The coordinate values for the three remaining vertices can be calculated as a function of this information, as illustrated in FIG. 20. Because of the symmetry of the object, only two values need be calculated: X+Width and Y+Height.

Referring to FIG. 16B, the X and Y-coordinate values are received from the Setup chips. They are received as [13.6] twos-complement numbers because the Setup chip guarantees zeros in the fraction bits, although the Input Unit doesn't require it. They then go through Input FIFO 72, are reformatted into [28.15] twos-complement numbers by Formatter 82, and are written into the 3-Port RAM 88.

Later the Width value is received. It is received as a [13.6] twos-complement number and goes through Input FIFO 72, is reformatted into a [28.15] twos-complement number by Formatter 82, and enters the A input to the Adder 98. Concurrently, the X-coordinate value is read out of 3-Port RAM 88 and enters the B input to Adder 98. The result exits Adder 98, passes through Output Mux 102 and onto the A bus, which is in most cases used for non-calculated values (but not in this case), and goes to Pixel Generator 70. The value existing Adder 98 is also fed back up and stored in 3-Port RAM 88.

After the Width Value is received, the Height value is received. It is processed in exactly the same manner as the Width, except that Y is added to it instead of X. It also goes out onto the A bus, and it also is fed back up and stored in 3-Port RAM 88.

Figures 21A, 21B, 21C:
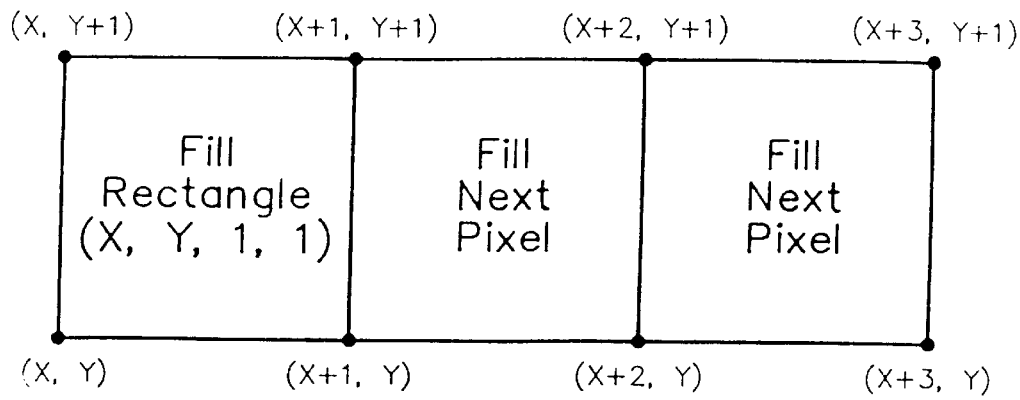
FIGS. 21A–21C, illustrates the Fill-Rectangle and Fill-In Next Pixel procedures of this invention.

It does not seem necessary to save the calculated X+Width and Y+Height values in 3-Port RAM 88, but the Fill-Next-Pixel command uses the stored values. Referring to FIG. 21A, note that the fill-next-pixel command assumes that it was preceded by a Fill-Rectangle command or another Fill-Next-Pixel, and that the Width and Height were set to 1 for that command. Thus, when the Fill-Next-Pixel command starts up, the following four quantities are present in 3-Port RAM 88: X, Y, X+1, and Y+1. The "Next" in Fill-Next implies that the X values must be incremented, so the following values are sent to Pixel Generator 90: X+1, X+2, and Y+1. The changed values must also be written back to 3-Port RAM 88 so that subsequent Fill-Next-Pixel commands will work.

Referring to FIG. 16B, the values are read out of 3-Port RAM 88 one at a time and enter the B input to Adder 98. The A input Adder 98 is forced to 1.0 for X values and 0.0 for Y values. Thus the output of Adder 98 has the correct values for the current pixel. The results exit Adder 98, pass through Output Mux 102 and onto the A bus, which is in most cases used for non-calculated values (but not in this case), and go to Pixel Generator 70. The values exiting Adder 98 are also fed back up and stored in 3-Port RAM 88.

The intercept calculations performed by Input Unit 68 for each of the rendering commands are now described.

For the base color calculations, all of the color values generated must be pixel aligned, so the base color values are initially adjusted to be aligned with the pixel in which vertex 0 is found. The equation used is:

Base_Color<=Base_Color+distx*DX.color+disty*DY.color;

where:

distx<=int(P0.X)-P0.X+0.5;

disty<=int(P0.Y)-P0.Y+0.5;

These calculations are identical for each color axis.

The pseudocode in FIG. 22B indicates the computations the Input Unit uses to find the intercepts for points. The corresponding intercepts are illustrated in FIG. 22A.

Figures 23A, 23C:
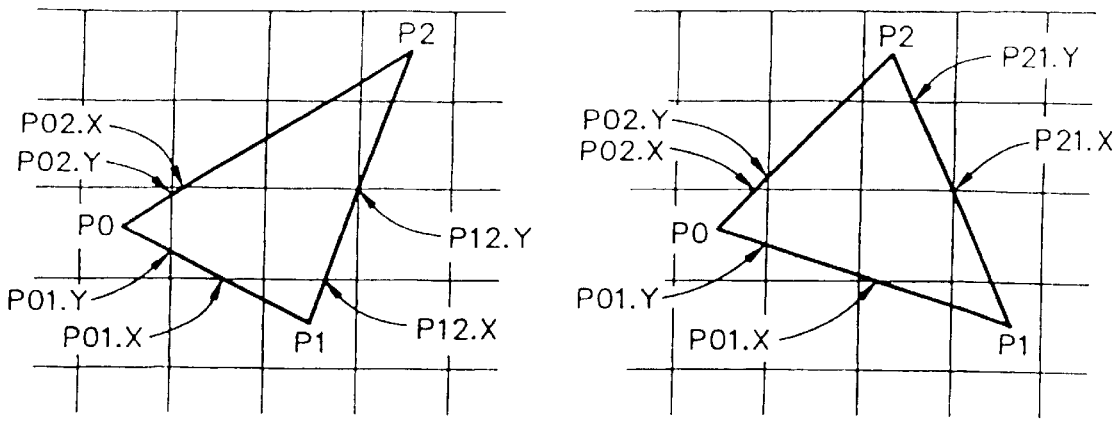

The pseudocode in FIG. 23B indicates the computations input unit 68 uses to find the intercepts for triangles. Note that there are two cases for the segment joining P1 and P2. The corresponding intercept points are illustrated in FIG. 23A for both cases. The input unit 68 performs the computations shown in FIG. 22C to find the intercepts for lines.

The intercept points illustrated in FIG. 22A for a point are also appropriate for lines. Since the majority of the logic in Slicer-Dicer chip 34 "thinks" only in terms of polygons, objects made up of three or four line segments, input unit 68 synthesizes segment parameters that are implicit in IGB commands. The differences between the various objects presented at the input is therefore hidden from pixel generator unit 70.

Line segments must be generated for all objects. In the case of points, lines, and triangles the segments are supplied by setup chips 32; however, in the case of IGB commands, the shape of the object is implicit, and hence the segment parameters must be synthesized. For, example, a pixel shaped box must be created to represent a fill-next-pixel. All IGB commands are handled similarly. The VHDL pseudocode in FIG. 21B indicates the intercept assignments and calculations for the fill-rectangle and fill-stipple commands. The VHDL pseudocode in FIG. 21C indicates the intercept assignments and calculations for the fill-next-pixel command.

The Pixel Generator Unit: Pixel generator unit 70 includes the three subunits shown in FIG. 16C. Each of these subunits breaks down the segments of a polygon primitive until the values for the axes of each pixel in the primitive can be calculated. The first unit (PIXGENA) latches the vertex, slope and intercept data that are provided by setup chip 32 and input unit 68. PIXGENA processes the integer portion of the X-coordinates of the polygon's vertices in preparation for the slicing operation, which is performed in the second unit (PIXGENA).

The second unit (PIXGENB) uses the processed vertex information to slice the primitive into a series of vertical spans. PIXGENB walks the edges of the polygon starting with the left-most vertex. As it walks through the spans, a series of segment processors determine the first and last pixels to be rendered. This segment information is passed to the third unit (PIXGENC).

The third unit (PIXGENC) is responsible for generating any pixels in a span that are touched by a portion of a polygon primitive. PIXGENC generates values for the X, Y, Z, A, R, G and B axes. The A axis value is also calculated for each pixel. If transparency is enabled, the T axis value is calculated and is multiplied with A. If patterns are enabled, PIXGENC also calculates values for the U and V axes.

Pixel generator 70 receives data into a set of pipeline registers. When all needed data have been received, the contents of the pipeline registers are loaded into working registers and pixel generator 70 proceeds to process the data. The pipeline registers are fed by a set of data buses that originate in the output mux 102 of input unit 68. The pipeline registers are controlled by load enable signals provided by input unit 68. A multiplexed addressing scheme is used by input unit 68 to access the pipeline registers. The handshake between input unit 68 and pixel generator unit 70 requires input unit 68 to load a valid X-coordinate value for the first vertex and asserts XOVLD to signal to pixel generator to begin its slicing operation. Subsequently, input unit 68 loads the remaining X-coordinate values into the vertices' X-coordinate registers and then asserts XVLD to signal to pixel generator 70 to begin X axis processing. Input unit 68 then loads the reset of the vertex and segment pipeline registers. When all needed pipeline registers have been loaded, input unit 68 asserts XYVLD to signal pixel generator 70 that all of the pipeline registers contain valid information. When pixel generator 70 is ready to begin processing the data, it asserts SYSTB on the cycle during which it is loading the contents of the pipeline registers into the working registers. On the following cycle, input unit 68 may begin loading new data into the vertex and segment pipeline registers.

Pixel generator 70 manipulates some of the information while it is still sitting in the latches instead of waiting to empty it into the working registers. The X-coordinates for the vertices are so manipulated. To facilitate this optimization, input unit 68 generates two additional signals: XOVLD, which is asserted as soon as the vertex zero X-coordinate latch is full (this value is needed first); and XVLD, which is asserted as soon as the remaining vertices' X-coordinates latches are full (these values are needed later). Both XOVLD and XVLD are deasserted with XYVLD.

Color values are handled using a separate handshake. Input unit 68 proceeds to load the necessary color pipeline registers into latches. When all needed pipeline registers have been loaded, input unit 68 asserts CVLD to signal pixel generator 70 that all of the pipeline registers contain valid information. When pixel generator 70 is ready to begin processing the data (generally several cycles after it begins processing the vertex and segment information), it asserts CSTB on the cycle during which it is loading the contents of the pipeline registers into the working registers. On the following cycle, Input Unit 68 may begin loading new data into the color pipeline registers.

Input Unit 68 stores lower pipe commands in the Lower Pipe FIFO 84. Whenever Pixel Generator 70 is not working on a polygon, it checks FIFO 89 for commands, and if present, sends the commands on to Blender 36. When a "Load-Slicer" command is encountered, Pixel Generator 70 discards it and responsively proceeds with the next polygon.

Polygon Processing Unit (PIXGENA) Operation: The PIXGENA unit (FIG. 16C) processes the vertex information from Input Unit 68 in preparation for slicing polygon primitives into a series of vertical spans. The resulting calculations made by this section are output to the span processing unit, PIXGENB. PIXGENA also contains a set of vertex registers which are loaded from the Input Unit.

The Vertex Registers are loaded with values from a primitive such that the left most vertex is loaded in the vertex 0 registers. Each successive vertex coordinate register is loaded with the polygon's next counterclockwise vertex. FIG. 24A lists the vertex registers and their corresponding load signals. The numerical format indicates the signal's internal representation (TC=Twos Complement). Each of the PIXGENA inputs is stored in a register with outputs to PIXGENB.

The Span Counter and Divide Units work together. Their main task is to calculate the position of the vertices relative to the vertical spans that will be rendered.

The Divide Unit receives up to four vertices from Setup ASK32, the first of which is guaranteed to be the left-most vertex in the polygon. This first vertex is divided by 5 to obtain the X divided by 5 value for the first span with which the polygon intersects (moving from left to right), and for which it is responsible. This value is called PAB-SPANX. The Divide Unit also calculates the number of spans from the first span intersecting the polygon to the first span intersecting the polygon for which the chip is responsible. This value is called PABOFFSET. PABSPANX is the span number for the first span to be processed while PABOFFSET is the number of spans from the left-most vertex to the first span the slicer is responsible for. The integer portion of PABVXO is subtracted from the SPAN location by adding (4—the Span location) to PABVXO to locate this vertex relative to the first active span. The integer result is left in BX (12:0).

Vertex information processing begins as soon as LDVX (0) is strobed and vertex zero's coordinates are loaded. Once the Vertex 0 X-coordinate register is loaded, a Mealy state machine is started. This immediately starts a multiple stage division process that divides the integer portion of the X-coordinate register by 5 to generate a base for the blender X-coordinates. It also calculated the X-coordinate mod 5 to determine the offset to the next active span. These values are output as PABSPANX AND PABOFFSET respectively. The VHDL pseudocode in FIG. 24B provides the formulas used. Note that the negative cases must be handled in the case of wise lines or points where vertices may take on negative values.

While the Divide unit is calculating PABSPANX and PABOFFSET, another unit is adjusting the integer component of the X-coordinate for the other three vertices so that they represent offsets from the left-most point instead of absolute coordinate values. A subtractor running in parallel to the divider calculates the following:

$$\text{int(PABVX1)} \leq \text{int(PABVXO)} - (\text{PABVX1});$$

$$\text{int(PABVX2)} \leq \text{int(PABVXO)} - (\text{PABVX2});$$

$$\text{int(PABVX3)} \leq \text{int(PABVXO)} - (\text{PABVX3});$$

These three subtract operations occur sequentially so that they may share the same subtraction logic. Since PABVXO is the left-most X-coordinate, the other X-coordinate values are less than or equal to 0. Once these calculations are complete, these values along with PABOFFSET are passed to the Span Counter Unit located in PIXGENB, which maintains a counter for each vertex.

The segment registers contain the values that are needed by the Span Processor Unit (PIXGENB). The Polygon Processing Unit (PIXGENA) only registers these values, it does not modify them. FIG. 24C lists the segment registers and their corresponding load signals. The column labeled "output" indicates the new signal name assigned to these inputs once they are latched. The functions of the segment configuration registers PABSCFG(3:0) are defined in FIG. 24D.

Span Processing Unit (PIXGENB) Operation: The Span Processing Unit (FIG. 16C) primitive into a series of vertical spans. It processes the information needed for each span that has at least a portion of a line segment crossing it. It uses the adjusted values for the X-coordinates of the vertices to load a series of increment by 5 counters. These counters step through the spans for which the chip is responsible. At each span, a set of four segment units processes the vertex and slope information and determines the segment intersection points with the edges of the span. They also determine the bottom and top pixels that bound the primitive within the span. These values are provided to the area calculator within the Pixel Processing unit (PIXGENC).

The PIXGENB unit includes the span counter unit (PBCNT), the segment unit (PBSEG, and the segment control unit (PBCTL. These are now described.

The Span Counter Unit (PBCNT) processes the integer portions of the X vertex coordinates. A counter is maintained for each vertex. The count value for a given vertex reflects the positional relationship between the vertex and the current span. Initially, the vertex counter (XCNTREG0) is loaded with PABOFFSET and the other counters (XCNTREG[1:3]) are loaded with PABVXn+PABOFFSET (n=1,2,3). These values are correct for the first span. When the first span has been completed, the counters are all incremented by 5 so that the values are correct for the second span. This process continues until all spans have ben processed.

The Span Counter Unit (PBCNT) also receives the PABSPANX value, which it increments after every span, and which is passed down the pipeline and eventually supplied to Blender ASICs 36 as the X-coordinate for all pixels in a span. When XYSTB is asserted by the PBCTL unit indicating that the PBSEG unit is ready to process the next polygon, the counters are loaded with the following values:

XCNTREG0<=PABOFFSET:

XCNTREG1<=Int(PABVX1)+PABOFFSET:

XCNTREG2<=Int(PABVX2)+PABOFFSET:

XCNTREG3<=Int(PABVX3)+PABOFFSET:

Also, the following signals, which will be used by the Pixel Processing unit (PIXGENC), are also loaded:

PBCX<=Int(PABVX))+PABOFFSET;

PBCXD5<=PABSPANX;

PBCNT performs the slicing of the X axis by 5. It accomplishes this with a series of increment-by-5 counters. When PBSTEP is asserted by the PBCTL unit, indicating that the PBSEG unit is ready for the next span, the counters are incremented as the following equations illustrate.

XCNTNXT0<=XCNTREG0+5;

XCNTNXT1<=XCNTREG1+5;

XCNTNXT2<=XCNTREG2+5;

XCNTNXT3<=XCNTREG3+5;

PBCX<=PBCX+5;

The PBSTEP signal is asserted by the PBCTL unit after each span has been processed. The integer X-coordinate values are then adjusted by transferring the data from the XCNTNXT(3:0) registers back into the XCNTREG(3:0) registers. Both the XCNTNXT(3:0) and XCNTREG(3:0) registers are output to each of the four segment PBSEG units. PBCNT also provides an adjusted value for the output X-coordinate. The Blender X-coordinates represent every 5th span. Consequently, when the X-coordinates are incremented by 5 in the counters, the output span X-coordinate (PBCXD5) is incremented by one, so that PBCXD5<=PBCDX5+1.

The XCNTREG(3:0) register outputs are two-complement values. Notice that a segment's end-point lies to the right of the current span as long as the counter corresponding to its end-point lines to the right of the current span as long as the counter corresponding to its end-point is still negative. While the adjusted X-coordinates corresponding to the XCNTREG(3:0) registers are negative, the corresponding segment's end-point lies to the right of the current span. When the count value for a given segment's right end-point is zero or positive, the segment is no longer valid for the current span. PBCNT also latches two other inputs from PIXGENA needed by the PIXGENC. The PBCNT unit outputs are summarized in FIG. 25.

The Segment Unit (PBSEG) processes raw data for a segment, digesting it into the span-specific information needed by a Segment Span Unit. It receives information from several sources: directly from the Setup chips; from the Input Unit; from the Span Counter Unit (PBCNT); and from the Segment Control Unit (PBCTL).

From the Setup chips, the Segment Unit receives the X-coordinates of the polygon's vertices (PABVXn) and the slopes (PABSS) and inverse slopes (BABSI) of the polygon's segments. In some cases, these quantities are not generated by the Setup chips, in which case appropriate values are synthesized by Input Unit 68.

From Input Unit 68, the Segment Unit receives a configuration word and two intercept values. The configuration word contains a bit indicating if the segment is valid for the current polygon, and two sets of bits indicating which polygon vertices are the left and right end-points for the segment (PABSCFG). The first intercept value provided is the X-on-next-Y value (PABSXYN) which is the X-coordinate value of the first point on the segment, moving from left to right, for which the Y-coordinate is an integer. Similarly, the Y-on-next-X value (PABSYXN) is the Y-coordinate value of the first point on the segment, moving from left to right, for which the X-coordinate is an integer.

From the Span Counter Unit (PBCNT), the Segment Unit receives an integer value for each polygon vertex. This value indicates the vertex's positional relationship to the current span. It is the floor of the X-coordinate of the vertex subtracted from the X-coordinate of the left boundary of the span. Thus, if the vertex lies to the right of the span, the value is negative, otherwise it is positive.

For each span, the Segment Unit examines the count values for the left and right end-points of the segment to determine the segment's positional relationship to the span. Depending upon the position, the left intercept with the span may be coincident with the left end-point or it may be at some intermediate point along the segment. All of these intermediate points can be calculated by iteratively adding the slope to the Y-on-next-X value. Similarly, the right intercept may be coincident with the right end-point or it may be at some intermediate point along the segment. Again, these intermediate values can be calculated iteratively.

The fractional X-offsets (PBCSX0 and PBCSX1) are also a function of the count values. For the normal case, the left offset is 0 and the right offset is 1.0. If, however, the segment begins in the current span, then the left offset is adjusted accordingly. Likewise, if the segment ends in the current span, then the right offset is adjusted accordingly The adjusted offsets are transmitted to the Segment Span Unit (PCSEG).

Once the left and right intercepts have been calculated, they are sorted according to vertical position. The lower intercept is then given to the Segment Control Unit (PCCTL), which takes the lower intercept for all four segments, determines the minimum, and generates the necessary Y-axis translation value. The Segment Unit then translates all of its Y values, including the left and right intercepts. The resulting left and right intercept values are broken into integer and fractional components. The fractional components (PBCSYX0, PBCSYX1) are transmitted directly to the Segment Span Unit. Both integer components (PBCSC0, PBCSC1) are decremented if their respective fractional component is zero, after which they indicate the number of pixels to be by the Area Calculator before it processes the first and last pixels, respectively, with which the segment intersects. These values are transmitted to the Segment Span Unit (PCSEG) separately.

Once the left and right intercepts have been calculated, sorted, and adjusted, the fractional location at which the segment intersects the first horizontal pixel boundary (PBCSXYN) may be calculated by iteratively adding the inverse slope to the X-on-next-Y value until it reflects the intercept between the segment and the first integral Y value which is greater than the lower intercept. The result of this calculation is passed to the Segment Span Unit (PCSEG). Each of the PBSEG Segment Units receives the inputs listed in FIG. 26A. The Segment Unit (PBSEG) provides the output signals listed in FIG. 26B to the Segment Span Processing Unit (PCSEG). The Segment Unit output configuration word is defined in FIG. 26C.

There are four identical PBSEG units in the Span Processing Unit, one for each of the up to four segments possible per polygon so the output names assigned to each unit are unique. In addition, the PBCNT unit latches some signals for use by the next unit. The output names assigned at the top level of the Span Processing Unit (PIXGENB) are listed in FIG. 26D. All of these outputs are connected to the input of the Pixel Processing Unit (PIXGENC). Only two configuration bits from each Segment Unit are sent to the Segment Span Units within the Pixel Processing Unit (PIXGENC).

The Segment Units include input mixes and registers that are now described.

Some of the segment units are preceded by input multiplexers, which allow the correct end-point data to be loaded into the unit's internal registers. Segments 1 and 2 are the only ones which require these muxes since their end-points are the only ones which may have different vertices for the right or left side. There are three non-trivial cases which these muxes must satisfy. The vertexes needed by each segment Span Unit are listed in FIG. 26E.

The input registers hold the vertex values selected by the input muxes and the segment values provided by other units. These signals are latched when the XYSTB signal is asserted by the Span Processing Control Unit (PBCTL). The following signals are latched in the CFGREGS block in the schematic when the XYSTB signal is asserted:

SREG≦PABSS;—Segment Slope
IREG≦PABSI;—Segment Inverse-slope
CFGREG≦PABSCFG;—Segment Configuration Word
XLREG≦frac (PABVXL);—Left end-point's fractional X-coordinate
XRREG≦frac (PABVXR);—Right end-point's fractional X-coordinate The following signals are latched in the XYREGS schematic block when XYSTB is asserted:

YXOREG≦PABVYL;—Left end-point's Y-coordinate
XYREG—PABSXYN;—Segment's X-on-next-Y intercept The following signals are latched in the YXREGS schematic block when XYSTB is asserted:

YXOREG≦PABVYL;—Left end-point's Y-coordinate
YX1REG≦PABSYXN;—Segment's y-on-next-X intercept
YXRREG≦PABVYR;—Right end-point's Y-coordinate X-offsets are normally 0.0 for the left offset (PBCSXO) for the right X-off-set (PBCSX1). The only time this is not true is when the vertex of concern is within the current span. To detect this, the Segment Unit checks for a zero count value in the corresponding vertex's counter (PBXCNTn). The logic for this illustrated by the pseudocode in FIG. 27A. The Y-intercept values (YXOREG, YX1REG) are calculated from the Y-on-next-X value (PABSXYN) and the slope (PABSS) by cumulatively adding the slope to Y-on-next-X. When a segment first becomes valid for a new span, the integer value of the X-coordinate of the left vertex becomes important, because it determines how many times the slope must be added to Y-on-next-X before the correct Y-intercepts are found. This is a special case; all the remaining intercepts are found by adding the slope to the Y-on-next X value exactly 5 times.

Referring to the illustration on the left in FIG. 27B, the shaded region represents the area we want to calculate for the polygon shown when the Slicer/Dicer is set to span 0. The count value for the left end-point of segment 0 (PBCNTL) is 1. In this case the left span intercept (YXOREG) happens to coincide with Yon-next X. The right span Y-intercept (YX1REG) is round by adding the slope to Y-on-next-X (PABSXYN) just one. In the right of FIG. 27B, the left end-point for segment 0 lies 2 spans away (PBCNTL=2). The left span intercept (YXOREG) is found by adding the slope once to Y-on-next-X. Adding the slope once more locates the right span Y-intercept (YX1REG). When Y-on-next-X is two or more spans away, the Y-intercepts are calculated by shifting and adding to reduce the level of processing.

The mechanics of this processing are controlled by a state machine internal to each Segment Unit. The state machine starts from either the INVALID or VALID states. When XYSTB is asserted at the beginning of a new polygon, YX1REG is loaded with the Y-on-next-X value (PABSYXN) and YXOREG is loaded with the segment's left vertex Y-coordinate (PABVYL). The state machine then advances to the MOVEXO state where it checks when a segment becomes valid for the current span. It does this by checking three conditions. First, the valid bit in the segment's configuration register 9CFGREG[5]) must be set. Second, it checks that the current span is to the right of the segment's left end-point by checking that the segment count (PBXCNTL) is greater than 0. Third, it determines if the segment's right end-point is to the right of the current span by checking that the right vertex's X counter is less than 0. If the segment is valid, a 2 big shift encode work (SSSEL) is set. The shift value is either 0, 1 or 2.

The state machine then enables the loading of the accumulator (ISSNEXT) through a barrel shifter by asserting the SSEN signal. The barrel shifter is controlled by the SSSEL shift bits. Another control bit from the state machine determines when an add accumulation will occur. When the computations are complete, the results are stored in output registers (see FIG. 26B) and made available to the segment span processing units (PCSEG).

The state machine then proceeds to the X-intercept calculation. The X-intercept value (XYREG) is calculated from the X-on-next-Y value (PABSXYN) and the inverse slope (PABSI) by cumulatively adding the inverse slope to X-on-next-Y. Unlike the Y-intercept calculation, the number of times to do this add operation is not fixed, but varies with the inverse slope of the line. Like the Y-intercept calculation, shifting and adding is used to reduce processing. To determine the multiplication factor (number of repeated adds), the X-intercept calculation uses the integer results of the Y-intercept calculations. The difference between the lowest integer Y-on-next-X value for the next span and the integer Y value of X-on-next-Y gives the multiplier. The number of full horizontal spans between the left vertex and the desired X-intercept is the difference between the integer value of the lowest span Y-intercept and the Y-coordinate of X-on-next-Y. This is exactly the multiplier. To find the integer Y value of the current X-on-next Y value (PABSXYN), the sign of the slope (PABSS) and the integer Y value of the left vertex for the segment (PABVYL) are examined. There are found possible cases, which are shown in FIG. 27C. Note that one case uses the value of the vertex, one uses one minus the vertex value, and two that use one plus the vertex value. Once the multiplier is determined, the unit calculates the next span X-intercept value in a manner similar to that of the Y-intercept calculation. The result is stored in XYREG. Note that it is the lowest X-intercept within the span that is calculated and not the left-most one (See FIG. 27B).

After the Y-intercept calculations, the state machine uses the slope to determine which of the two is the lowest. Each of the four segment units provide this value to the segment control unit (PBCTL). The segment control unit determines which of these is the lower. Once determined, this value is subtracted from all the integer Y values for each output. The adjusted integer values of the lower and upper span Y-intercepts are latched and provided to the segment span units (PGSEG) in PBCSC0 and PBCSC1, respectively. These integer Y values represent the first and last valid pixels to be processed in the current span for which the segment is valid.

The inverse slope is modified slightly by this unit so as to reduce the number of bits required. A sign reduce operation is performed that reduces the value from a TC[13.15] to a TC[2.15].

The segment control unit (PBCTL) performs three functions. First, it strobes the XY data from the input unit into the working registers and handling the handshake with the input unit described above. Second, it coordinates the four segment units and determines when span processing is complete. Third, it performs the comparison of the lowest pixel intercepted by each segment and outputs the lowest one back to the segment units as discussed above.

Pixel Processing Unit (PIXGENC) Operation: The pixel processing unit PIXGENC (FIG. 16C) generates the pixels in a span that are touched by a portion of a polygon primitive. It generates values for the X, Y, Z, A, R, G and B axes. The A axis value is also calculated for each pixel. If transparency is enabled, A is multiplied by the calculated T axis value. If patterns are enabled, it also calculates values for the U and V axes. The area calculator performs antialiasing by computing the actual area covered by a portion of a polygon primitive. The area calculator has two modes of operation, one when antialiasing is switched on and one when it's not. The pixel processing unit includes two major units, the area calculator and the color interpolator.

The area calculator calculates the area of the region of intersection between a polygon and a pixel for each pixel that could possibly have a non-zero component, (such as each pixel under the polygon when antialiasing is enabled. Any polygon (point, line, or triangle) can be broken down into a number of line segments joined together. So the problem of calculating the area of coverage for the entire polygon within a given pixel can be broken down into the smaller task of calculating the area within a pixel that lies above a given line segment. This operation is performed for all non-vertical segments making up the polygon. For segments that make up the upper boundary of the polygon, (such as segments for which a line drawn from south to north leaves the inner region of the polygon when it crosses the segment, the area is taken to be negative; otherwise it is taken to be positive. After area contributions have been calculated for all segments, the contributions are summed, and the result is the area of the polygon within that pixel.

The control for the area calculator is quite simple. Four Segment Span Units (PCSEG) supply the four sets of segment data. They always begin by supplying the values for the lowest pixel in the current span for which a non-zero area is possible. When the Area Calculator has completed the pixel, it signals the Segment Span Units to advance to the next pixel. This process is repeated until the Area Calculator reaches a pixel for which all segments are either below or invalid, at which time it generates a special output token indicating that the span has been completed and waits for the next span to begin.

The area calculator unit contains two major units, the Segment Span Unit (PCSEG) and the Alpha Calculator Unit (PCAC). These units are described in detail in the following sections.

A Segment Span Unit processes the output of a Segment Unit (PBSEG) to provide pixel intercept information for the Area Calculator. Since a polygon can be composed of up to four Segments, four identical Segment Span Units are used, each receiving inputs from a separate Segment Unit. Several numbers are supplied which are passed to the Area Calculator (PCAC) unchanged: the bit indicating if the segment is valid for the current span, the bit indicating whether the segment makes up the upper or lower boundary of the polygon, and the two fractional X-offsets (PBCSX0n, PBCSX1n) defining the vertical bounding volume for the span.

Several other values are used by the Segment Span Unit to calculate pixel intercepts and to define the relationship between the segment and a given pixel within the span: The fractional locations at which the segment enters and exits the vertical bounding volume (PBCYX0n, PBCYX1n), the fractional location at which the segment intersects the first (lowest) horizontal pixel boundary (PBCSXYN), and two count values (PBCSC0n, PBCSC1n), which indicate the number of pixels which will be processed by the Area Calculator before it processes the first and last pixels, respectively, with which the segment intersects. The inverse slope of the line (PBCSIn) is also supplied, complete with sign bit. It is used to adjust the horizontal pixel intercept value upward as it moves from pixel to pixel. Its sign bit is passed on to the Area Calculator.

Figure 28A:
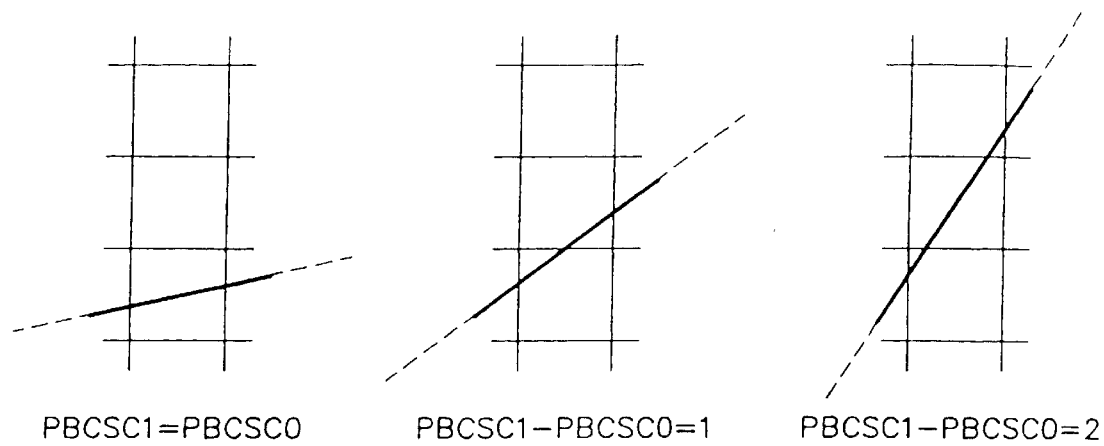
FIGS. 28A–28B, illustrate the calculation procedures employed by the Area Calculator element of the Pixel Processor Unit (PIXGENC) of the Pixel Generator Unit of this invention.

With this information, calculating pixel intercepts and defining the segment-pixel relationship for each pixel is straightforward. The segment-pixel relationship is defined based on the supplied count values as shown in FIG. 28A. The first intercept is always the lower intercept with the bounding volume and the last intercept is always the upper intercept with the bounding volume. Which is which is sorted out in the Segment Unit (PBSEG) so the Segment Span Unit (PCSEG) needn't consider it. If there are three intercepts (the count values differ by one), the second intercept is simply the first horizontal pixel boundary intersection. If there are four intercepts (the count values differ by two), the third intercept is the second horizontal pixel boundary intersection, which is derived by adding the inverse slope to the first horizontal pixel boundary intersection. The segment-pixel counters are decremented after every pixel. By continuing to accumulate the inverse slope, any number of horizontal pixel intersections can be derived, and hence any segment can be handled.

An interesting situation arises relating to the calculation of horizontal pixel boundary intercepts. Theoretically only the fractional component needs to be calculated since the intercept is implicitly within the current span. In practice, however, inaccuracies in the inverse slope values cause the horizontal pixel boundary intercepts to slowly deviate from the true values, and in some cases they may go slightly outside of the current span. For example, when stepping up a span, the value may change from 0.95 to 0.97 to 0.99 and then to 1.01. But if no integer bits are carried, the 1.01 value will appear to be 0.01. Thus an intercept that should have been very close to the right boundary of the span can end up very close to the LEFT boundary instead and the area value will show a significant error.

This invention solves this problem by carrying the least significant integer bit throughout the calculations. This integer bit is then compared to the least significant integer bit of the current span's X-coordinate, which is also supplied as an input. If the bits match, the fraction bits are correct. If the bits don't match, the value must be slightly to the left or right of the span. To determine on which side it lies, the most significant fraction bit is examined. If it is a 0 the value lies to the right of the span, and the value is clipped to 1.0. Otherwise the value lies to the left of the span, and the value is clipped to 0.0.

The Alpha Calculator Unit (PCAC) performs the actual area calculations. It receives four sets of numbers for a given pixel; one set for each of the up to four segments which could make up the polygon. These sets of numbers are provided by four separate PCSEG units. A status encoding is supplied that indicates the segment's relationship to the pixel. The segment could be invalid for the span containing the pixel, either because the segment is not define for the polygon at all, it is vertical, or it lies completely to the left or right of the span containing the pixel. The segment could be located above the current pixel, so its area is trivially 0. The segment could intersect the current pixel or lie below it, so an area value must be calculated.

Included in the status encoding is a bit indicating whether the segment makes up the upper or lower boundary of the polygon, and another bit, indicating the sign of the inverse slope of the segment (whether it tilts to the left or the right). The inverse slope sign is needed to determine which half of the pixel is within the polygon when the segment enters the pixel on the bottom and exits it on the top.

Figure 28B:
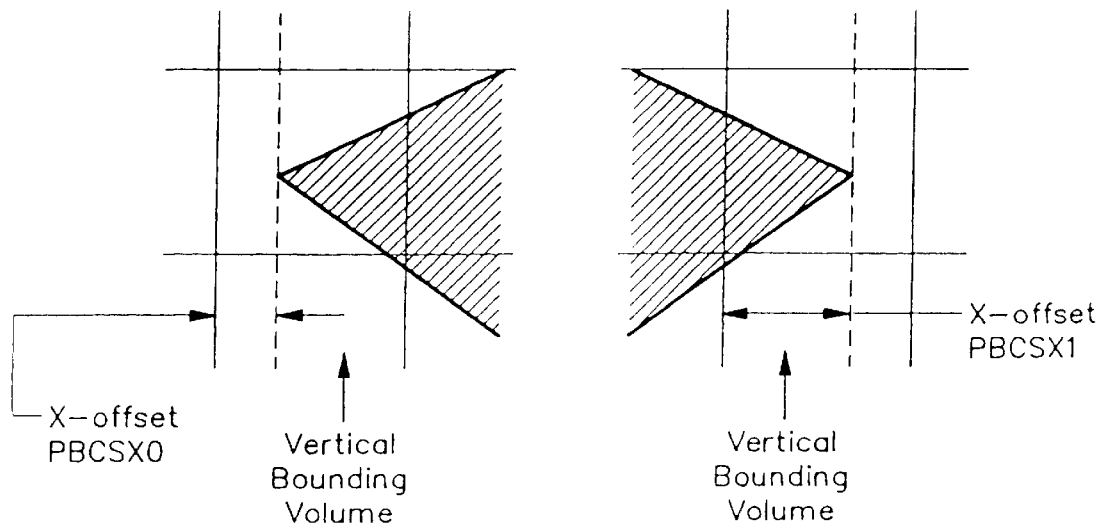

Two fractional X-offsets are supplied by the PBSEG unit. These offsets form a vertical bounding volume as illustrated in FIG. 28B. They are necessary because segments are not infinite in extent and may begin or end within the current span boundaries.

Two fractional intercept offsets are supplied by the PBSEG unit. These offsets indicate where the segment enters and exits the rectangular volume bounded by the X-offsets vertically and the pixel bounds horizontally. Each intercept offset is supplied with a code indicating which boundary it applies to (left, bottom, right, or top).

The area calculation is performed using either a square, trapezoid, or triangle formula. For example, in the case of a segment that lies below the pixel, the square formula is used to calculate the area of the rectangular volume bounded by the X-offsets vertically and the pixel bounds horizontally. Refer to FIG. 29 for the pseudocode listing of the cases and the formulae used.

Note that the situation is much simpler when antialiasing is turned off. Any pixel that could possible have a non-zero area, which is to say any pixel that has at least one segment below it or intersecting it, and for which all segments are not invalid or below it, is assigned an area of 1.0 without antialiasing.

The Color Interpolation Units: In parallel with the Area Calculation pipeline described above is a color interpolation pipeline (FIG. 30) that generates correctly interpolated color values for each pixel. Interpolation occurs on the following axes: Z, R, G, B, T, U, and V. All of these axes are considered to be "colors" because they are all treated identically.

For a given pixel, the Z, R, G and B axes are output to the Blender chips along with the pixel coordinates (X and Y) and the A value. If patterning is enabled, the U and V values are also output. If transparency is enabled, the T value is multiplied with A before the latter is output.

Once the adjusted base values have been calculated by the Input Unit, the interpolation units are loaded with the adjusted base values, the X-delate values, and the Y-delate values (refer to FIG. 30). The color values for any arbitrary pixel on the polygon (or on the screen) for that matter may then be calculated by simply adding or subtracting the correct number of X and/or Y-delta values to the adjusted base value. Barrel shifters are used to speed this process. There is a separate color interpolator used for each color axis and they all resemble that shown in FIG. 30. They all operate in parallel and are controlled by the same state machine.

Initially the Base and Delta registers are loaded by the Input Unit. The LOAD signal is then asserted and the accumulator is loaded with the adjusted base color value. If the left-most vertex does not lie within the current span, the interpolator performs initial X and Y offsets to the appropriate span. The X adjustments are always performed first. The STEPX signal is asserted causing the DELTA-X register to be selected. The appropriate SHIFT value is applied and the current contents of the accumulator (which is the base value) are added to the shifted DELTA-X value. The result is left in the accumulator.

The values for the pixels in the current span are generated by adding the value from the DELTA-Y register to the ACCUMULATOR. When it is time to advance to the next span, STEPX is asserted and the DELTA-X value shifted left by two is added to the ACCUMULATOR. DELTA-X is then added once more to give the correct value five spans to the right. The result is not complete yet, because the previous DELTA-Y component from the previous span is still in the accumulated value. The Interpolator Control Unit (PCCCTL) keeps track of the number of pixels output during the previous span and also knows the relative difference between the first Y-values of the current and previous spans. The sum of these values is used to determine how many times the DELTA-Y value needs to be subtracted from the ACCUMULATOR. The BARREL SHIFTER contains an inverter which is controlled by PCCCTL to perform this subtraction operation. The interpolator then begins computing the color values for the current span the same way it did for the first span. Operation continues this way until the last span of the primitive has been processed.

Some of the axes' interpolators include clip/clamp circuitry to prevent errors caused by large deltas from calculating bogus color values. These values are clipped as they come out of the accumulator, before being sent to the Blender. Negative R, G, B and T values are clipped to 0. Values of R, G, and B greater than 255 are clipped to 255. Values of T greater than 1.0 are clipped to 1.0, and Z values are clipped to be within the minimum and maximum values (Zmin, Zmax) supplied by the Setup chips.

To perform stippling, a special stipple color interpolation unit, instead of performing linear interpolation based upon a base value, a delta X-value, and a delta-Y value, shifts the stipple value as pixels are generated from left to right in order to "interpolate" the correct stipple value. This approach makes the stipple operation look as much like any other color interpolation process as possible.

The Multiplier Unit (PCMUL) performs two functions. It serves as the multiplier for all A calculations and when transparency is enabled it multiplies the computed T value with the computed A value.

The multiplier is shared by both functions to save gates. The throughput penalty for this is very slight.

The output FIFO (PCF) provides buffering in the event the Blenders assert their busy signals and is provided to improve performance. It is eight words deep by 100 bits wide and uses separate read and write address counters to address the FIFO memory.

The Output State Machine Unit (PCOUT) controls the output FIFO and the handshake lines to the Blenders. It receives data from the Lower Pipe FIFO and Output FIFO units.

The lower pipe FIFO stores lower-pipe commands, which are commands that are not intended for the Slicer/Dicer itself, but must be passed to the Blenders. These commands must be output in the same order as they were input, and any pixels generated by draw commands must arrive at the right time. For example, if the input sequence is [Load-Blender], [Fill-Rectangle], [Load-Blender], then the output sequence must be [Load-Blender], [Pixel], [Pixel], [Pixel], [Load-Blender]. Any other sequence would lead to non-deterministic pipeline operation.

To assure the proper output sequence, the output state machine arbitrates between lower-pipe commands and pixel data. Initially the state machine gives precedence to data from the lower-pipe FIFO. Eventually, however, a special command token is found in the FIFO telling it to switch to pixel data. From this point on, precedence is given to pixel data. Eventually a special pixel token is found telling it to switch back to lower-pipe data. This ping-pong action is continuous.

These special tokens maintain the correct sequence by virtue of how they are generated. Input Unit 68 loads the lower-pipe commands into the FIFO but also synthesizes the special token when it begins to receive any draw command. Thus, for [Load-Blender], [Fill-Rectangle], [Load-Blender] the lower-pipe FIFO is loaded with [Load-Blender], [Special-Token], [Load-Blender]. So the output state machine then transmits the first Load-Blender command and waits for pixel data. The pixel generation pipeline is meanwhile working on the Fill-Rectangle operation. Eventually it begins producing pixels, which the output state-machine transmits to the Blender. When all pixels for the Fill-Rectangle operation have been generated, the pixel generator generates a special, "End-of-Object" pixel, which is not actually a pixel at all but the signal to the output state machine to switch back to the lower-pipe FIFO, which it does. At this point the output state machine transmits the second Loader-Blender command.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for antialiasing an edge of an image to be presented in a raster display, the image being formed using a plurality of pixels with each pixel having an area, the method which comprises the steps of:

establishing a slope for said edge of said image through a pixel intersected by said edge to divide said pixel into a covered portion and an uncovered portion;

computing an area factor for said pixel, said computing step being accomplished by addressing said covered portion of said pixel as a polygon, calculating a subarea for said polygon, and ratioing said subarea to said area to obtain said area factor;

assigning a plurality of image parameters to said pixel, said plurality of image parameters being characteristic of said image at said pixel and including at least a Z factor indicative of a viewing distance from said image, a T factor indicative of a transparency for said image, an X factor and a Y factor, said X factor and said Y factor each being indicative of a location for said pixel in said image, and said plurality of image parameters further including an R factor, a G factor and a B factor collectively indicative of a color for said pixel;

weighing said plurality of image parameters at each said pixel according to said computed area factor and said T factor to create a pixlink having an alpha value;

inserting said pixlink according to said Z factor thereof into a pixlink list for said pixel;

altering respective said alpha values of all pixlinks in said list having a lower Z factor than said inserted pixlink, said altering being done according to said alpha value of said inserted pixlink;

adding said respective R, G and B factors of all pixlinks in said pixlink list to establish said R, G and B factors for said pixlink in said list having a lowest said Z factor; and discarding all pixlinks from said pixlink list having a Z factor below said Z factor of said pixlink in said list which causes said alpha value of said pixlink having said lowest Z factor to have a limit value.

2. A method as recited in claim 1 wherein said area is a square and said polygon is a triangle.

3. A method as recited in claim 1 wherein said area is a square and said polygon is a quadrilateral.

4. A method as recited in claim 1 wherein said area is a square and said polygon is a pentagon.

5. A method as recited in claim 1 wherein said area is a square and said polygon is a hexagon.

6. A method as recited in claim 1 wherein said area is a square and said polygon is a septagon.

7. A method for displaying images in a raster display using a plurality of pixels, with each image having an edge and each pixel having an area, the method which comprises the steps of:

identifying said pixels comprising each said image;

assigning a plurality of image parameters to each said pixel in each said image, said image parameters including X, Y, Z, R, G, B, T, and A factors wherein said X and Y factors are indicative of a location for said respective pixel, said Z factor is indicative of a viewing distance from said image, said R, G and B factors are collectively indicative of a color for said pixel, said T factor is indicative of a transparency for said image, and said A factor is a pixel area factor;

determining said A factor for each said pixel as a function of area of each said pixel covered by said image, with partial coverage being determined by establishing a slope for said edge of each said image through each said pixel intersected by said edge to divide said pixel into a covered portion and an uncovered portion and addressing said covered portion of said pixel as a polygon, calculating a subarea for said polygon, and ratioing said subarea to said area to obtain said area factor;

creating an alpha value for each pixel of each said image, said alpha value being a function of both said A factor and said T factor;

weighing said image parameters of each said pixel with a respective alpha value to generate a pixlink;

inserting each said pixlink according to said Z factor thereof into a pixlink list for said pixel;

altering respective said alpha values of all pixlinks in said list having a lower Z factor than said inserted pixlink, said altering being done according to said alpha value of said inserted pixlink; and combining pixlinks of respective pixels for each said image to create said display.

8. A method as recited in claim 7 further comprising the steps of:

altering respective said R, G, and B factors of all pixlinks in said list having a lower Z factor than said inserted pixlink, said altering being done according to said alpha value of said inserted pixlink; and summing said respective R, G and B factors of all pixlinks in said pixlink list to establish said R, G and B factors for said pixlink in said list having a lowest said Z factor.

9. A method as recited in claim 8 further comprising the step of discarding all pixlinks from said pixlink list having a Z factor below said Z factor of said pixlink in said list which causes said alpha value of said pixlink having said lowest Z factor to have a limit value.

10. An apparatus for antialiasing an edge of an image to be presented in a raster display, the image being formed using a plurality of pixels with each pixel having an area, the method which comprises:

- means for establishing a slope for said edge of said image through a pixel intersected by said edge to divide said pixel into a covered portion and an uncovered portion;
- means for computing an area factor for said pixel, said computing step being accomplished by addressing said covered portion of said pixel as a polygon, calculating a subarea for said polygon, and ratioing said subarea to said area to obtain said area factor;
- means for assigning a plurality of image parameters to said pixel, said plurality of image parameters being characteristic of said image at said pixel and including at least a Z factor indicative of a viewing distance from said image, a T factor indicative of a transparency for said image, an X factor and a Y factor, said X factor and said Y factor each being indicative of a location for said pixel in said image, and said plurality of image parameters further including an R factor, a G factor and a B factor collectively indicative of a color for said pixel and said apparatus further comprises means for adding said respective R, G and B factors of all pixlinks in said pixlink list to establish said R, G and B factors for said pixlink in said list having a highest said Z factor;
- means for weighing said plurality of image parameters at each said pixel according to said computed area factor and said T factor to create a pixlink having an alpha value;
- means for inserting said pixlink according to said Z factor thereof into a pixlink list for said pixel;
- means for altering respective said alpha values of all pixlinks in said list having a lower Z factor than said inserted pixlink, said altering being done according to said alpha value of said inserted pixlink; and
- means for discarding all pixlinks from said pixlink list having a Z factor below said Z factor of said pixlink in said list which causes said alpha value of said pixlink having said highest Z factor to have a limit value.

\* \* \* \* \*